United States Patent [19]

Dahlgren, Jr. et al.

[11] 4,439,834
[45] Mar. 27, 1984

[54] TOOL MANIPULATING METHOD AND APPARATUS

[76] Inventors: William V. Dahlgren, Jr., 240 Dolores, Apt. 138, San Francisco, Calif. 94103; Lewis S. Silverstein, 695 Connecticut Ave., #4, San Francisco, Calif. 94107

[21] Appl. No.: 257,581

[22] Filed: Apr. 27, 1981

[51] Int. Cl.³ .................. G06F 15/46; G06G 7/66; B43L 13/00; G05B 19/42
[52] U.S. Cl. .................. 364/474; 364/171; 364/167; 33/18 R; 318/568
[58] Field of Search ............... 364/167, 168, 171, 191, 364/192, 474, 475; 318/568; 33/18 R, 18 B, 18 C

[56] References Cited

U.S. PATENT DOCUMENTS

| | | | |
|---|---|---|---|
| 3,534,396 | 10/1970 | Hart et al. | 364/192 |
| 3,668,653 | 6/1972 | Fair et al. | 364/171 |
| 3,857,025 | 12/1974 | English et al. | 364/193 |
| 4,135,239 | 1/1979 | Hamill et al. | 364/475 |
| 4,199,814 | 4/1980 | Rapp et al. | 364/171 |
| 4,228,495 | 10/1980 | Bernhard et al. | 364/171 |
| 4,254,552 | 3/1981 | Samis | 318/568 |
| 4,281,379 | 7/1981 | Austin | 364/474 |
| 4,314,330 | 2/1982 | Slawson | 364/171 |
| 4,328,448 | 5/1982 | Berenberg et al. | 364/474 |
| 4,328,550 | 5/1982 | Weber | 364/171 |
| 4,344,127 | 8/1982 | McDaniel et al. | 364/474 |

*Primary Examiner*—Jerry Smith
*Assistant Examiner*—William G. Niessen
*Attorney, Agent, or Firm*—Limbach, Limbach & Sutton

[57] ABSTRACT

A method and apparatus for manipulating an engraving tool wherein an intelligent terminal processes data supplied by a user, the processed data being transferred to a control unit wherein the data is used to modify instructions from a master font located therein. Within the control unit, the modified master font instructions are transformed into drive signals which are then relayed to a mechanical tool manipulating means, wherein the mechanical tool is manipulated in response to the drive instructions.

21 Claims, 7 Drawing Figures

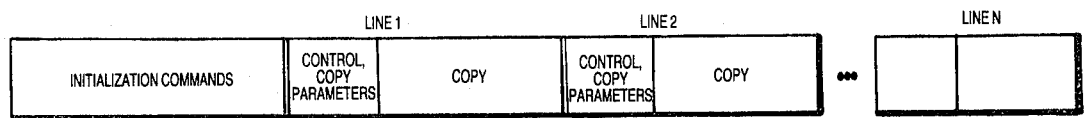
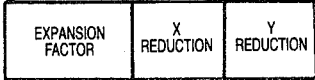
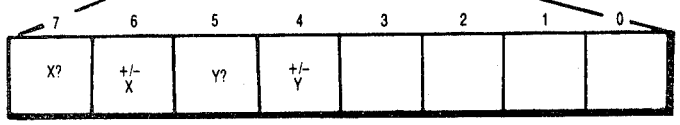

TOOL MANIPULATING METHOD AND APPARATUS

BACKGROUND OF THE INVENTION

The present invention is directed generally to machine control and, particularly, to an engraving tool manipulating method and apparatus. Reference is made to a co-pending patent application entitled TOOL MANIPULATING METHOD AND APPARATUS FOR MULTIPLE JOB PROCESSING, filed even date herewith.

In the past, engravers have practised their trade using manually controlled engraving tools. Early engravers formed patterns and letters on a particular work piece in free hand. Eventually, the pantograph was developed in which templates bearing the characters and symbols of a particular font style were used to guide the engraving tool. In the pantograph, the engraving tool is positioned over the work piece and is attached by an arm to a tracing pin. A template of the copy or information which is to be engraved on the work piece is set up on a separate surface using the template forms. As the tracing pin traces each letter in the set up copy, the engraving tool is guided over the work piece in the corresponding pattern. In this manner, the patterns of the copy set up are transferred to the work piece.

Even with the advent of the pantograph, engraving remains no less an art. This is because engraving requires not only the precise reproduction of font styles on the work piece, but also an aesthetically pleasing positioning of the various lines and symbols within the work piece. In the past, an engraver's ability to generate a satisfactory product was a function of numerous years of experience and experimentation. In the usual engraving task, the engraver creates the layout and selects the font style intuitively. It is only after this intuitive creation is engraved on the workpiece that any errors or imbalances will appear. For example, should the engraver have miscalculated the length of a line of copy for a given character letter height and font style, the whole job would have to be started over. Alternatively, the engraver could reduce the line heights which in turn will reduce copy line width. This, however, can destroy the balance of the layout. The engraver can also resort to abbreviations, but at the expense of eliminating copy which was originally sought to be engraved. In the actual engraving of the copy onto the workpiece, stylus slips can occur at any time, and often appear after a substantial amount of engraving has already been completed creating costly scrap. Often, the engraver discovers, after finishing the piece, that the line spacing that was selected left an overall imbalance in the appearance of the piece. Flourishes are often used to fill in the extra space. It is not unusual, when a large number of similar pieces are being engraved, with only a portion of the copy being changed for each piece, to suddenly come across a name, for example, which is too long for a given character height, workpiece width and font style chosen. In such a situation the engraver could redo the layout using a different font style, or engrave the new copy in a smaller font style. In either case the appearance of the piece will be noticeably changed with respect to the other pieces.

Additionally, if there is a large amount of copy which is to be transferred to the work piece, the number of lines which can be set up at any one time is limited by the number of letters of the particular font style which is on hand. In such case, the full layout and copy cannot be set up thereby hindering checks for errors or miscalculations in the layout.

In the machining art, chunks of metal are drilled, lathed, milled and cut to form finished mechanical parts. Often, the machines used in these operations are controlled numerically. Typically, these numerical control (NC) machines accept a paper tape, for example, upon which is located a number of coded instructions. Alternatively, magnetic tape, electronic memory or the like can also be used to hold these instructions. These instructions are a sequence of codes, each code causing the machine to move in a particular direction.

These control tapes are typically developed in the following manner. A programmer, upon examining a model part and reviewing the machine steps necessary to form such a part, transcribes the operations into a sequence of machine movements. This sequence of machine movements are then transferred to the tape in coded form. NC machines have primary application in heavy industry and are typified by a large physical size, high cost, and complexity. Additionally, a significant amount of expertise and/or training is required to produce a competent NC programmer. As such, NC machines and the engraving arts are incompatible, both from the standpoint of the expense involved and the complexity of adapting and operating such a machine in a typical engraving application.

SUMMARY OF THE INVENTION

The foregoing and other problems of prior art engraving apparatuses and techniques for use in the engraving arts are overcome by the present invention of a method and apparatus for manipulating an engraving tool of the type in which the tool is manipulated by electronic means to transfer copy information supplied by a user to a work piece. The method includes the steps of generating position and control parameters based upon user-supplied dimensional data; generating copy parameters from the dimensional data and user-supplied copy data; and transferring the position, control, and copy parameters and user copy to control means.

Following the parameter transferring step, are the steps of transforming the position and control parameters into drive signals; obtaining master copy instructions, which correpond to the user copy, from a master font memory within the control means; modifying the master font instructions according to the copy parameters; converting the modified copy instructions into drive signals; and transferring all drive signals to tool manipulating means.

Following the drive signal transferring step are the steps of positioning the tool in accordance with the position drive signal; and manipulating the tool in accordance with the control and modified copy instructions drive signals.

One system which implements the above method comprises an intelligent terminal, a control unit, and mechanical means for manipulating the tool. The intelligent terminal receives the information from the user and generates the position control and copy parameters.

The control unit is communicatively coupled to the intelligent terminal and receives the position, control, and copy parameters and copy. The control unit includes master font memory means which hold the font definitions. Also included are processing means for interpreting the control and position parameters; for modifying the master font definitions from the memory means in accordance with the copy parameters; and for generating drive signals. The tool manipulating means are responsive to the drive signals from the control unit, so that the positioning of the tool is manipulated about and the tool operates upon a work piece as directed by the drive signals from the control unit.

As applied to the engraving art, in the above tool manipulating apparatus and method, the user supplied dimensional data takes the form of layout information, including workpiece size, line heights and positions, and margins and justification of copy. The user supplied copy information includes font style, modifications to the font style, and the characters, symbols and figures which are to be engraved in the workpiece. Based upon the layout information, position and control parameters are generated which eventually are used to direct the positioning and operative state of an engraving tool with respect to the workpiece to be engraved. The copy parameters are generated based upon the layout and copy information. Copy parameters include expansion and reduction factors, italicizing directives and reverse lettering directives, which are used to determine the form in which the user copy is engraved on the workpiece.

The master font memory in the engraving system control unit includes various lettering and symbol fonts and tables. These fonts contain definitions by which characters, in the particular font style, each of which have a predetermined height and width, can be engraved. The definition of a single character comprises a sequence of codes, each code indicating a particular type of cutter movement, for example, a straight line, an angle, or a circle, and the direction of such movement, for example, up, down, left, right, clockwise or counterclockwise. The copy parameters are used to modify these font definitions so that copy of the desired dimensions and form are engraved in the workpiece. As such, a wide number of variations can be generated from a single definition of a character of a particular font style. The control and position parameters are converted into drive signals by the control unit. These drive signals take the form of stepping motor coil sequences and engraving tool up/down commands. The modified font definitions are also converted by the control unit into stepping (or stepper) motor coil sequences and engraving tool-up/down control.

In the engraving system, the tool manipulating means includes an X-axis driving means and a separate Y-axis driving means. The engraving tool is mounted to the X-axis driving means. An engraving table, which holds the workpiece, is mounted to the Y-axis driving means. Each driving means includes a stepper motor which is responsive to drive signals from the control unit. Each stepper motor in turn rotates a lead screw in minute steps which in turn causes movement of the workpiece and engraver along their corresponding axes in minute increments.

In the engraving system of the present invention, one feature of the layout generating means, within the intelligent teminal, permits the user to enter a minimal amount of information, including a "white space" specification, a "margin multiplier" specification, a "line ratio" specification, a line count, and work piece dimensions, which are then used to automatically generate a layout. As such, the effort and skill required to achieve the same artistic aspect of the typical engraving practice is greatly reduced. This, in turn, permits persons of considerably less experience in the art to produce layouts usually associated with those having many years of experience.

The method of the present invention also includes a procedure by which the copy parameter generating function automatically proportions the character font width dimension so that an overlay long line of copy can be made to fit within a restrictive dimension of the work piece. As such, the problem of miscalculation in the layout is greatly reduced.

The processing means within the control unit can manipulate the master font definitions supplied from the font memory means so that a plurality of dimensional patterns of a particular character can be generated from a single master font definition in the font style of that character. This includes reducing or increasing the character width or height, italicizing the character, and reversing the orientation in which the character is actually engraved on the work piece. The processing means modify the master font definition for each character specified in the copy according to the copy parameter supplied from the intelligent terminal. The control means also translate the processed control and copy information into drive signals which can be understood by the tool manipulating means.

Because a variety of character sizes and orientations can be generated from a single master font instruction, there is no limitation upon the number of times a particular character can be used in a particular layout. Additionally, because the copy is displayed before any engraving is actually performed, typographical and spelling errors are easier to spot and corrections are simple to make.

Because of the functional layout of the various elements of the present computer controlled system, engraving of a particular layout and copy can be in progress, under the control of the control unit, while the intelligent terminal is receiving the next layout and copy information package. Features such as italicizing, reverse lettering, expansion and reduction can be easily implemented in the present invention because of the two dimensional, quantity-and-direction-formats of the master fonts, which are modifiable by user-selected or system generated parameters. Additionally, the use of a master font for each font style permits high precision engraving and precise reproduceability.

In contrast to previous engraving or NC machine procedures and apparatus, minimal operator skill is required to produce works of high quality. What's more, the amount of time to produce this work is greatly reduced.

It is therefore an object of the present invention to provide a method and apparatus for manipulating a tool or machine.

It is a further object of the present invention to provide a tool manipulating apparatus including an intelligent terminal, a control unit, and a tool manipulating means wherein information supplied by a user is accepted by the intelligent terminal and placed in a control and copy parameter format, which is then supplied to a control unit, the control unit having master font information which is modified by the control and copy parameters supplied by the intelligent terminal, and further wherein the modified font information is supplied to the tool manipulating means for the actual manipulation of the tool with respect to the work piece.

It is another object of the present invention to provide a tool manipulating method and apparatus wherein engraving layouts can be automatically generated according to general, user-supplied information of a graphic design and an artistic nature.

It is a still further object of the present invention to provide a tool manipulating method and apparatus wherein a line of copy in an engraving layout is automatically and proportionally condensed in width to fit the dimensions of the specified layout.

It is a still further object of the present invention to provide a engraving tool manipulating method and apparatus wherein a master font definition can be modified to provide, for each character defined in the master font, a variety of dimensions and orientations for the particular character or, if required, resolution to thousanths of an inch.

It is a still further object of the present invention to provide a tool manipulating method and apparatus wherein an intelligent terminal generates a first set of control and copy parameters which are transferred to a control unit, and further wherein, upon transfer of such information to the control unit, the intelligent terminal can accept further user-supplied information while the control unit proceeds to process and direct a mechanical tool manipulating means in accordance with the first set of control and copy parameters.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 4 illustrates the format of the control, position, and copy parameter information which is transferred from the intelligent terminal to the control unit, and a master font character definition format.

DETAILED DESCRIPTION OF THE PREFERRED EMBODIMENT

Figure 1:
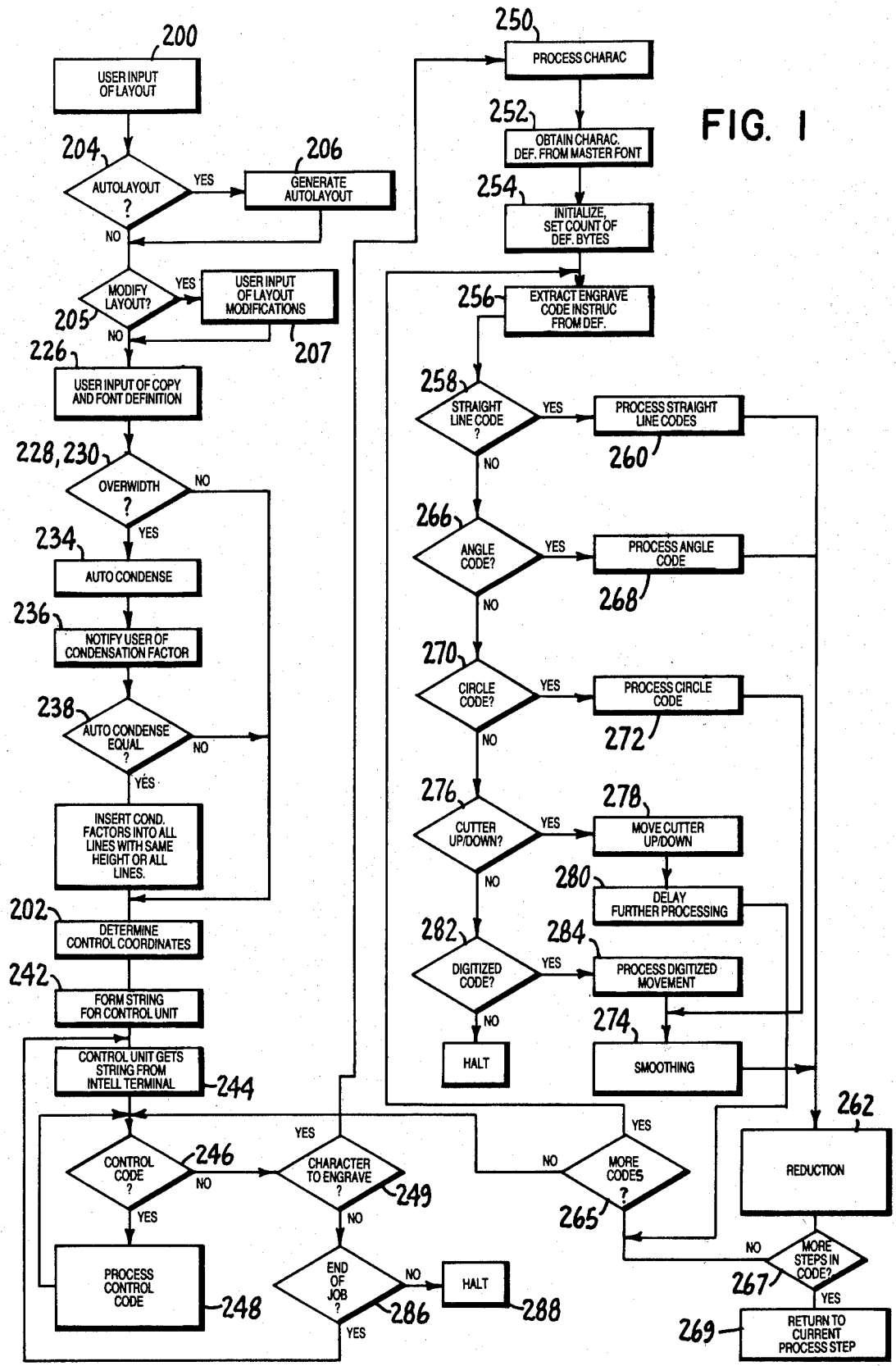
FIG. 1 is a simplified diagram illustrating the generalized steps involved in the processing of user-supplied information for controlling an engraving tool.
Figure 2:
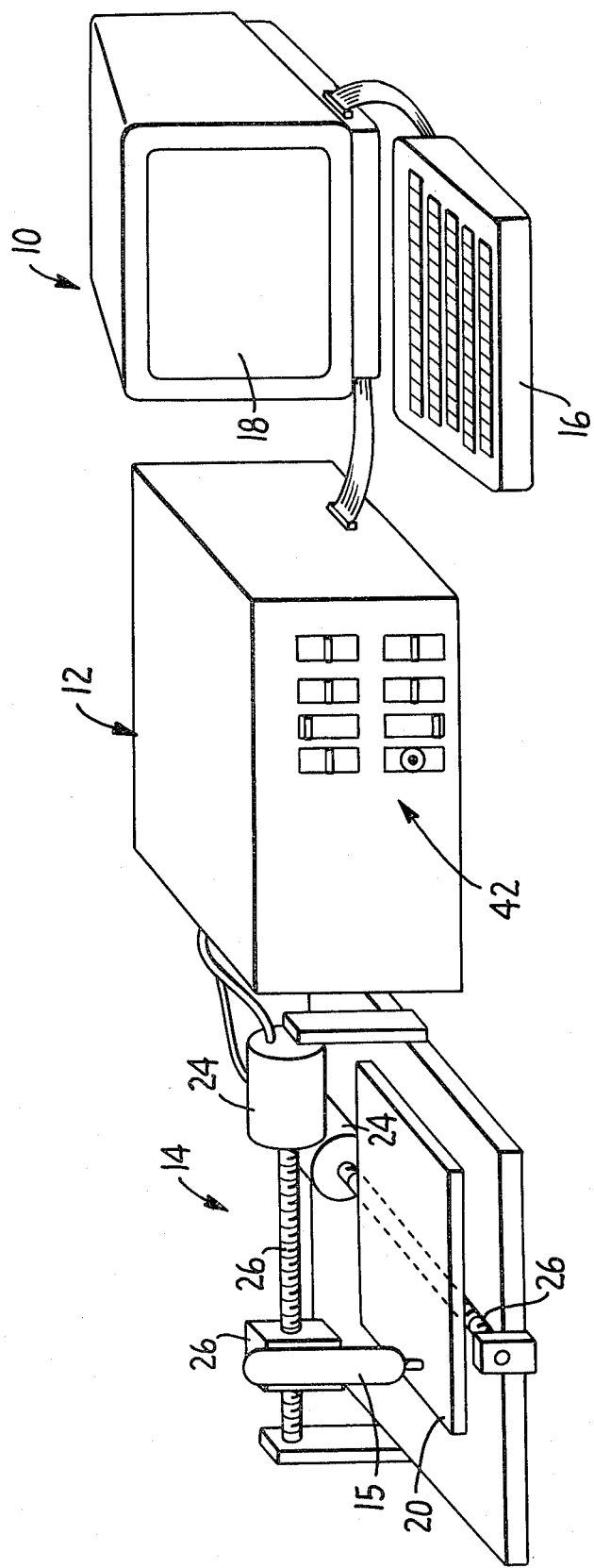
FIG. 2 illustrates the interconnection of the intelligent terminal, the control unit, and the engraving tool manipulating means which implements the method of controlling an engraving tool.

In the preferred embodiment, the method of the present invention is directed to the control of an engraving tool and an engraving process. FIG. 1 is a simplified flow diagram of this method. FIG. 2 illustrates a apparatus configuration which implements this method. The method for engraving and for controlling an engraving tool will now be discussed with references to FIGS. 1 and 2.

An intelligent terminal 10, a control unit 12, and an X-Y engraving table 14 interact with each other. The intelligent terminal 10 receives information from the user via a keyboard 16. This information is displayed on a screen 18. The intelligent terminal 10 interprets the user-supplied information to assemble layout formats, and copy parameters. The layout formats are then converted into control and position parameters. The control unit 12 receives these parameters and the copy to be engraved from the intelligent terminal 10 and converts this information into drive signals which are used to manipulate the position of the tool in the X-Y engraving table 14. This conversion of parameters by the control unit 12 is divided into at least two parts, the first part being conversion of control and position parameters into drive signals to direct the tool in the X-Y table to a certain position with respect to the work piece. The second part includes interpretation of the copy parameters to modify the master font definitions for the specified copy so that characters of the desired height and orientation can be generated. These interpreted copy parameters are then converted into drive signals which direct the tool in the X-Y table 14 to engrave the desired copy onto the work piece.

In the preferred embodiment of the present invention, the X-Y table 14 includes a table 20 for holding the work piece, the table 20 being moveable in a first linear direction. The X-Y table 14 also includes a mounting fixture 22 which is moveable in a second linear direction which is perpendicular to the first linear direction. In this manner, an X-Y type coordinate system is implemented by which X-axis signals supplied by the control unit 12 cause the mounting fixture to move in an X direction, while Y-axis signals supplied by the control unit 12 cause the table to move in a Y direction. The engraving tool 15 can thus be moved with respect to the work piece in an X direction, a Y direction, or a direction determined by the magnitude of movement in each of the X and Y coordinate directions. In the preferred embodiment of the present invention, stepping (or stepper) motors 24, which drive lead screws 26, are used to position the mounting fixture 22 and the table 20 with respect to each other. In an alternative embodiment, the table can be driven both in the X and Y coordinate direction with satisfactory results.

The present invention, is layout defined. That is, the layout of the copy to be engraved is first determined, the dimensions of the layout thereafter determining the modifications to the master font definitions which will be necessary to permit the copy to fit within the layout. Step 200, in FIG. 1, corresponding to the layout determination operation and is implemented in the intelligent terminal 10. In this step, the user supplies layout factors which include: (1) For each plate—the number of lines, and the plate (or workpiece) size; and (2) for each line—the letter height, the left margin dimension, the right margin dimension, the distance of the bottom of the line from the top of the plate, and whether the copy on the line is to be centered, or left or right justified. Given these layout factors, the intelligent terminal 10 will be able to, after copy entry convert these factors, in step 202, into control and position parameters, which will be interpreted by the control unit 12 to direct the movement of the engraving tool in the tool manipulating means 14. The tool is thereby directed to a position on the work piece which corresponds to the start of the copy on each line. From the letter height layout factor, the terminal determines the amount by which the master font definition corresponding to the particular line of copy must be increased or decreased in order to generate characters of the desired height. From the left and right margin layout factors and the workpiece width, the terminal 10 determines the maximum line width. These maximum line widths are used in the generation of copy parameters in the copy input steps which follow.

The method of engraving of the present invention includes an automatic layout generating process by which a layout can be generated from generalized, user-supplied information of a graphic design and artistic nature. In step 204 of FIG. 1 a determination is made whether this automatic layout function has been selected by the user. If so, a layout is generated in step 206 from user supplied information which includes: a "white space" specification, a "margin multiplier" specification, a "line ratio" specification, a line count, and workpiece dimensions.

Figure 3:
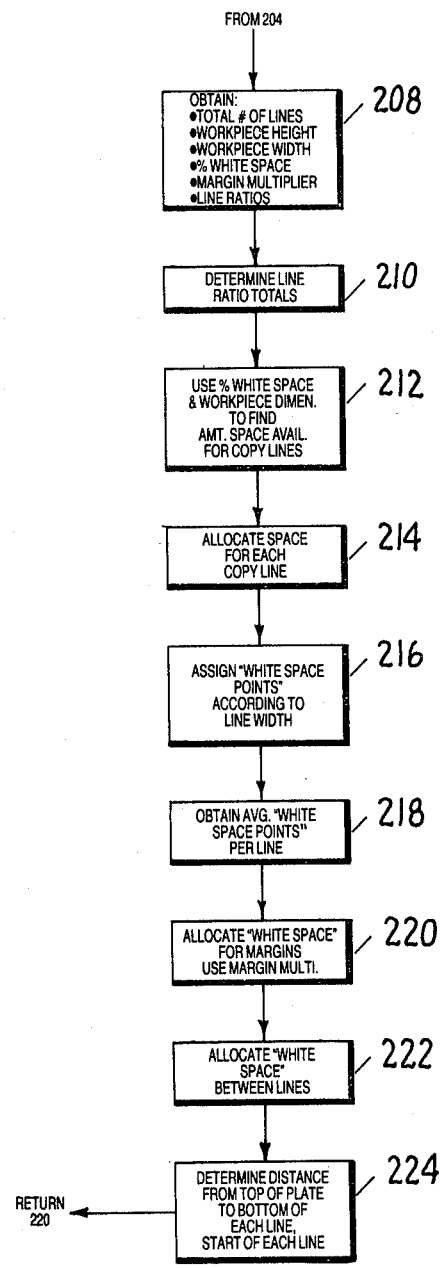
FIG. 3 is a flow diagram illustrating the processing of user-supplied information to automatically generate a layout.

Referring to FIG. 3, the process by which a layout is generated from the above identified information will be described. In step 204 the intelligent terminal 10 obtains, as before, the total number of lines of copy and the workpiece dimensions. However, in lieu of the distance from the workpiece top data, the line height data, and the line margin data obtained for normal layout mode, the terminal 10 obtains a percentage white space specification, a margin multiplier specification for the workpiece, and a line ratio specification for each line.

These three specifications are descriptive of an engraved workpiece from a visual perspective. Percentage white space describes the ratio of the vertical space of the workpiece which is left unengraved, to the total vertical space of the workpiece. The margin multiplier is the ratio of the margin area white space to the average white space between lines of the engraved workpiece. The line ratios specify the proportions of the line heights of each line to one another.

After the required specifications are obtained in step 208, the line ratios are totalled in step 210. In step 212 the workpiece dimensions and the percentage white space are used to determine the total workpiece area available for engraving. In step 214 the workpiece area available for engraving is allocated for each line by using the line ratio totals from step 210 to obtain an engraving—area per total-line-ratio quantity. Thereafter the original specified line ratio for each line is applied to the engraving area per total-line-ratio quantity to allocate a line-height for each line.

Step 216 involves the allocation of white-space points to each line, according to the line height of each line. Top and bottom lines receive only ½ units apiece while the intermediate lines receive one unit apiece. Each unit corresponds to the line height of the line for which the white space is allocated. These units are then applied to the height of the line to which they correspond to yield white-space points for each line. In step 218 the average of the white-space points between lines is obtained. In step 220 the margin multiplier specification is applied to the average of the white-space points to yield a margin-space point allocation.

Step 222 involves the actual allocation of white-space between each line and to the margins by first determining a white-space multiplier. The white-space multiplier is determined by comparing the total white space allocation to the total of the white-space points between the lines and the top and bottom margin-space points. This white-space multiplier is then applied to the white-space points for each line to yield actual white space between each line, and to each margin-space point to yield actual margin-space.

Finally, in step 224, the margin-space, white-space and line height quantities are combined to yield: margin dimensions, and for each line—distance of the bottom of the line to the top of the plate. Once step 224 has been completed, the terminal proceeds to step 226 for user copy-entry and eventually to step 202, FIG. 1, wherein control and position parameters are determined, as in the non-autolayout mode.

Included in the copy information is the copy, itself, which is to be engraved, along with a font designation, a condensation factor, an autocondense equalization instruction, a reverse lettering instruction, and an italicizing instruction.

The reverse lettering instruction is utilized in the method of the present invention in determining the position parameters. In reverse lettering, the engraving tool (or cutter) is positioned over the workpiece at what normally is the end of the copy line, from which point the copy line is engraved in reverse. That is, the copy is processed as it is supplied by the user, except that the letters are engraved backwards, or from right to left instead of the normal left to right orientation. Reverse lettering is especially useful where engraving is to be done on the backside of a transparent plate, so that when the plate is viewed from the front side, the copy is correctly oriented. In reverse lettering, therefore, a position parameter is generated to position the cutter to what is normally the end of a copy line, so that reverse engraving can be implemented. The condensation or expansion factor designates the amount by which the width of the characters within a particular line of copy is to be reduced or enlarged. If a condensation factor of 100% is specified, the width of each character in the line will be a function of the amount the master font definition of the character had to be changed in order to meet the line-height requirements of the layout section.

From the copy received from the user, the intelligent terminal determines the line width for each line specified, step 228. Should the width of the copy exceed the line width calculated in the layout section, step 230, a condensation factor which will permit the copy to fit within the line and designated as a copy parameter, step 234, width is automatically selected by the autocondense feature and the user is so informed, step 236. Because the font definitions are implemented in an X-Y coordinate format, the height of the character can be varied independently from the width of the character and vice versa. The operator, upon receiving the line-width-exceeded indication from the intelligent terminal can specify that the width of the character in the particular line be reduced even further. This factor will then be included in the copy parameters which are relayed to the control unit 12, so that the master font definitions used to actually to engrave the characters will be modified accordingly.

A related procedure to the autocondensing process is automatic equalization of lines. That is, when the autoequalization feature is requested by the user, and a line has been autocondensed, step 238, all other lines of copy, for which the same line height have been specified, will be condensed in width by the same amount by which the line, of that line height group, having the greatest condensation was condensed, step 240. In this manner, the appearance of the engraved workpiece has better balance. A further feature of the autocondense equalization procedure is that all lines of copy can be condensed by the condensation factor used for the most condensed line on the workpiece. An additional feature of autocondensing is that the user can specify that no autocondensing equalization be performed; that is, permitting each line to be condensed on its own merits. These features permit the user to control the graphic design and artistic nature of the resulting product, rather than having the copy be the controlling factor.

Once the line condensing procedure has been completed, the copy and copy parameters are formed into a data string for transfer to the control unit 12, step 242.

FIG. 4 illustrates the control, position, and copy parameter data which is supplied by the intelligent terminal 10 to the control unit 12. For each workpiece to be engraved, copy, control, and position parameters, in addition to the copy itself, are supplied for each line of copy, FIG. 4a. For each job, a set of initialization commands are included at the beginning of the string. The first several bytes of the data string for each line contain the control parameters which, when interpreted by the control unit, cause the engraving tool to be positioned at the start of the particular line on the work piece, FIG. 4b. The next several bytes designate the font style or table, which is to be used as the master font to engrave the copy, select reverse lettering, select italicizing and an italicizing slope, FIG. 4b. The next several bytes specify the proportions by which the master font is to be increased or reduced, FIG. 4b. The remaining bytes which follow are the actual copy to be engraved.

The bytes which specify the proportions by which the master font is to be modified include an expansion factor, an X reduction factor, and a Y reduction factor, FIG. 4c. The expansion factor is included so that the font memory requirements for the storage of the master font definitions in the control unit 12 can be kept small. Additionally, expansion of the master font definitions followed by a reduction of the X or the Y portion of the definition permits more precise reduction of the X or Y definition of the particular character. In the preferred embodiment to the present invention, the X and Y proportioning factors can range from between a 31% reduction to a 300% expansion. The X reduction factor is the quantity specified in connection with the auto condensing feature described above, step 236, FIG. 1.

In order for the intelligent terminal to determine the copy line width of a specific line of copy, the master font definitions for the specific font style should be available to the inteligent terminal 10. In practice, when the entire system is powered up, the control unit transfers the master font definitions for all font styles that it has to the intelligent terminal 10. In this manner, the intelligent terminal need not interrupt the operation of the control unit in order to obtain master font width information.

Also included within the control, position, and copy parameters are data bits which instruct the control unit to italicize, or reverse the engraving of the copy. These data bits, when interpreted by the control unit, cause the control unit to implement italicizing or reverse lettering features. As with the X-Y proportioning data, the reverse and italicizing data cause the control unit to modify the master font definitions for the particular character.

Returning to FIG. 1, the processing of the control, positioning, and copy parameters by control unit 12 will now be described. In step 244, the control unit retrieves a set of control, position, and copy parameters, as well as the copy to be engraved, from the intelligent terminal 10. In step 246, the control unit examines the various bytes of the command sequence to determine whether a control or position parameter or code is present. If so, the control unit proceeds to step 248 in which the control or position parameter is processed. Possible parameters include an instruction to raise or lower the engraving tool, to proceed to a specified X-Y coordinate point, to examine the control unit front panel for user control signals, to return to the home position (0,0), or to output a signal to the X-Y table 14 to shut off the stepping motors. When the parameter has been processed, the control unit returns to step 246.

If the byte is not a control or position parameter, the control unit examines the byte to determine whether it is a character which is to be engraved, step 248. If so, the control unit proceeds to step 250 in which the various font styles, italicizing, reverse lettering, and proportioning information are applied to the master font definitions obtained from the font memory.

The character processing step will now be described in more detail. In step 252, the control unit selects the current character to be engraved from the copy information and searches the font memory for the font definition for that character. This search is in the font memory area which corresponds to the font style which was designated in the copy parameter data. When the character definition is found, the control unit proceeds to step 254 in which counters are initialized with the number of bytes within the character definition to keep track of the definition process.

A master font character definition designates the order, number, and direction of steps in the X and Y coordinate directions necessary to engrave the specified character at a height of one-fourth inch, for example. The engraved code instructions can be broken down into several instruction types, including (1) a straight-line code, (2) a diagonal code, (3) a circular code, (4) a cutter-up code, (5) a cutter-down code, and (6) a digitized code. The particular code in the character definition is derived in step 256. In step 258, the control unit determines whether the engraved code found corresponds to a straight-line code. If so, the control unit proceeds to step 260 in which the straight-line code is processed.

Referring to FIG. 4e(1), the format of a straight line code is given. The first several bytes of the code specify the direction of the straight line, for example, up, down, left, or right. The second set of bytes specifies the number of steps to be executed in the particular direction. Also, in step 260, the X and Y proportions which were specified in the copy parameter data are examined to determine the expansion factor to be used. The character definition is then repeated however many times necessary in order to expand the character definition the specified amount.

In step 262, the expanded character definition is reduced in X and Y proportions according to the copy parameter reduction data so that a character of exact height and width specified will be obtained.

Figure 7:
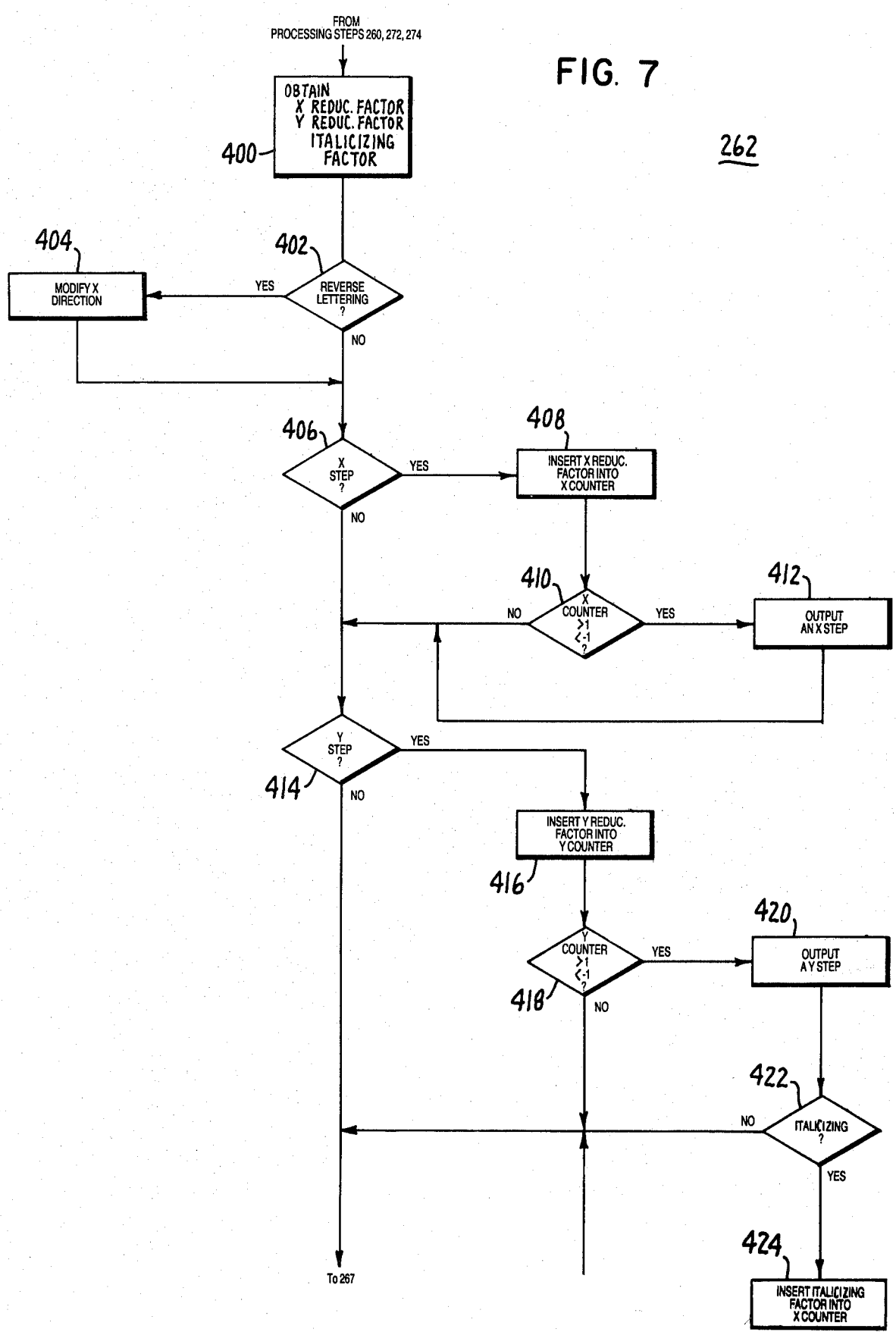
FIG. 7 is a generalized flow diagram illustrating the reduction procedure in the copy processing steps.

Referring to FIG. 7, this reduction step will now be described in greater detail. Reduction step 262 receives the expanded character definition, and reduces this definition so that the final engraved character is of the desired height and width. In step 400, the X reduction factor, the Y reduction factor, and the italicizing factor are obtained from the copy parameter data. In step 402, it is determined whether reverse lettering has been designated. If so, the direction of any X steps, which are present within a character definition, are reversed in step 404. After this modification step, the procedure returns to step 406. If, in step 402, it was determined that reverse lettering was not required, step 406 would be processed.

In step 406 and the subsequent steps, the expanded set of steps is processed, examined, step-by-step, to determine whether or not an X or a Y step is present. If in step 406, an X step is present, the X reduction factor, as opposed to a full step, is inserted into an X counter, step 408. In this manner, the expanded character definition is reduced to the proper size. For example, to obtain a 0.375 inch letter from a 0.25 inch font, the expansion factor could be three and the reduction factor 0.5. Therefore, for every expanded step received, the reduction factor of 0.5 will be inserted into the appropriate counter. In step 410, the state of the X counter is examined to determine whether the quantity within the counter is greater than one or less than negative one. Here, the counter is used as an accumulator, accumulating the steps received from step 408 until such time that a full step is present.

As used in the present invention, a negative step is defined as a step in the opposite direction of a positive step. If, in step 410, it is determined that the X counter quantity exceeds one, or is less than negative one, an X step coil pattern is output in step 412. Following step 412, or if no output step is required in step 410, step 414 is processed. In step 414, it is determined whether a Y step is present. If so, the Y reduction factor is inserted into a Y counter, step 416. As with the X counter, the Y counter is examined, in step 418 to determine whether its contents are greater than one, or less than negative one. If so, a Y step coil pattern is output in step 420.

At this point, an italicizing feature is implemented. In step 422, it is determined whether italicizing has been designated in the copy parameters. If so, for each Y step output in step 420, the italicizing factor is inserted into the X counter, step 424. In this manner, for every Y step out, a part of an X step is inserted in the character definition to cause an angling of vertical lines within the character. In this manner, the reduction step reduces, reverses, or italicizes the expanded character definition to obtain a character of the desired dimensions and orientation.

In steps 412 and 420 the control unit converts the modified character definition into coil patterns and transmit the coil patterns to the X-Y table 14.

Returning to step 258, if a straight-line code was not found, the control unit would proceed to step 266 in which an angle code is looked for. If an angle code was found, the control unit would proceed to process the angle code movement in steps 268, 262 and 264. An angle code format is shown in FIG. 4e(2). The first few bytes of the code designate the direction of the angled segment, for example, in the positive X direction and negative Y direction. The next few bytes are X, Y bit pairs which define the angle of the code movement. For example, a line at an angle of 45 degrees can be defined by a bit pair of one, one. The next few bits specify the number of times the X, Y bit pairs are to be processed. The last few bytes define finishing steps.

If no angle code was found in step 266, the control unit would proceed to step 270 in which a circle code is looked for. If a circle code was found, the control unit would proceed to step 272 in which the circle code would be processed.

Referring to FIG. 4e(3), a format of the circle code is shown. The first few bytes of the circle code designate the direction in which the circle is to be engraved, for example, clockwise or counter clockwise; and the quadrant or position of the circle. The next few bytes designate the radius of the circle, followed by several bytes designating an oval number. The oval number is used much like the reduction factor in the reduction step 262 to expand or reduce the value of X step within the circle definition so that an oval can be obtained. Following the oval number bytes, are several bytes which specify the number of steps which are to be blanked before engraving of the circle code is to commence. This is so that letters such as an "e" or a "c" can be engraved using this code. The final bytes of the circle code format indicate the number of steps required to define the particular circle.

Figure 5:
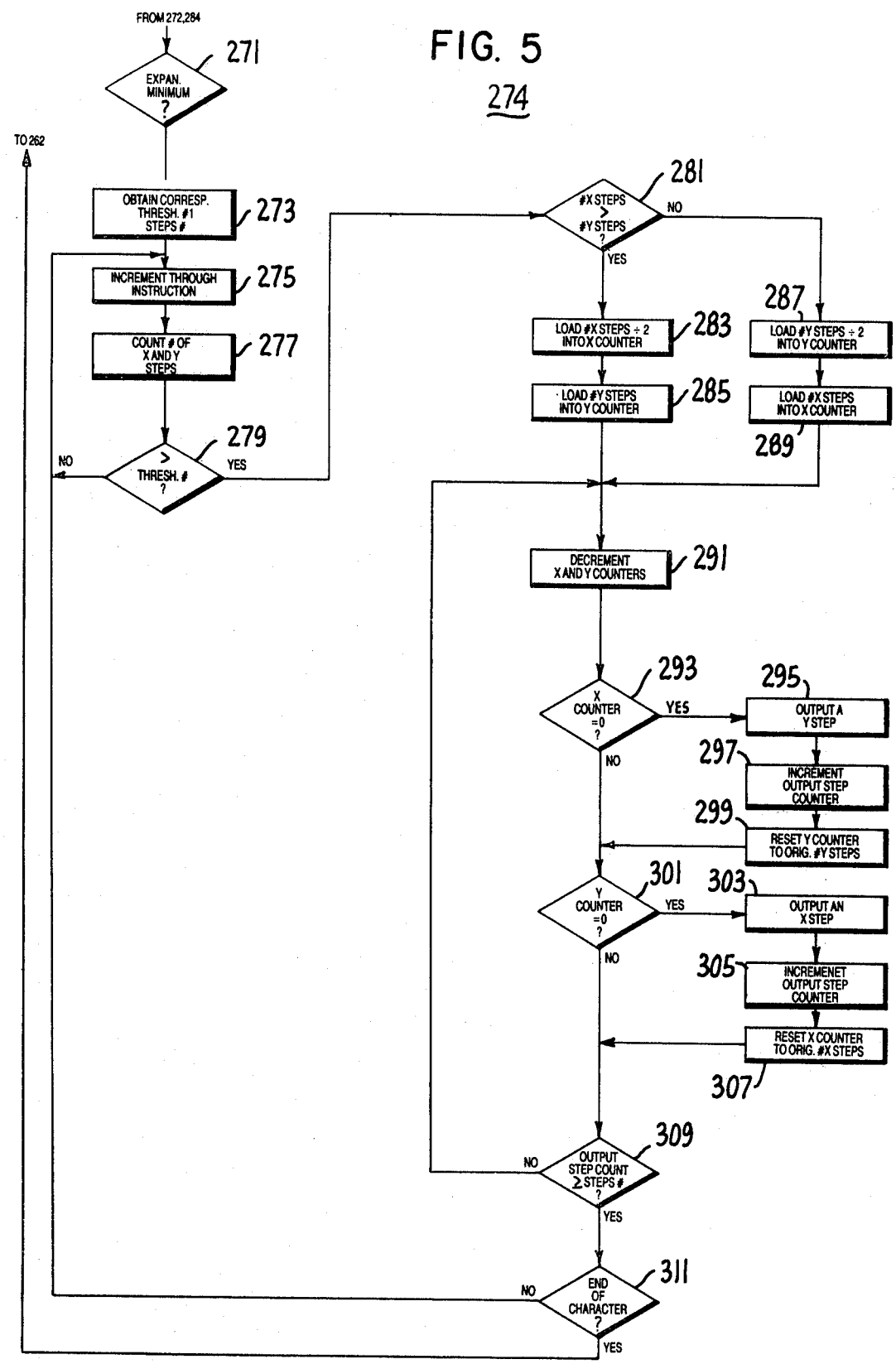
FIG. 5 illustrates the operation of smoothing a circle character pattern whenever a circle character or digitized part is enlarged.

In the present invention, the circle code tables provide a circle definition which comprises the steps necessary to generate one quadrant of a circle. The circle code processing step 272 includes provisions to modify the directional instruction within the character definition so that the other quadrants of the circle can be generated. For example, if a circle were defined in the positive X, positive Y quadrant, a simple change in sign of the X step definition would result in the negative X, positive Y quadrant of the circle. In step 274, a smoothing routine is implemented in the event that the circle definition is being expanded. Whenever a circle definition is expanded, the character engraved from such instructions can take on a jagged appearance. The smoothing routine in step 274 becomes operative whenever a expanded circle is specified, and examines the number of steps in the X-axis and Y-axis, as specified by the circle code definition and modifies these steps according to a smoothing procedure. The amount of smoothing implemented is a function of the expansion factor of the circle specified. For example, for a circle having a diameter of two inches, the smoothing routine could specify that for every 13 steps in the X direction, four steps in the Y direction will be added to the instruction. In this manner, no prolonged string of steps in any X or Y direction will occur, without some movement in the other axis. FIG. 5 is a flow diagram of the smoothing routine. In step 271 the expansion factor for the circle is examined to determine if it excess a certain minimum. If the minimum is exceeded, a threshold number is obtained in step 273 from a look-up table, as a function of the amount of expansion. As the circle instruction is incremented, step 275, the actual X and Y steps designated by the expanded circle definition are counted and totaled, step 277. If in step 279 the threshold number is exceeded, Step 281 examines the number of X step accumulated to this point and the number of Y steps accumulated to this point. If the number of X steps are greater than number of Y steps, the X step total is divided by two and loaded into an X counter, in step 283. In step 285, the number of Y steps, unaltered, are loaded into a Y counter. If, in step 281, the number of Y steps is determined to be greater than the number of X steps, the Y step total is divided by two and loaded into a Y counter, step 287. In step 289, the X step total is loaded into an X counter, unaltered. After step 289 or 285, both the X and Y counters are decremented simultaneously. For each time the X and Y counters are decremented, the contents of each counter are examined to determine whether they are equal to zero. If, in step 293, the X counter has been decremented to zero, step 295 is executed. In step 295, a Y step is output and the #Y steps is decremented. In step 297, an output step counter is incremented to record the output of a step in step 295. In step 299, the X counter is reset to the original number of X steps, see step 281. After step 299, or if the X counter has not reached zero in step 293, the Y counter is examined to determine whether its contents equal zero, step 301. If so, an X step is output in step 303, and the #X steps is decremented and the output step counter is incremented in step 305. In step 307, the Y counter is reset to the original number of Y step, see step 281. After step 307, or if the Y counter had not reached zero in step 301, the contents of the output step counter are examined, see step 309. If the contents of the output step counter do not exceed the "steps number" obtained in step 273, the procedure returns to step 291 to continue decrementing the X and Y counters. If, on the other hand, the contents of the output step counter exceed the steps number, it is determined in step 311, whether all of the steps in the character definition have been processed. If so, the next step in the overall procedure, FIG. 1, is executed. If the character has not been fully processed, the procedure returns to step 275 and continues to increment through the character instruction.

In the above manner, the smoothing procedure specifies a smoothing factor depending upon the expansion factor of the character chosen. This smoothing factor is implemented within the procedure by the examination of the trend of the X and Y steps and by inserting at appropriate points output steps which cause the trend to smooth what would otherwise be a stair step pattern.

If, in step 270, a circle code was not found, the control unit would proceed to step 276 in which a cutter-up/down code would be looked for. The cutter-up code is necessary to permit the tool to move from one character to the next character. The cutter-down code positions the cutter on the workpiece after the positioning steps have occured. In step 278 a cutter-up or cutter-down instruction is inserted into the output line to the cutter, along with a delay, determined in step 280. This delay acts to permit the cutter to be raised or lowered before further instructions are processed. This prevents, for example, the engraving of a character before the cutter makes contact with the workpiece.

In step 282, the control unit looks for a digitized code designation. If such a code is found, the control unit proceeds to step 284 in which the digitized codes are processed. A digitized code is one wherein a particular pattern is specified in X-Y step pairs. For example, a flourish can be designated by X and Y step pairs, as can a box or other symbol.

After all digitized pairs have been processed, the control unit returns from step 284 and proceeds to the smoothing step 274 and the reduction step 262.

After all instructions corresponding to a character have been processed, reduced, and converted to coil patterns, the control unit returns to step 246, and continues to search for control or character codes. In step 286, the control unit determines whether an end-of-job code is present. If no end-of-job code is present, an error is indicated and the control unit proceeds to step 288 in which it halts its operation. If an end-of-job code is encountered, the control unit returns to step 244 in which it attempts to obtain the next command sequence from the intelligent terminal 10.

In the method of the present invention, each step output in step 412 or 420 is converted into the particular coil patterns which will produce the desired rotation in the desired direction. To do this, a determination of the magnitude and direction of the rotation is made. From a look-up table, the necessary coil patterns are selected. The sequence of coil patterns are then supplied to the stepper motors on the X-Y table.

Recall that the stepper motors in the X-Y table each drive a lead screw. The rotation of the stepper motors, when transferred to the lead screws, cause the table and engraving tool to move the desired amount of incremental steps in the desired direction. The control signals to the X-Y table direct the positioning of the engraving tool with respect to the workpiece.

In the preferred embodiment of the present invention, provision is made for user interaction with the procedure at various stages. At the point where control, position, and copy parameters and copy have been transferred to the control unit, that procedure permits the user to interrupt the processing of the parameters and copy. This provision is implemented through the use of switches on the front panel of the control unit 12. For example, should the engraving tool become misaligned, or the work piece become mispositioned, the user can activate a halt-processing switch to stop the processing of the current job until the problem has been corrected. Other switches include a home and cancel switch which cause the job to be aborted and the tool to return to the home position. A home and re-start switch causes the tool to stop processing the current point in the job and to return home and start the job from the very beginning. A cutter-up/down switch permits the cutter to be raised from the work piece while corrections are made to the work piece. A power-saver switch causes the stepper motors to be turned off at the end of a job.

In the operation of stepper motors, the stepper motor coils are energized even when the stepper motor is not moving. Depending upon the last set of coils to be energized, the idling of a stepper motor in a particular position may correspond to a very high current drain due to the number of coils being energized. In the preferred embodiment of the present invention, the control unit causes the coil sequence with the fewest number of coils energized to be applied to the stepper motor when the power-saver switch is off and the engraver is at its home position. In the usual stepper motor application, this feature is not easily implementated since the stepper motor drivers normally used involves a direct conversion of data into coil patterns. In the present invention, this translation of data into coil patterns includes a provision for inserting coil patterns apart from the data being translated, and for storing the current pattern being output. In the power saver mode, a coil pattern which requires the fewest number of coils to be energized is selected and output to the stepper motors, thus reducing the idling current requirements.

In addition, because the exact position of the stepper motor is known at all times, even after all power has been removed from the stepper motor driver, the position of the engraver will not change upon reapplication of the power. In the preferred embodiment of the present invention, when the power saver switch is on and the job being processed has been completed, all power is removed from the coils. In the usual stepper motor driver circuitry, containing the coil pattern translators, a removal of power to the stepper motors could result in the movement of the stepper motors out of the desired position when power was re-applied.

Previous stepper motor driver and the translator circuitry also included circuitry for slewing the stepper motor from one position to another. This slewing is typically performed when an engraving tool is being moved into position from which to start the engraving process. As such the parameters of the slewing circuitry were selected according to the characteristics of the particular stepper motors used. This was so because, in order to prevent step-skipping by the stepper motors, the rate at which the stepper motor speed was increased had to be kept below a maximum rate, determined by the characteristics of the particular stepping motor. As such, the slewing circuitry had to be custom designed for the particular stepper motor used.

In the present invention, the slewing rate can be specified. As such, the rate at which a stepper motor is slewed can be changed according to the particular stepper motor being used. No custom designed circuitry is required.

Another feature of the method of the present invention, in connection with stepper motor slewing, is the control of the slewing of both the X and the Y stepper motors at one time. The method includes the procedure of supplying the X and Y stepper motor slewing signals through independent counters. These assigned counters are loaded with counts which correspond to the point where a change is required in the signal to slow the slewing rate, to increase it, or to halt it. Each counter proceeds to be counted down independently of the other and as a function of the slewing of the particular axis to which it corresponds. When a particular count has reached zero, a decision is made in the main processing loop as to the rate at which to operate the particular motor and for the number of steps. Until that time, the stepper motors are slewed by the counter counts and independently of the main processing loop. This simultaneous monitoring of the slewing of both axes is implemented in the apparatus of the present invention through the use of programmable counters. One counter each is assigned to the X and the Y axis. For the initial starting position and the final end point, a predetermined count is loaded into each programmable counter. These counts correspond to the point at which the slewing rate of each stepper motor must be changed. The slewing of both axes is initiated and the count on each programmable counter is monitored until such time that the count in a counter has transpired. At that time, the slew rate of the corresponding stepper motor are modified accordingly.

Figure 6:
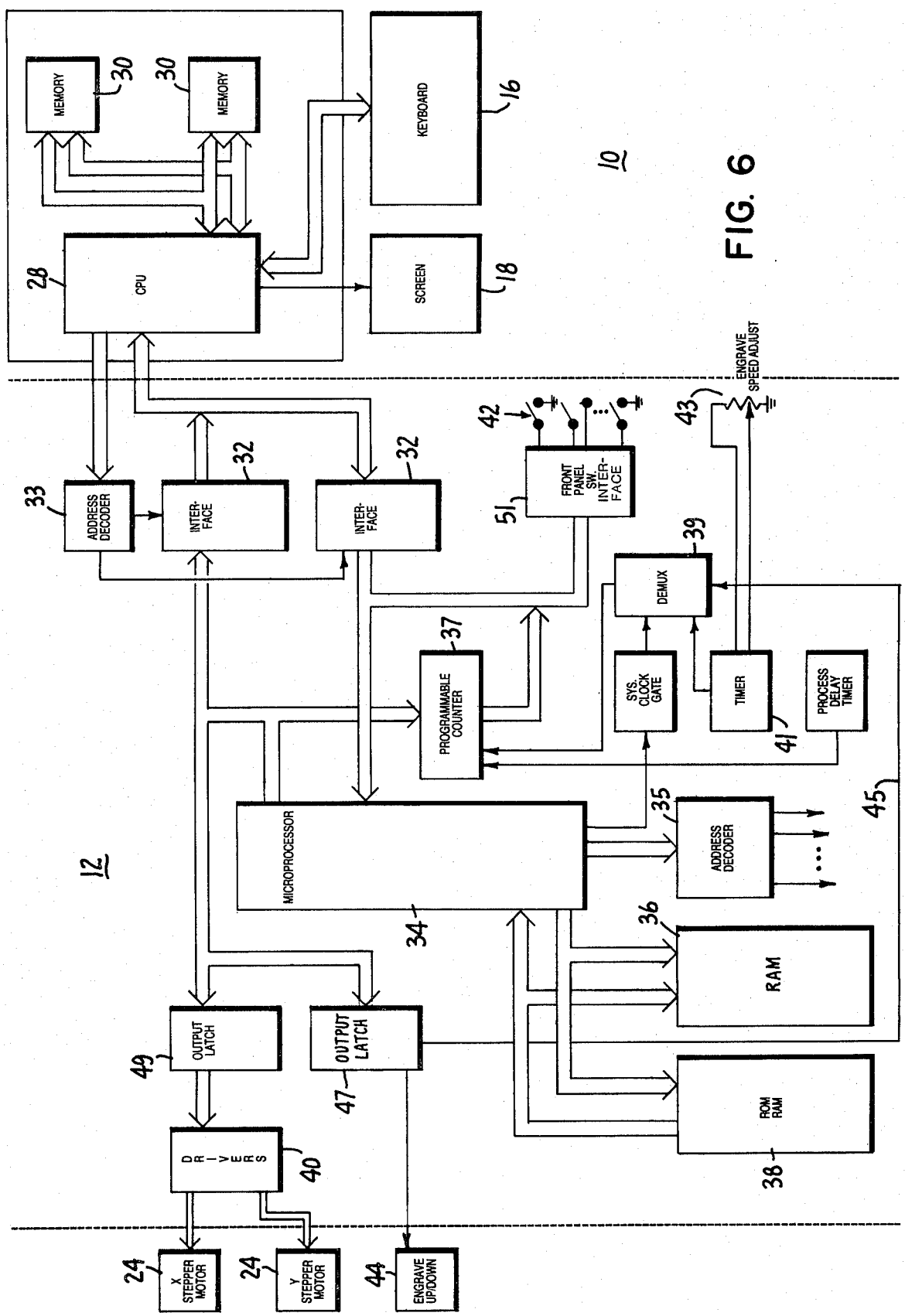
FIG. 6 is a generalized block diagram of the apparatus of the present invention illustrating the functional blocks within each component of the present invention.

In operation, the apparatus of the present invention is one implementation of the method of computer controlled engraving. See FIG. 6. Generally, the tasks are divided between two computer systems. The first computer system operates upon user information to provide the control, positioning, and copy parameters. The second computer operates upon a set of master fonts using the information supplied by the first computer. The second computer converts the modified font information into drive signals which are then used to operate a mechanical tool manipulating means. The intelligent terminal 10 receives information from the user via keyboard 16. Communication with the user is accomplished via screen 18. Included within the intelligent terminal is a central processing unit 28 and various memories 30 which contain the programs for directing the manipulation of the user-supplied information. A listing of the program which implements that portion of the engraving method of the present invention which is executed within the intelligent terminal is contained in Appendix A. This listing comprises two parts: the first part being in the BASIC language, and the second being in ASSEMBLY language. The intelligent terminal 10 is bi-directionally coupled to the control unit 12 through interface circuitry 32.

Included within the control unit 12 are a microprocessor 34, random access memory 36, and read-only memory 38. Read-only memory 38 includes control program information, as well as master fonts and circle tables. Also included within the control unit are drivers 40 to drive the stepping motors 24 within the X-Y table 14, according to coil patterns supplied by the microprocessor 34. Included on the front panel of the control unit 24 are user switches 42 which permit the user to interrupt the control unit 12 and X-Y table 14 processing. Interface 51 receives the values of the front panel switches 42, and relays the values to the microprocessor 34.

Address decoder 33 receives address information from the intelligent terminal 10 to enable the specified interface circuits 32. Address decoder 35 receives address information from microprocessor 34 to provide selection signals to the various components in the control unit 12.

Programmable counter 37 receives programmed-count values from the microprocessor 34 and supplies outputs for several functions including stepper motor slewing control as described previously and engraving speed adjust. Programmable counter 37 is supplied with a clock signal from demultiplexer 39. Demultiplexer 39 is supplied with two clock signals, the system clock from microprocessor 34, and a user-controlled clock from timer circuit 41. A potentiometer 43 located on the front of the control unit permits the user to adjust the timer 41 frequency. The output of demultiplexer 39 is determined by a signal on line 45, from output latch 47.

Output latch 47 receives up/down control data, and demultiplexer select commands from the microprocessor 34. Output latch 49 receives stepper motor coil signals from the microprocessor 34, which in turn are supplied to stepper motor drivers 40. The listing of the program which implements the control, position, and copy parameter processing, the font modification, and the coil pattern conversion steps of the method of the present invention, steps 244-248 is given in Appendix B. This listing is in ASSEMBLY language.

X-Y table 14 receives drive signals from the control unit 12 for controlling the X coordinate movement of the table 20, Y coordinate movement of the engraving tool 24, and the up-down motion of the engraving tool itself 44.

Implementation of a computer controlled engraving system and method as described above permits much flexibility in specifying characters and formats. For example, a utility font which includes master font instructions for characters such as square cornered boxes or round cornered boxes can be stored within the control unit. The square cornered box character can be specified by the user as a single character on a particular line with its size specified such that the auto-condensing feature would cause the character to be condensed so that its edges correspond to the margins of the work piece. As such, a border can be implemented using a minimal number of instructions.

It is to be understood that the method of engraving disclosed herein is equally applicable to the manipulation of machines or tools in addition to an engraving tool. For example, in place of an engraving tool, a sewing fixture can be substituted with a cloth work piece located on the work table. As such, the intelligent terminal and control unit can be instructed to cause the sewing machine to sew any number of patterns onto the work piece. Other tools could be substituted to perform other functions such burning, welding, milling and etching.

The co-pending application entitled TOOL MANIPULATING METHOD AND APPARATUS FOR MULTIPLE JOB PROCESSING, describes and claims the method and apparatus by which the present invention can be modified and augmented to permit the processing of a plurality of jobs by the control unit, as well as the execution of a number of unique and useful functions.

The terms and expressions which have been employed here are used as terms of description and not of limitation, and there is no intention, in the use of such terms and expressions of excluding equivalents of the features shown and described, or portions thereof, it being recognized that various modifications are possible within the scope of the invention claimed.

```
50 CLEAR 0
100 CLEAR 1000
150 DATA 11,1,,5,2,,15,,1,,1,,32,1,999
200 CLS
230 PRINT "SINGLE VER 1.1"
250 PRINT "COPYRIGHT (C)1980 DAHLGREN ENGRAVING SYSTEMS, INC.":PRINT:PRINT"PROGRAM CHECK DIGITS"
300 DEFINT C,I-K,P-L,F,Z
350 REM DEF SINGLE W,X,Y,M,T
400 DEFSTR A-B,S
450 REM LINK ADDRESS CONSTANTS
500 ZB=240:REM BASIC BLOCK ADDRESS
550 Q=ZB*256:IF Q>32767 THEN ZA=-(65536-Q) ELSE ZA=Q:REM BASIC PATCH STARTING ADDRESS
600 POKE 16527,ZB:REM ONLY MSB USR( ) POKE
650 Q=PEEK(ZA):IF Q<>195 THEN PRINT "LOAD LINK":END
700 POKE 16526,33:Q=USR(0)
750 PRINT "LINK":Q
800 POKE 16526,36:Q=USR(0)
850 PRINT "BASIC":Q:PRINT:PRINT"PRESS ENTER TO START"::GOSUB 8040
900 PP=0:REM PRINT DEBUG SWIITCH
950 GOTO 28850:REM GET AROUND TOP (SPEED) ROUTINES
1000 REM
1050 REM GET CURSOR POSITION IN "CU"
1100 CU=(256*(PEEK(16417))+PEEK(16416)-15360:RETURN
1150 REM THIS PRINTS@CU
1200 PRINT@CU,"=";CHR$(95);:CU=CU+1:CT=0:RETURN
1250 REM
1300 REM
1350 REM SUBROUTINE TO GET AN INPUT LINE
1400 REM
1450 REM
1500 A=A:REM TEMP ENTRY
1550 POKE Z,24:Q=USR(VARPTR(CT)):REM LOAD COUNT
1600 POKE ZL+8,0:REM SET TO TAKE FIRST ENTERED CHAR
1650 POKE Z,27:K=USR(VARPTR(BS)): REM GO GET STRING
1700 IF K>31 THEN 2850:REM <32 IS A CONTROL CHARACTER
1750 IF K=13 THEN 2150:REM ENTER
1800 IF K=8 THEN 2500:REM B=BACKSPACE
1850 IF K=11 THEN GOSUB 5250:GOTO 1650:REM GET NEW FONT
1900 IF K=12 AND L=0 AND CT=0 THEN GOSUB 28300:L=100:RETURN:REM MAIN MENU EXIT
1950 IF K=9 AND L=0 AND CT=0 THEN GOSUB 14500:L=100:RETURN:REM CHANGE LAYOUT
1970 IF K=3 THEN 3400
2000 POKE ZL+8,2:GOTO 1650:REM 2=SLUFF THIS CODE
2050 REM
2100 REM RETURN AND WAY OUT
2150 Q=PEEK(ZL+7):REM LENGTH OF LAST INPUT STRING
2200 GOSUB 1100:REM GET CURSOR
```

```
2250 IF CT>0 AND Q=0 THEN PRINT@CU-5," ";:CU=CU-64:PRINT@CU," ";:LS=LS-1:RETURN:REM HAND IS RETOVER WILL TAKE  15
2300 IF CT=1 AND LEFT$(BS,1)=" " THEN S(P,1,LS)=LEFT$(S(P,1,LS),9):GOTO 2400:REM SPACE MEANS CLEAR OUT
2350 IF CT>0 THEN S(P,L,LS)=LEFT$(S(P,L,LS),9)+LEFT$(BS,9):REM TAKE SUBLINE
2400 PRINT@CU," ";:RETURN:REM WAY OUT
2450 REM DELETE A CHARACTER
2500 IF P=0 AND L=0 AND LS=0 THEN 1600:REM CAN'T GET ANY FURTHER BACK
2550 GOSUB 8450:REM NONE TO GO IN THE SUB LINE SO GET PREV.
2600 POKE ZL+8,8:REM SET BACKSPACE
2650 GOTO 1650
2700 REM
2750 REM HANDLE A LETTER AFTER 50 IN SUBLINE
2800 REM
2850 S(P,L,LS)=LEFT$(S(P,L,LS),9)+BS:REM TAKE FONT DEF+50 CHARAC BS
2900 PRINT" ";
2950 LS=LS+1:REM ADD TO SUB LINE COUNT
3000 S(P,L,LS)=LEFT$(S(P,L,LS),9)+" ":REM START NEW SUBLINE
3050 IF CU>762 THEN GOSUB 9750:REM REPRINT STATUS LINE
3100 POKE ZL+8,K:REM GIVE THE CHAR BACK
3150 POKE ZL+7,0:REM CLEAR BS LENGTH BECAUSE RETURN WONT WITH CHAR IN STRCH
3200 GOTO 1650
3250 REM
3300 REM ROUTINE TO TAKE CARE OF AN INVALID CHARACTER
3400 Q=0:GOSUB 1100:PRINT@103,MID$(BS,PEEK(ZL+7),1);" NOT IN FONT - BACKSPACE";
3450 A=INKEY$:IF A<>CHR$(8) THEN 3600:REM OPEZATOR MUST BACKSPACE
3500 PRINT@103,STRING$(25," ");
3550 POKE ZL+8,8:GOTO 1650:REM SET BACK AND RETURN TO TRY AGAIN
3600 Q=Q+1:IF Q=25 THEN PRINT@119,STRING$(9," ");:GOTO 3450:REM BLINK ROUTINE
3650 IFQ<50 THEN 3450
3700 Q=0:PRINT@119,"BACKSPACE";:GOTO 3450
3750 REM
3800 REM
3850 REM
3900 REM
3950 REM
4000 REM PROGRAM STARTS HERE
4050 REM
4100 REM
4150 REM
4200 POKE ZM,0:REM AGAIN
4250 GOSUB 14500:REM LAYOUT
4300 GOSUB 6800:REM GET A PLATE
4350 PRINT "ENTER=OK TO ENGRAVE ; LETTER=RETYPE ; NUMBER=REPEATS  ";
4400 GOSUB 11450
4500 IF A="" THEN R=-1:GOTO 4600 ELSE  IF Q=0 THEN 4300
4550 R=ABS(INT(Q1))
4600 PRINT:PRINT" *** PLATE CALCULATION & TRANSFER IN PROGRESS - PLEASE WAIT ***"
4650 PRINT:GOSUB 1100:PRINT
4700 GOTO 4750:GOSUB 9750:REM PUT
4750 SP="":R=R-1:IF R>0 THEN PRINT@CU,R;" PLATES TO GO; PRESS ENTER TO TERMINATE ";:GOSUB 8200:GOTO  ...
4800 GOTO 4300
4850 END
4900 REM
4950 REM
```

```
5000 REM SUBROUTINE TO GET A NEW FONT DESIGNATION
5050 REM
5100 REM
5150 REM ENTRY WITH PRESET VALUES IN FP,FT,FI
5200 REM
5250 T1=0:B6="ENTER NEW FONT":REM SET NO DEFAULT
5255 A=INKEY$:REM SLUFF ANY ENTERS
5300 PRINT ":";
5350 PRINT:GOSUB 1100:IF CU>=960 THEN GOSUB 9750:REM STATUS LINE
5400 GOSUB 12750:REM PRINT "ENTER NEW FONT"
5450 CU=CU+4:CY=CU:CZ=CU
5500 Y$="N":CN=3:NX=21:GOSUB 10450
5550 ON CN GOTO 5700,6250
5600 IF FA<3: OR FA>300 THEN PRINT@104,"% MUST BE 31-300: RETYPE";:GOTO 5500
5650 IF FP<>FA THEN FC=1:FP=FA:REM VALID SO TAKE
5700 GOSUB 12650:GOSUB 12750
5750 CZ=CZ+4
5800 CN=1:GOSUB 10450:ON CN GOTO 5950,6250
5850 IF FA<0 OR FA>FF-1 THEN PRINT@97,"FONT MUST BE 2-";USING "#";FF-1; ELSE 5900
5855 PRINT "; PLEASE RETYPE";:GOTO 5800
5900 IF FT<>FA THEN FC=1:FT=FA:REM VALID SO TAKE
5950 GOSUB 12600:GOSUB 12750
6000 Y$="Y":CZ=CZ+1
6050 CN=1:GOSUB 10450:ON CN GOTO 6250,6450
6100 IF FA<0 OR FA>1 THEN PRINT@95,"FAIL0 MUST BE 'Y' OR 'N': RETYPE";:GOTO 6050
6150 IF FI<>FA THEN FC=1:FI=FA:REM VALID SO TAKE
6200 GOTO 6300:REM DONT NEED TO PRINT WHOLE
6250 GOSUB 12550:REM PRINT WHOLE FONT LINE
6300 Q=PEEK(Zi+7):REM LENGTH OF INPUT LINE
6350 IF Q THEN PRINT@CU,"     ";:CU=CU-64:GOTO 6500
6400 S(P,L,LS)=LEFT$(S(P,_,LS),7)+LEFT$(B5+(B5)(P,L,LS)):REM TAKE SUBLINE
6450 LS=LS+1:REM MAKE A NEW SUB LINE
6500 GOSUB 13000:REM SET UP A NEW S(L,P,LS) WITH FONT STRING
6550 PRINT@CU-1,LEFT$(S(P,L,LS),9);
6600 RETURN
6650 REM
6700 REM ROUTINE TO GET A PLATE
6750 REM
6800 A=A
6850 CLS:GOSUB 8200:GOSUB 9750:PRINT@128,"";:REM ESTABLISH CURSOR FOR LINE 1
6900 FOR L=0 TO L9-1
6950 GOSUB 7300:REM GO GET A LINE
7000 NEXT
7050 IF L>99 THEN 6850:REM RESTART AFTER NEW LAYOUT
7100 RETURN
7150 REM
7200 REM OVERALL ROUTINE TO CAPTURE A LINE
7250 REM
7300 A=A:REM TEMP ENTRY
7350 GOSUB 1100:REM CURSOR POSITION
7400 IF CU>959 THEN GOSUB 9750:REM STATUS LINE
7450 IF L<9 THEN PRINT@CU, USING "L ##"; L+1; ELSE PRINT@CU, USING "L##"; L+1;
7500 PRINT LEFT$(S(P,L,0),9);
```

```
7550 CT=0:REM RESET LINE COUNT
7600 LS=0:REM RESET SUBLINE COUNT
7650 GOSUB 13950:REM PUT DEFAULT FONT IN F9,F1
7700 GOSUB 1500:REM GET A LINE
7750 IF L>99 THEN RETURN:REM USED FOR NEW LAYOUT
7800 IF CT>0 THEN PRINT ELSE PRINT@CU-9,"";:GOSUB 9400:REM PRINT REV LINE TO BE COPIED
7850 IF CT>0 THEN LX(P,L)=LS:LC(P,L)=CT:REM SAVE SUB LINE COUNT & CHARACTER COUNT
7900 RETURN
7950 REM
8000 REM UTILITY SUBROUTINES
8010 REM
8020 REM WAIT FOR ENTER
8040 IF PEEK(14400)<>1 THEN 8040
8050 RETURN
8100 REM PRINT CHARACTER COUNTS
8150 REM
8200 C2=C2+C1:C3=C3+C1
8250 PRINT@960,"CHARACTER COUNTS:      PLATE";C1;"     LAYOUT";C2;"      OVERALL";C3;
8300 C1=0:RETURN
8350 REM SUBROUTINE TO FIND PREVIOUS SUB LINE, NEW CU, AND
8400 REM PRINT THE LINE OUT
8450 A=A:REM TEMP
8500 LS=LS-1:IF LS>=0 THEN LX(P,L)=LS ELSE L=L-1:LS=LX(P,L):CT=LC(P,L):POKE Z,24:Q=USR(VARPTR(CT)):REM IF Q THEN WE BACK UP A LINE
AND LOAD CT
8550 IF L<0 THEN L=L9:P=P-1:LS=LX(P,L):REM IF L<0 THEN WE GO BACK A PLATE AND BACK UP SUBLINE NO.
8600 GOSUB 1100:REM GET CURRENT CURSOR
8650 PRINT@CU-12,STRING$(13," ");
8700 CU=CU-73:REM BACK UP ONE LINE PLUS FONT PRINT AREA
8750 IF CU<131 THEN CU=131:REM THIRD LINE IS AS FAR AS WE CAN GO
8800 IF LS>0 THEN PRINT@CU-3,USING "-##";L; ELSE PRINT@CU-3,USING "-##";L;
8850 IF L<9 THEN PRINT@CU-3,USING "-# #";L; ELSE PRINT " # ";
8900 IF LEFT$(S(P,L,LS),1)="*" THEN PRINT@CU;:MID$(S(P,L,LS),10)) ELSE PRINT@CU; S(P,L,LS);
8950 PRINT " ";CHR$(8);:REM CLEAR NEXT PRINT POSITION
9000 GOSUB 13950:REM GET AND CHANGE TO THE FONT FOR THIS LINE
9050 Q=LEN(S(P,L,LS))-9:REM NOW FIX 35
9100 BS=RIGHT$(S(P,L,LS),9)+STRING$(50-Q,0)
9150 POKE ZL+7,0:REM SET NEW STRING LENGTH
9200 RETURN
9250 REM
9300 REM SUBROUTINE TO PRINT THE REST OF A LINE FOR COPIED LINES
9350 REM
9400 FOR I=0 TO LX(P,L)
9450 IF I=0 THEN PRINT " ";
9500 IF LEFT$(S(P,I,9),1)="*" THEN PRINT " ";MID$(S(P,I,9),9);" " ELSE PRINT S(P,I,9);
9550 NEXT:RETURN
9600 REM
9650 REM
9700 REM PRINT STATUS LINE
9750 A=A:REM TEMPORARY ENTER
9800 PRINT@64,CHR$(225);
9850 PRINT@0,USING"L/O:###";C9;
9900 PRINT@11,"CT=";CT;
9950 PRINT@20,"(";MEM;FRE(A);")":REM TEMP
```

```
9955  PRINT@42, USING "AE;#";LA;
9960  PRINT@48, USING "REV:#";ASC(SR);
10000 PRINT @60,CHR$(PEEK(ZM));
10050 IF PEEK(ZL)=0 THEN PRINT@62;"UC"; ELSE PRINT@62,"  ";
10100 RETURN
10150 REM
10200 REM 'NUMERIC FIELD ENTRY
10250 REM ON ENTRY: CZ=CURSOR POSITION; CN=MAX. FIELD LENGTH; NX=AMT. FOR A UTO CR
10300 REM RETURNS FA IF VALID INPUT, OTHERWISE UNCHANGED.
10350 REM CN SET = 2 IF BREAK PRESSED; OTHERWISE 1=NO; 0=YES ENTRY
10400 REM
10450 AB=""
10500 PRINT@CZ,CHR$(95);STRING$(CN," ";
10550 A=INKEY$:IF A="" THEN 10550
10555 IF A="D" THEN T1=1:B6="ENTER DEFAULT ":GOSUB 12750:REM SET FOR DEFAULT
10600 IF Y$<>"Y" THEN 10750
10650 IF A="Y" OR A=CHR$(121) THEN A="1"
10700 IF A="N" OR A=CHR$( 10) THEN A="0"
10750 IF ASC(A)=16 THEN PRINT@CZ,STRING$(CN+1," ");:CN=2:RETURN
10800 IF ASC(A)=13 THEN 11200:REM C/RETURN
10850 IF ASC(A)=8 AND LEN(AB)>0 THEN AB=LEFT$(AB,LEN(AB)-1):GOTO 11050:REM BACKSPACE
10900 IF ASC(A)<46 OR ASC(A)>57 OR ASC(A)=47 THEN 10550
10950 IF ASC(A)=46 AND CN<6 THEN 10550
11000 AB=AB+A
11050 PRINT@CZ,AB;CHR$(95);" ";
11100 IF VAL(AB)=>NX THEN 11200:REM AUTOMATIC CR
11150 IF LEN(AB)<CN THEN 10550
11200 FA=VAL(AB):IF CN<5 THEN FA=ABS(FIX(FA))
11250 PRINT@CZ,STRING$(CN+1," ");:IF LEN(AB)=0 THEN CN=1 ELSE CN=0
11300 RETURN
11350 REM
11400 REM ROM INPUT ROUTINE
11450 A=STRING$(6,0)
11500 POKE 16526,21
11550 CN=USR(VARPTR(A))
11600 Q=VAL(A):IF Q<Q2 THEN Q=Q3 ELSE IF Q=2 AND A<>"0" THEN RETURN ELSE Q1=Q:RETURN
11650 RETURN
11700 REM
11750 REM SUBROUTINE TO EMPTY DEFAULT STRINGS
11800 REM
11850 FOR I1=0 TO L6
11900 FOR I2=0 TO L8
11950 S(I1,I2,0)=AD:REM AD HAS DEFAULT STRING
12000 LX(I1,I2)=0:REM SET SUB LINE COUNTS TO ZERO
12050 NEXT:RETURN
12100 REM
12150 REM EMPTY LAYOUT FILE TO LINE 0
12200 REM
12250 X9=0:Y9=0:FOR I=0 TO 4:M5(0,I)=0:NEXT:RETURN
12300 REM
12350 REM FONT LINE PRINTING SUBROUTINE
12400 REM PRINTS IN REVERSE ORDER FROM NUMERIC FIELDS: FX,FY,FZ
12450 REM PRINT@ IN CY; PRINTING =P,FT,FI
```

```
12500 A=A:REM TEMPORARY ENTER
12550 IF FI=0 THEN PRINT@CY+5,"N";ELSE PRINT@CY+5,"Y";
12600 PRINT@CY+4,USING"#";FT;
12650 PRINT@CY,USING"###F";FP;
12700 PRINT@B6,STRING$(40," ");:RETURN
12750 PRINT@114,B6;:RETURN:REM JUST PRINT "ENTER..."
12800 REM
12850 REM
12900 REM SUBROUTINE TO CREATE A NEW FONT STRING AND PUT IN S(P,L,LS)
12950 REM FORM IS " 100F1N :"
13000 IF FI=1 THEN A2="Y:" ELSE A2="N :"
13050 S(P,L,LS)=" "+RIGHT$(STR$(FP),3)+"F"+RIGHT$(STR$(FT),1)+A2+M.D$(S(P,L,LS),10)
13100 GOSUB 13400:REM CHANGE FONT TABLE LOOKUP
13150 IF T1=1 THEN AD=LEFT$(S(P,L,LS),9):REM CHANGE DEFAULT FONT
13200 RETURN
13250 REM
13300 REM SUBROUTINE TO CHANGE CURRENT FONT FOR TABLE LOOKUP
13350 REM
13400 POKE.16526,15
13450 FS=USR(FT)
13500 RETURN
13550 REM
13600 REM
13650 REM SUBROUTINE TO LOAD FP, FT, & FI FROM S(P,L,LS)
13800 REM CALLS FONT CHANGE SUBROUTINE
13900 REM
13950 FP=VAL(MID$(S(P,L,LS),2,3))
14000 FT=VAL(MID$(S(P,L,LS),6,1))
14050 IF MID$(S(P,L,LS),7,1)="Y" THEN FI=1 ELSE FI=0
14100 GOSUB 13400:REM FONT TABLE CHANGE
14150 RETURN
14200 REM
14250 REM
14300 REM
14350 REM SUBROUTINE TO INPUT FIND A LAYOUT
14400 REM AND FILL THE LAYOUT FIELDS
14450 REM
14500 LZ=L9:REM USER ID TO INDICATE WHEN STRINGS SHOULD BE RELEASED
14550 C2=0:REM LAYOUT COUNT
14600 CLS:GOSUB 10000:PRINT@83,"*** LAYOUT SECTION ***":PRINT
14650 PRINT TAB(11)"RETURN TO COPY INPUT (1)"
14700 PRINT TAB(10)"CHANGE CURRENT LAYOUT (2)"
14750 PRINT TAB(9)"DISPLAY CURRENT LAYOUT (3)"
14800 PRINT TAB(9)"ENTER NEW FIXED LAYOUT (4)"
14850    PRINT TAB(7)"GENERATE NEW AUTO-LAYOUT (5)"
14900    PRINT TAB(9)"CLEAR COPY/SET DEFAULT (6)"
14950    PRINT TAB(11)"SELECT STORED LAYOUT (LAYOUT #)"
15000    PRINT TAB(32) STRING$(3,91);"  ENTER CHOICE: ";
15050 RESTORE:Q1=0:GOSUB 11450:CC=0:IF INT(Q1)<>1000 THEN CC=INT(Q1)
15100 PRINT
15150 IF CC=0 THEN GOTO 16000:REM INVALID OR BAD ENTRY
15200 IF CC<>1 THEN GOTO 15250 ELSE IF L9=0 OR M$(0,3)=2 THEN GOTO 16000 ELSE L9=3:PRINT@115,"";:IF LZ<>L9 THEN GOSUB 10640:PRINT:RETURN
SE RETURN
```

```
15250 IF CC<>2 THEN 15600
15300 IF L9<1 OR M5(0,3)=0 THEN GOTO 16200 ELSE LP=0:GOSUB 23850:IF CN<>1 THEN 15550
15350 IF L9>LM THEN L9=L:GOTO 15500
15400 IF L9<LM+1 THEN GOTO 15500
15450 L9=LM+1
15500 GOSUB 16650:GOTO 14600
15550 GOSUB 17350:GOTO 14600
15600 IF CC=3 AND L9>0 AND M5(0,3)<>0 THEN GOSUB 16650:GOTO 14600
15650 IF CC<>4 THEN 15800
15700 LP=1:GOSUB 23850:IF CN<>1 THEN 15750 ELSE IF M5(0,3)=0 THEN GOSUB 12250 :GOTO 14600 ELSE L9=L:GOSUB 16650:GOTO 14600
15750 GOSUB 17350:GOTO 14600
15800 IF CC=5 THEN GOSUB 25300:GOSUB 16650:GOTO 14600
15850 IF CC=6 THEN GOSUB 11850:CZ=C9:GOTO 14600
15900 READ I:IF I<>9999 THEN GOTO 16250
16000 PRINT@651,B5";PRINT@819,B5";PRINT@768,"INVALID CHOICE OR LAYOUT NUMBER - PLEASE RE-ENTER";
16050 IF I=CC THEN 16200
16100 READ I
16150 IF I=999 THEN 15950 ELSE 16100
16200 C9=CC:READ L9,Y9,X9
16250 FOR L=0 TO L9-1
16300 READ M5(L,0),M5(L,1),M5(L,2),M5(L,4),M5(L,3)
16350 NEXT L
16400 GOTO 14600
16500 GOSUB 16650:REM PRINT THE LAYOUT
16550 REM
16600 REM SUBROUTINE TO PRINT A LAYOUT
16650 CLS:GOSUB 10000
16700 PRINT@67,"LAYOUT NUMBER=";C9
16750 PRINT "   NO. LINES=";L9;"     PLATE HEIGHT=";Y9;"     PLATE WIDTH=";X9:PRINT
16800 PRINT B1
16850 PRINT B2
16900 FOR L=0 TO L9-1
16950 PRINT USING "######";L+1;
17000 PRINT USING "#####.###";M5(L,0);M5(L,1);M5(L,2);M5(L,4);
17050 PRINT USING "######";M5(L,3);
17100 IF M5(L,3)=1 PRINT "(CENTER)"
17150 IF M5(L,3)=2 PRINT "(L. HAND)"
17200 IF M5(L,3)=3 PRINT "(R. HAND)"
17250 IF M5(L,3)=0 THEN PRINT
17255 IF PEEK(14400)=128 THEN 17255
17300 NEXT L
17350 IF L<10 THEN PRINT
17400 PRINT TAB(5)"*** PRESS ENTER WHEN THRU VERIFYING LAYOUT ***";GOSUB 8040
17450 RETURN
17500 REM
17550 REM SUBROUTINE TO FIND THE STD. HEIGHT, ITALIC, AND
17600 REM TOTAL CHARACTER WIDTH FOR A LINE
17650 W=0:REM W WILL CONTAIN TOTAL WIDTH
17700 FOR LS=0 TO LX(P,L)
17750 GOSUB 13950:REM LOADS FP,FT,FI & GETS FS
17800 POKE 16526,18
```

```
17850 Q=USR(VARPTR(S(P,L,LS))):REM GET THE SUB LINE WIDTH
17900 W=W+(Q*250/FS*FP/100):REM WIDTH MODIFIED BY THE FONT WIDTH %
17950 IF PP=1 THEN PRINT "PD1(";P;L;LS;")";Q;W
18000 C1=C1+PEEK(ZC):REM COUNT OF NON-BLANK CHARACTERS
18050 NEXT:RETURN
18100 REM
18150 REM THIS SUBROUTINE CALCULATES THE FINAL "1 OUT OF" NUMBERS
18200 REM
18250 REM OUTPUTS W(P,L)  WP(P,L)
18300 A=A
18350 WT=M5(L,0)/.250:REM LINE "TIMES" RATIO OF HEIGHT TO .250
18400 W(P,L)=W*WT/1000-M5(L,2):REM LINE LENGTH IN INCHES BEFORE AUTO-CONDENSE
18450 XA=X9-M5(L,1)-M5(L,2):REM AVAILABLE LINE LENGTH IN INCHES
18500 IF W(P,L)>=XA THEN WP(P,L)=XA/W(P,L) ELSE WP(P,L)=1
18550 IF PP=1 THEN PRINT "PD2(";P;L;LS;")";WT;W(P,L);WP(P,L);XA
18600 RETURN
18650 REM
18700 REM SUBROUTINE TO EQUALIZE CONDENNSED LINES
18750 REM
18800 A=A
18850 FOR L1=0 TO L9-2
18900 T1=1:REM THIS HOLDS THE LOWEST WP(P,L) NUMBER
18950 FOR L=L1 TO L9-1
19000 IF LEN(S(P,L,0))<=9 THEN 19200
19050 IF LA=2 THEN 19150
19100 IF LA=1 AND M5(L,0)=M5(L1,0) THEN 19150 ELSE 19200
19150 IF WP(P,L)<T1 THEN T1=WP(P,L):REM SAVE THE MOST CONDENSING
19200 NEXT L
19250 FOR L=L1 TO L9-1:REM NOW REPLACE IF NECESSARY
19300 IF LA=2 THEN 19400
19350 IF LA=1 AND M5(L,0)=M5(L1,0) THEN 19400 ELSE 19450
19400 WP(P,L)=T1:REM REPLACE IT
19450 NEXT L
19500 IF LA=2 THEN RETURN:REM IF ALL SAME THEN 1 PASS IS ENOUGH
19550 NEXT L1
19600 RETURN
19650 REM
19700 REM THIS SUBROUTINE PUTS OUT A PLATE
19750 FOR L=0 TO L9-1
19800 IF LEN(S(P,L,0))<=9 THEN GOTO 19950
19850 GOSUB 17650:REM STD HEIGHT, ITALIC, TOTAL CHAR. WIDTH
19900 GOSUB 18300:REM FINAL 1 OUT OF SPECS.
19950 NEXT L
20000 IF LA>0 THEN GOSUB 18800:REM AUTO-CONDENSE EQUALIZER
20050 POKE 16526,9:REM SET FOR LOAD
20100 A=CHR$(160)+CHR$(171)+CHR$(167)+CHR$(162):REM SET STATUS, MOTOR ON, CLEAR COUNTERS
20150 IFR=-1 THEN 20200 ELSE Z5=PEEK(ZM):IFZ5=71 THEN 20200 ELSE A1=INKEY$:IF A1="" THEN 20150 ELSE IF ASC(A1)<>13 THEN 20150 E..
=0:C1=0:RETURN
20200 Q=USR(VARPTR(A))
20250 FOR L=0 TO L9-1
20300 IF LEN(S(P,L,0))>9 THEN GOSUB 20800 :REM SUB LINE OUTPUT
20350 NEXT L
20400 A=CHR$(166)+CHR$(163)+S5:REM MOTOR OFF, RTZ, 5-FF
```

```
20450 POKE 16526,9
20500 Q=USR(VARPTR(A))
20550 RETURN
20600 REM
20650 REM SUBROUTINE TO GO THRU THE SUBLINES AND OUTPUT TO 8080
20700 REM FONT CHANGES, % REDUCTION DATA, CHARACTERS.
20750 REM
20800 A=A
20850 XA=X9-M5(L,1)-M5(L,2):REM AVAILABLE LINE LENGTH IN INCHES
20900 GOSUB 22300:REM PUT OUT A GOTO X,Y
20950 FOR LS=0 TO LX(P,L)
21000 GOSUB 13950:REM FONT CHANGE
21050 TH=(M5(L,0)/FS)*WF:REM EXACT TIMES ON HEIGHT
21100 TW=WP(P,L)*(FP/100)*TH:REM EXACT TIMES ON WIDTH
21150 IF TH>TW THEN TI=TH ELSE TI=TW:REM LARGEST TIMES INTEGER
21200 IF, TI=INT(TI) THEN 21250 ELSE TI=INT(TI)+1
21250 IF TI<1 THEN TI=1:REM TIMES INTEGER MUST BE AT LEAST 1
21300 IF TI=TW THEN TX=255 ELSE TX=1/((TI-TW)/TI):REM WIDTH ONE OUT OF NO
21350 IF TI=TH THEN TY=255 ELSE TY=1/((TI-TH)/TI):REM HEIGHT ONE OUT OF NO
21400 IF TY>255 THEN TY=255:IF TX>255 THEN TX=255
21450 T1=INT(TX):REM INTEGER PART
21500 T2=INT((TX-T1+.005)*100):REM DECIMAL PART
21550 T3=INT(TY)
21600 T4=INT((TY-T3+.005)*100)
21650 IF MID$(S(P,L,LS),7,1)="Y" THEN SI=CHR$(PEEK(ZI)) ELSE SI=CHR$(0)
21700 SF=CHR$(178)+CHR$(ASC(MID$(S(P,L,LS),6,1))-48)+SI+SR+CHR$(177)+CHR$(TI)+CHR$(T2)+CHR$(T3)+CHR$(T4)
21750 IF SF=SP THEN SO=MID$(S(P,L,LS),10) ELSE SO=SF+MID$(S(P,L,LS),10):REM PUT (NEW ONLY) FONT DATA OUT + STRING
21800 SP=LEFT$(SF,10)
21850 POKE 16526,9
21900 Q=USR(VARPTR(SO)):REM FONT+STRING
21950 IF PP=1 THEN PRINT "PD4(";P;L;LS;")";TW;TH;T1;T2;T3;T4
22000 NEXT
22050 IF PP=1 THEN INPUT AA
22100 RETURN
22150 REM
22200 REM SUBROUTINE TO CALCULATE A X,Y GOTO AND LOAD INFO
22250 REM
22300 A=A
22350 ON M5(L,3) GOTO 22450, 22700, 22850
22400 REM CENTERED JUSTIFICATION
22450 T1=W(P,L)*WP(P,L):REM LINE LENGTH IN INCHES
22500 T2=(X9-M5(L,1)-M5(L,2)-T1)/2:REM OFFSET FROM EDGE
22550 X=INT(WF*(XJ+XM+M5(L,1)+T2)):REM TOTAL X IN .001 STEPS
22600 GOTO 23100
22650 REM L.H. JUSTIFICATION
22700 X=INT(WF*(XJ+XM+M5(L,1)))
22750 GOTO 23100
22800 REM R.H. JUSTIFICATION
22850 T1=W(P,L)*WP(P,L):REM LINE LENGTH IN INCHES
22900 T2=X9-M5(L,1)-M5(L,2)-T1:REM OFFSET FORM BORDER.
22950 X=INT(WF*(XJ+XM+M5(L,1)+T2))
23000 REM FINISH X
23050 REM CHECK FOR REVERSE
```

```
23100 IF SR=CHR$(1) THEN X=(INT(X9*WF))-X
23150 REM CALCULATE Y
23200 Y=INT(WF*(YJ+YM++M5(L,4)))
23250 REM OUTPUT A GOTO X,Y
23300 T2=INT(X/256)
23350 T1=X-(T2*256)
23400 T4=INT(Y/256)
23450 T3=Y-(T4*256)
23500 A=CHR$(162)+CHR$(176)+CHR$(T1)+CHR$(T2)+CHR$(T3)+C=R$(T4)
23550 POKE 16526,9
23600 Q=USR(VARPTR(A)):REM LOAD GOTO
23650 IF PP=1 THEN PRINT"PD3(";P;L;L9;")";X,Y
23700 RETURN
23750 REM
23800 REM INPUT A LAYOUT
23850 A=A
23900 B4=CHR$(91)+"ERROR"
23950 Q2=.0005:Q3=0:LM=L9-1:L=0
24000 CLS
24050 GOSUB 10000:CU=64
24100 IF LP=1 THEN PRINT@964,"*** NEW LAYOUT ENTRY"; ELSE PRINT@966,"*** LAYOUT CHANGE";
24150 PRINT " - PRESS BREAK FOR EARLY EXIT ***";
24200 IF LP=0 THEN Q1=L9 ELSE Q1=0
24250 PRINT@CU,"NO. LINES= ";:GOSUB 11450:IF L9=INT(Q1):IF L9=L8+1 THEN PRINT@CU+1,;USING"##";L9;:
GOTO 24300 ELSE PRINT@CU+10,B5:PRINT@CU+75,B4;:GOTO 24250
24300 IF LP=1 THEN GOSUB 12250
24350 CQ=0:PRINT@CU+75,B5;:Q1=Y9:PRINT@CU+13,"   PLATE HEIGHT= ";:GOSUB 11450:IF CN=1 THEN RETURN ELSE Y9=Q1:IF Y9>0 AND Y9<=T<=EN
       PRINT@CU+30,USING B3;Y9;:GOTO 24400 ELSE PRINT@CU+94,B4;:GOTO 24350
24400 PRINT@CU+30,USING B3;Y9:PRINT@CU+36,"    PLATE WIDTH= ";:GOSUB 11450:IF CN=1 THEN RETURN ELSE X9=Q1:IF X9>0 AND X9<=XF <=T<=EN
CU+52,USING B3;X9:GOTO 24450 ELSE PRINT@CU+116,B4;:GOTO 24400
24450 PRINT@CU+116,B5;:PRINT
24500 PRINT B1,B2
24550 FOR L=0 TO L9-1
24600 IF L=0 THEN LQ=0 ELSE LQ=LP:IF L>LM THEN LQ=1:REM PREVIOUS PICKUP NO.
24650 GOSUB 1100:IF CU>=960 THEN PRINT:CU=CU-64
24700 PRINT@CU+5,,USING"##";L+1
24750 Q2=.0005:Q1=M5(L-LQ,0):PRINT@CU+9,"";:GOSUB 11450:IF CN=1 THEN RETURN ELSE M5(L,0)=Q1:IF Q1>0 AND Q1<= Y9 THEN PRINT@CU+9,USI
G. B3;:Q1;: GOTO 24800 ELSE PRINT@CU+73,B5;:GOTO 24750
24800 Q2=0:PRINT@CU+17,USING B3;Q1;:PRINT@CU+17,"";:GOSUB 11450:IF CN=1 THEN RETURN ELSE M5(L,1)=Q1:IF Q1>=-2 AND Q1<= X9 THEN PR
INT@CU+17,USING B3;Q1;B5;:GOTO 24850 ELSE PRINT@CU+81,B4;:GOTO 24800
24850 PRINT@CU+25,USING B3;Q1;:PRINT@CU+25,"";:GOSUB 11450:IF CN=1 THEN RETURN ELSE M5(L,2)=Q1:IF Q1>=0 AND Q1<=X9-M5(L,1) THEN
       PRINT@CU+25,USING B3;Q1;B5;:GOTO 24900 ELSE PRINT@CU+89,B4;:GOTO 24850
24900 PRINT@CU+33,USING B3;Q1;:PRINT@CU+33,"";:GOSUB 11450:IF CN=1 THEN RETURN ELSE M5(L,3)=Q1:IF Q1>=-N5(L,2) AND Q1<=Y9-M5(L,0) T<=N
24950 PRINT@CU+33,USING B3;Q1;B5;:GOTO 24950 ELSE PRINT@CU+97,B4;:GOTO 24900
24950 PRINT@CU+43,B5;:PRINT@CU+43,"";:GOSUB 11450:IF CN=1 THEN RETURN ELSE M5(L,3)=Q1:IF Q1>=-3 THEN PR
NT@CU+42,M5(L,3)=0 THEN PRINT "(CENTER)" ELSE IF M5(L,3)=2 THEN PRINT "(L. HAND)" ELSE PRINT "(R. HAND)";
25000 IF M5(L,3)=1 THEN GOTO 25000 ELSE PRINT@CU+43,B5;:PRINT@CU+107,B4;:GOTO 24950
25050 PRINT@CU+107,B5;:PRINT@CU+64,"";:NEXT L
25100 RETURN
25150 REM
25200 REM AUTOMATIC LAYOUT GENERATION
25250 REM
25300 A=A
25350 CLS:PRINT@983,"*** AUTOMATIC LAYOUT ***";
```

```
25352 LT=0:Y7=0:X7=0:MP=0:MQ=0:REM TO CAUSE ERROR INPUTS
25400 GOSUB 10000:REM STATUS LINE
25450 PRINT
25470 ON ERROR GOTO 28710
25500 INPUT "NUMBER OF LINES";LT
25505 IF LT<1 OR LT>LB+1 THEN 25500
25550 INPUT "PLATE HEIGHT";Y7
25555 IFY7<=0 OR V7>YT THEN 25550
25600 INPUT "PLATE WIDTH";X7
25605 IF X7<=0 OR X7>XT THEN 25600
25650 INPUT "PERCENT WHITE SPACE";MP
25652 IF MP<1 OR MP>99 THEN 25650
25700 IF LT=1 THEN M2(0)=0:M1(0)=1:GOTO 26250
25750 INPUT "MARGIN MULTIPLIER";MQ:MQ=MQ*100
25752 IF MQ<1 OR MQ>1000 THEN 25750
25800 PRINT:PRINT "LINE RATIOS:"
25900 FOR L=0 TO LT-1
25902 M1(L)=0
25950 PRINT "LINE";L+1;
26000 INPUT " ";M1(L)
26050 IF M1(L)<=0 THEN 25950
26200 NEXT L
26250 ON ERROR GOTO 0
26300 MZ=0:FOR L=0 TO  LT-1:MZ=MZ+M1(L):NEXT L:REM TOTAL RATIO NUMBERS
26450 MA=((100-MP)/100)*Y7:REM AVAILABLE INCHES FOR LINES
26500 MG=MA
26550 REM ASSIGN FINAL LINE HEIGHTS TO M4(L,1)
26600 T1=MG/MZ:REM INCHES FOR RATIO NUMBERS
26650 MU=0
26700 FOR L=0 TO LT-1
26800 M4(L,1)=T1*M1(L):REM INCHES FROM A RATIO NUMBER
26850 IF L=0 OR L=LT-1 THEN T2=1 ELSE T2=2:REM ONLY HALF SPACES ON TOP & BOTTOM LINE
26900 MU=MU+(M4(L,1)/T2):REM TOTAL UP SPACE POINTS
26950 NEXT L
27000 REM CALCULATE SPACES
27050 IF LT=1 THEN MT=(MP/200)*Y7:MB=MT:GOTO 27250  ELSE T1=MU/(LT-1):REM AVERAGE SPACE POINTS BETWEEN LINES
27150 T2=MU+(2*(MQ/100)*T1):REM TOTAL SPACE POINTS
27150 T3=(Y7-MA)/T2:REM MULTIPLIER
27200 MT=T1*(MQ/100)*T3:MB=MT:REM TOP & BOTTOM MARGINS
27250 ML=MT:MR=MT:REM LEFT & RIGHT MARGINS
27300 T1=T3:REM MULTIPLIER
27350 FOR L=0 TO LT-1
27400 IF L=0 THEN 27450 ELSE M4(L,0)=T1*M4(L,1)/2:REM TOP OF LINE SPACE
27450 IF L=LT-1 THEN 27500 ELSE M4(L,2)=T1*M4(L,1)/2:REM BOTTOM SPACE
27500 NEXT L
27550 REM PUT OUT A PLATE
27600 C9=0:L9=LT:X9=X7:Y9=Y7:REM NO.,LINES,WIDTH,HEIGHT
27650 T1=MT:REM START YAXIS WITH TOP MARRGIN
27700 FOR L=0 TO L9-1
27750 M5(L,0)=M4(L,1):REM LINE HEIGHT
27800 M5(L,1)=ML:M5(L,2)=MR:REM LEFT & RIGHT MARGINS
27850 M5(L,3)=1:REM JUSTIFICATION
```

```
27900 T1=T1+M4(L,0)+M4(L,1):REM UPPER SPACE+LINE HEIGHT
27950 IF L>0 THEN T1=T1+M4(L-1,2):REM LOWER SPACE AFTER LINE "0"
28000   M5(L,4)=T1:REM DISTANCE FROM TOP
28050 NEXT L
28100   RETURN
28150 REM
28200 REM MAIN MENU INPUT
28250 REM
28300 CLS:PRINT@976,"*** SYSTEM PARAMETER CHANGE ***";:GOSUB 100000
28350 PRINT:PRINT"AUTOCONDENSE EQUALIZATION"
28400 PRINT "0=NONE, 2 1=EQUAL HEIGHT LIN3 S ES, 2=ALL LINES (";.A;") ;";:GOSUB 11450:IF A="" THEN 28450 ELSE IF Q=0 OR Q=1 OR Q=
2 THEN LA=Q ELSE 28350
28450 IF CN=1 THEN RETURN
28500 PRINT:PRINT"0=NORMAL, 1=REVERSE ENGRAVING (";ASC(SR);") ";:GOSUB 11450:IF A="" THEN 28550 ELSE IF Q=0 OR Q=1 THEN SR=CHR$(
Q) ELSE 28500
28550 IF CN=1 THEN RETURN
28600 RETURN
28650 REM
28700 REM
28710 RESUME 0:REM ENDS ERROR RETURN
28750 REM
28800 REM
28850 REM PROGRAM CONSTANTS
28900 REM SPEED VARIABLES
28950 L=0:Q=0:Q1=0:CN=0:CU=0:L9=0:LS=0:P=0:T1=0:T2=0:T3=0:T4=0
29000 WF=800 :REM FUDGE FACTOR FOR .001 STEPS (STEPS PER INCH)
29050 WG=1000/WF:REM FUDGE %
29100 L6=0:REM MAX NO OF PLATES
29150 L7=4:REM MAX NO OF SUB LINES
29200 L8=19:REM MAX NO OF LINES
29250 XJ=0:XM=0:YJ=.7   :YM=0:REM X & Y JIG & MULTI-UP OFFSETS
29300 XT=8:YT=6:REM TABLE SIZE
29350 DIM M5(L8,4):REM THIS IS THE OLD L5 FIELD
29400 DIM S(L6,L8,L7)
29450 DIM LX(L6,L8):REM LX(P,L) HOLDS THE MAX NO OF SUB LINES USED
29500 DIM LC(L6,L8):REM HOLDS CHARACTER COUNT FOR LINES
29550 DIM M1(L8),M4(L8,2):REM TEMP FIELDS FOR AUTO LAYOUT
29600 DIM WP(L6,L8):REM HOLDS THE LINE % TO USE AGAINST THE FONT WIDTH &'S
29650 DIM W(L6,L8):REM SAVES THE UNSQUEEZED LINE LENGTH
29700 B$=STRING$(50,0):REM SET UP BASIC STRING FIELD
29750 Z=16526:REM LSB USR POKE ADDRESS
29800 ZL=ZA+60:REM U/L CASE LOCK ALSO BASIC DATA STARTING ADDRESS
29850 ZK=ZL+2:REM VALID CHARACTER? 0=OK; 255=NOT FOUND
29900 ZI=ZL+4:REM ITALIC NO. 0=NO; APROX 4=YES
29950 ZC=ZL+5:REM COUNT OF NON-BLANK NUMBERS
30000 ZM=ZL+6:REM MESSAGE ADDRESS
30050 POKE ZM,255:REM RESET INPUTTING FOR FONT TABLE INPUT
30100 POKE Z,3:Q=USR(0):REM INITIALIZE KEYBOARD PATCH
30150 POKE 16414,6:POKE 16415,ZB:REM SET VIDEO PATCH ADDRESS
30200 FF=3:REM NUMBER OF FONTS IN SYSTEM
30250 AD=" 100F1N :"
30300 LA=1:REM AUTOCONDENSING EQUALIZATION FACTOR
30350 S$=STRING$(5,255):REM TERMINATOR
```

```
30400 SR=CHR$(0):REM REVERSE SWITCH CHR$(0)=NO    CHR$(1)=YES
30450 REM LOAD FONT TABLE COMMAND AND GO GET IT
30500 Q=INP(222):REM INITIALIZE THE INPUT PORT
30550 GOTO 30750
30600 B=CHR$(179)+CHR$(FF)+STRING$(5,255)
30650 POKE Z,9:Q=USR(VARPTR(B))
30700 POKE Z,12:Q=USR(FF)
30750 POKE ZM,0
30800 B1="    LINE  LETTER   L HAND   R HAND    FROM      TYPE OF"
30850 B2="     NO.  HEIGHT   MARGIN   MARGIN     TOP    JUSTIFICATION"
30900 B3="##,###"
30950 B4=CHR$(91)+"ERROR"
30955 B5="      "
31000 GOTO 4200
31050 DATA 320,2,1,3,,2,,15,,15,,625,1,,135,,15,,-5,,885,1,999
31250 DATA 11,1,,5,2,,15,,1,,1,,32,1,999
31300 DATA 21,1,,625,2,,5,,18,,12,,12,,39,1,999
31350 DATA 22,2,,625,2,,5,,17,,12,,12,,28,1,,12,,12,,51,1,999
31400 DATA 31,1,,75,3,,25,,15,,15,,35,1,,13,,15,,62,1,999
31450 DATA 32,2,,75,3,,2,,15,,15,,31,1,,17,,15,,15,,61,1,999
31500 DATA 37,2,,75,3,,17,,15,,15,,31,1,,17,,15,,15,,61,1,999
31550 DATA 41,1,1,3,,25,,15,,15,,62,1,999
31600 DATA 42,1,1,3,,25,,15,,15,,46,1,,15,,15,,15,,8,1,999
31650 DATA 43,3,1,3,,23,,15,,15,,37,1,,13,,15,,63,1,,13,,15,,-5,,86,1,999
31700 DATA 44,4,1,3,,19,,15,,15,,31,1,,12,,15,,51,1,,12,,15,,71,1,,12,,15,,-5,,86,1,999
31750 DATA 48,3,1,3,,17,,15,,15,,31,1,,15,,15,,58,1,,15,,15,,91,1,999
31950 DATA 9999
40000 GOOD LOAD
FA00                   ORG    0FA00H
FA00  C38AFA   START   JP     KEYBD
FA03  C346FB           JP     INIT
FA06  C351FB           JP     CRT
FA09  C36FFB           JP     LOAD
FA0C  C389FB           JP     FTTBL
FA0F  C389FB           JP     FTCHG   ;CHANGE FONT
FA12  C3DDFB           JP     LENGTH
FA15  C324FC           JP     GET
FA18  C367FC           JP     CTIN    ;LOAD LINE COUNT ADDRESS
FA1B  C3ADFC           JP     LINE    ;INPUT A SUB-LINE
FA1E  C3D6FC           JP     LINEL   ;USE TO CONTINUE LINE
FA21  C345FA           JP     ASSM    ;TOTAL THIS PROGRAM
FA24  C351FA           JP     BASIC   ;TOTAL BASIC PGM
0015                   DEFS   21
FA3C  00                DEFB   0
FA3D  FF       LOCK     DEFB   0FFH
FA3E  FF       BRKEY    DEFB   0FFH
FA3F  01       OK       DEFB   1
FA40  00       FONT     DEFB   0
FA41  00       ITALIC   DEFB   0
FA42  FF       COUNT    DEFB   0FFH
FA43  00       MESS     DEFB   0
                STRCT            ;COUNT OF BYTES IN INPUT STRING
```

```
FA44  00              024400  STRCH   DEFB    0               ;0=REG LINE INPUT, >0 MEANS USE THIS CHAR FIRST
                      024500          ;
                      024600          ;
                      024700          ;CALL ASSEMBLY BYTE TOTAL
FA45  21BAFA          024800  ASSM    LD      HL,KEYBD
FA48  1168FD          024900          LD      DE,XXX          ;NOP END         ;BEG
FA4B  CD61FA          030000          CALL    TOTA
FA4E  C39A0A          030100          JP      0A9AH           ;TOTAL TO BASIC
                      030200          ; CALL BASIC PROGRAM TOTAL
FA51  2AA440          033000  BASIC   LD      HL,(40A4H)      ;POINTER TO BEGINNING OF BASIC
FA54  ED5BF940        033400          LD      DE,(40F9H)      ;POINTER TO NEXT AVAIL. LINE
FA58  1B              033500          DEC     DE
FA59  1B              033600          DEC     DE
FA5A  1B              033700          DEC     DE              ;00 OF LAST LINE
FA5B  CD61FA          033800          CALL    TOTA            ;TOTAL TO BASIC
FA5E  C39A0A          033900          JP      0A9AH           ;TOTAL TO BASIC
                      040000          ; PROGRAM BYTE TOTAL ROUTINE
                      040100          ;ENTER WITH FIRST BYTE IN HL, LAST IN DE
                      040200          ; SHIFTS HL LEFT AFTER EACH ADD
                      040300          ;RETURNS TO BASIC WITH TOTAL IN HL
FA61  010000          044400  TOTA    LD      BC,0            ;CLEAR TOTAL
FA64  ED4374FD        044500          LD      (TOTAL),BC
FA68  4E              044600  TOTB    LD      C,(HL)          ;GET BYTE
FA69  E5              044700          PUSH    HL
FA6A  2A74FD          044800          LD      HL,(TOTAL)      ;GET TOTAL
FA6D  09              044900          ADD     HL,BC           ;ADD BYTE
FA6E  CB04            050000          RLC     H               ;SET CARRY TO H, BIT 7
FA70  CB0C            050100          RRC     H               ;NOW ROTATE HL
FA72  CB15            050200          RL      L
FA74  CB14            050300          RL      H
FA76  2274FD          050400          LD      (TOTAL),HL      ;SAVE TOTAL
FA79  E1              055500          POP     HL
FA7A  7C              055600          LD      A,H
FA7B  92              055700          SUB     D
FA7C  2008            055800          JR      NZ,NOT          ;DOES ADDR=LAST
FA7E  7D              055900          LD      A,L
FA7F  93              060000          SUB     E
FA80  2004            061100          JR      NZ,NOT          ;CHECK LSB
FA82  2A74FD          062200          LD      HL,(TOTAL)      ;WAY OUT-LOAD TOTAL
FA85  C9              063300          RET
FA86  23              064000  NOT     INC     HL              ;TO NEXT BYTE
FA87  C368FA          064500          JP      TOTB
                      066600          ;
                      066700          ;
                      066800          ; KEYBOARD INPUT ROUTINE
FA8A  2142FA          069000  KEYBD   LD      HL,MESS         ;GET CURRENT MESSAGE LETTER
FA8D  7E              070000          LD      A,(HL)
FA8E  FEFF            071100          CP      0FFH            ;STOP INPUTTING CODE
FA90  280D            072200          JR      Z,NOMES
FA92  DBDE            073300          IN      A,(0DEH)        ;COMM PORT
FA94  BE              074400          CP      (HL)            ;IS IT THE SAME
FA95  2808            075500          JR      Z,NOMES         ;DON'T DISTURB THE DISPLAY
```

```
                                                        ;"FREEZE UP" STATUS LINE FIX FOR V1.3 3/17/81

FA97  FEFF      07610            CP     0FFH         ;TEST FOR (SPURIOUS) FF FROM 8080
FA99  2804      07620            JR     Z,NOMES      ;DONT STUFF AN FF BECAUSE IT WILL
FA9B  323C3C    07700            LD     (3C3CH),A    ;PUT IT ON THE SCREEN
FA9E  77        07780            LD     (HL),A       ;SAVE THE NEW ONE
FA9F  D5        07900  NOMES     PUSH   DE
FAA0  C5        08000            PUSH   BC
FAA1  FDE5      08100            PUSH   IY
FAA3  CDE303    08200            CALL   03E3H
FAA6  E67F      08300            AND    7FH
FAA8  CA41FB    08400            JP     Z,OUT        ;DO NOTHING IF NO CHARACTER
FAAB  FE61      08500            CP     61H
FAAD  3808      08600            JR     C,UTEST
FAAF  FE7B      08700            CP     7BH
FAB1  3004      08800            JR     NC,UTEST
FAB3  D620      08900            SUB    20H
FAB5  1812      09000            JR     NEXTA
FAB7  5F        09100  UTEST     LD     E,A
FAB8  3A3CFA    09200            LD     A,(LOCK)     ;0=UPPER CASE LOCK
FABB  B7        09300            OR     A
FABC  7B        09400            LD     A,E
FABD  280A      09500            JR     Z,NEXTA
FABF  FE41      09600            CP     41H
FAC1  3806      09700            JR     C,NEXTA
FAC3  FE5B      09800            CP     5BH
FAC5  3002      09900            JR     NC,NEXTA
FAC7  C620      10000            ADD    A,20H
FAC9  FE10      10100  NEXTA     CP     1AH
FACB  2002      10200            JR     NZ,$+4
FACD  3E0A      10300            LD     A,0AH        ;REPLACE SHIFT DOWN ARROW
FACF  FE0A      10400            CP     0AH          ;DOWN ARROW=CHG. LOCK
FAD1  2017      10500            JR     NZ,NEXTB
FAD3  3A3CFA    10600            LD     A,(LOCK)
FAD6  2F        10700            CPL
FAD7  323CFA    10800            LD     (LOCK),A     ;SET FLAGS
FADA  B7        10900            OR     A
FADB  2005      11000            JR     NZ,$+7       ;TEST FOR UC LOCK OR NO
FADD  215543    11100            LD     HL,4355H     ;"UC"
FAE0  1803      11200            JR     $+5
FAE2  212020    11300            LD     HL,2020H     ;"  "
FAE5  223E3C    11400            LD     (3C3EH),HL   ;UPPER RIGHT CORNER OF VIDEO
FAE8  3E11      11500            LD     A,11H
                  11600  ; REPLACE UNWANTED CHARACTERS
FAEA  FE01      11700  NEXTB     CP     01           ;BREAK
FAEC  2002      11800            JR     NZ,NOBRK
FAEE  2A8038    11900            LD     HL,(3880H)
FAF1  BE        12000            CP     (HL)         ;IS SHIFT ON
FAF2  2808      12100            JR     Z,NOBRK      ;SHIFT BREAK IS ALWAYS 01 CODE
FAF4  213DFA    12200            LD     HL,BRKEY
FAF7  BE        12300            CP     (HL)
FAF8  2002      12400            JR     NZ,$+4
FAFA  3E10      12500            LD     A,10H        ;REPLACE BREAK IF MATCH TO "BRKEY"
FAFC  FE5B      12600  NOBRK     CP     5BH
FAFE  2002      12700            JR     NZ,$+4
```

```
                                    LD      A,0BH       ;REPLACE LF ARROW
                                    CP      ...
                                    JR      NZ,$-...
FB06  3E0C                          LD      A,0CH       ;REPLACE SHIFT RT. ARROW
FB03  FE09                          CP      09
FB0A  2002                          JR      NZ,$-...
FB0C  3E12                          LD      A,12H       ;REPLACE RIGHT ARROW
FB0E  FE1B                          CP      1BH
FB10  2002                          JR      NZ,$+4
FB12  3E0B                          LD      A,0BH       ;REPLACE SHIFT UP ARROW
FB14  FE18                          CP      18H
FB16  2002                          JR      NZ,$+4
FB18  3E08                          LD      A,08H       ;REPLACE SHIFT LEFT ARROW
                          ; SEARCH TABLE FOR CHARACTER & SET "OK"=0 IF FOUND
FB1A  3273FD                        LD      (SAVE),A
FB1D  D620                          SUB     20H
FB1F  3F                            CCF
FB20  3013                          JR      NC,SETNO
FB22  2A7...FD                      LD      HL,(CTBL)
FB25  5F                            LD      E,A
                                    LD      D,12
FB26  1600                          LD      HL,DE       ;SET UP BYTE JUMP
FB28  19                            ADD     HL,DE
FB29  7E                            ADD     A,...       ;MSB CHARACTER IN TABLE
FB2A  FEFF                          LD      A,...       ;MSB CHARACTER WIDTH
FB2B                                CP      0FFH        ;FF MEANS NOT IN TBL
FB2D  200A                          JR      NZ,SETYE
FB2F  2...                          INC     ...
                                    LD      A,...
FB30  7E                            CP      0FFH        ;BOTH MUST BE FF TO BE INVALID
FB31  FEFF
FB33  2004                          JR      NZ,SETYE
FB35  3EFF              SETNO       LD      A,0FFH      ;NOT FOUND
FB37  1802                          JR      $+4
FB39  3E00              SETYE       LD      A,0         ;OK=GOOD
FB3B  323EFA            OUT         LD      (OK),A
FB3E  3A73FD                        LD      A,(SAVE)    ;REPLACE CHARACTER
FB41  FD...                         POP     IY
FB43  C...                          POP     BC
FB44  D1                            POP     DE
FB45  C9                            RET
                          ; INITIALIZATION
FB46  2100FA            INIT        LD      HL,START
FB49  22164D                        LD      (4016H),HL
FB4C  97                            SUB     A
FB4D  323CFA                        LD      (LOCK),A    ;INIT UC LOCK ON
FB50  C9                            RET
                          ; VIDEO OUTPUT ROUTINE
FB51  DD6E03            CRT         LD      L,(IX+3)
FB54  DD6604                        LD      H,(IX+4)
FB57  DA9A04                        JP      C,049AH
FB5A  DD7E05                        LD      A,(IX+5)
FB5D  B7                            OR      A
FB5E  2801                          JR      Z,$+3
FB60  77                            LD      (HL),A
```

```
FB61  79          17800              LD    A,C
FB62  FE20        17900              CP    20H
FB64  DA0605      18000              JP    C,0506H
FB67  FE80        18100              CP    80H
FB69  D2A604      18200              JP    NC,04A6H
FB6C  C37D04      18300              JP    047DH
                  18400  ; LOAD STRING TO THE 8080
FB6F  CD7F0A      18500  LOAD        CALL  0A7FH     ; LOAD VARTPR TO H,L
FB72  46          18600              LD    B,(HL)    ; STRING LENGTH
FB73  23          18700              INC   HL
FB74  5E          18800              LD    E,(HL)    ; LSB STRING ADDRESS
FB75  23          18900              INC   HL
FB76  56          19000              LD    D,(HL)    ; MSB
FB77  EB          19100              EX    DE,HL
FB78  CD39FC      19200              CALL  BREAK
FB7B  DBDF        19300  OUTB0       IN    A,(0DFH)  ; STATUS
FB7D  E602        19400              AND   2
FB7F  20F7        19500              JR    NZ,OUTB0
FB81  7E          19600              LD    A,(HL)    ; GET BYTE
FB82  D3DE        19700              OUT   (0DEH),A  ; COMM PORT
FB84  23          19800              INC   HL
FB85  05          19900              DEC   B
FB86  20F0        20000              JR    NZ,OUTB0
FB88  C9          20100              RET
                  20200
                  20300  ; GET THE FONT WIDTH TABLE
                  20400  ; USR MUST PROVIDE THE NUMBER OF FONTS
FB89  CD7F0A      20500  FTTBL       CALL  0A7FH     ; LOAD NO. FONTS TO H,L FROM USR
FB8C  CD39FC      20600  INFT        CALL  BREAK
FB8F  DBDE        20700              IN    A,(0DEH)
FB91  FE83        20800              CP    083H      ; COMM PORT
FB93  20F7        20900              JR    NZ,INFT   ; BLUFF TILL THIS SHOWS
FB95  7D          21000              LD    A,L       ; NOW GET THE NO OF FONTS
FB96  01C300      21100              LD    BC,195    ; (196*2)+3
FB99  110000      21200              LD    DE,0
FB9C  2185FD      21300              LD    HL,TABLE-1
FB9F  09          21400              ADD   HL,BC
FBA0  EB          21500  ADDIT       EX    DE,HL
FBA1  09          21600              ADD   HL,BC
FBA2  EB          21700              EX    DE,HL
FBA3  3D          21800              DEC   A
FBA4  20F9        21900              JR    NZ,ADDIT  ; FONT COUNT-1
FBA6  CD39FC      22000              CALL  BREAK
FBA9  DBDF        22100  INB0        IN    A,(0DFH)  ; STATUS
FBAB  E601        22200              AND   1
FBAD  20F7        22300              JR    NZ,INB0
FBAF  DBDE        22400              IN    A,(0DEH)  ; GET IT
FBB1  77          22500              LD    (HL),A    ; PUT IT
FBB2  2B          22600              DEC   HL        ; NEXT PUT ADDRESS
FBB3  1B          22700              DEC   DE        ; BYTE COUNT-1
FBB4  7A          22800              LD    A,D
```

| | | | | | |
|---|---|---|---|---|---|
| FBB5 | B3 | | | OR | E |
| FBB6 | 20EE | | | JR | NZ,FCH0 ;GO FOR MORE IF NOT 0 |
| FBB8 | C9 | 23300 | | RET | |
| | | 23400 | ; | | |
| | | 23500 | ;ROUTINE TO CHANGE FONTS | | |
| | | 23600 | ; | | |
| FBB9 | CD7F0A | 23700 | FTCHG | CALL | 0A7FH ;LOAD FONT NO FROM USR |
| FBBC | 7D | 23800 | | LD | A,L |
| FBBD | 11C300 | 23900 | | LD | DE,195 ;BYTES PER FONT |
| FBC0 | 2186FD | 24000 | | LD | HL,TABLE ;BEGINNING ADDRESS |
| FBC3 | 3C | 24100 | | INC | A |
| FBC4 | 3D | 24200 | | DEC | A |
| FBC5 | 2803 | 24300 | | JR | Z,MDONE ;STOP ADDING |
| FBC7 | 19 | 24400 | | ADD | HL,DE ;GET ONE FONT OVER |
| FBC8 | 18FA | 24500 | | JR | $-4 ;SAVE ADDRESS |
| FBCA | 2271FD | 24600 | MDONE | LD | (CTB),HL |
| FBCD | 11C000 | 24700 | | LD | DE,192 |
| FBD0 | 19 | 24800 | | ADD | HL,DE |
| FBD1 | 7E | 24900 | | LD | A,(HL) |
| FBD2 | 3240FA | 25000 | | LD | (CTHAL),A ;MSB STANDARD HEIGHT |
| FBD5 | 23 | 25100 | | INC | HL |
| FBD6 | 56 | 25200 | | LD | D,(HL) |
| FBD7 | 23 | 25300 | | INC | HL |
| FBD8 | 5E | 25400 | | LD | E,(HL) |
| FBD9 | EB | 25500 | | EX | DE,HL ;STD. HEIGHT TO BASIC |
| FBDA | C3A0A | 25600 | | JP | 0A0AH ;RETURN TO BASIC |
| | | 25700 | ; | | |
| | | 25800 | ;ROUTINE TO GET THE TOTAL CHARACTER WIDTH OF A STRING | | |
| | | 25900 | ; | | |
| FBDD | CD7F2A | 26000 | LENGTH | CALL | 0A7FH ;LOAD VARPTR TO LH (STRING ADDRESS) |
| FBE0 | 7E | 26100 | | LD | A,(HL) ;STRING LENGTH |
| FBE1 | D609 | 26200 | | SUB | 9 ;GET AROUND FONT DESIGNATION @ BEG. OF STRING |
| FBE3 | 47 | 26300 | | LD | B,A |
| FBE4 | 0E00 | 26400 | | LD | C,0 ;CLEAR NON SPACE COUNT |
| FBE6 | 23 | 26500 | | INC | HL |
| FBE7 | 5E | 26600 | | LD | E,(HL) ;LSB STRING ADDRESS |
| FBE8 | 23 | 26700 | | INC | HL |
| FBE9 | 56 | 26800 | | LD | D,(HL) ;MSB |
| FBEA | 210000 | 26900 | | LD | HL,0 ;HL NOW FREE TO |
| FBED | 2274FD | 27000 | | LD | (TOTAL),HL ;CLEAR TOTAL |
| FBF0 | EB | 27100 | | EX | DE,HL ;HL NOW HAS BEG. OF STRING ADDRESS |
| FBF1 | 1E09 | 27200 | | LD | E,9 ;SKIP FIRST NINE IN STRING |
| FBF3 | 19 | 27300 | | ADD | HL,DE |
| FBF4 | 7E | 27400 | MCHAR | LD | A,(HL) ;GET CHAR. FROM STRING |
| FBF5 | D620 | 27500 | | SUB | 20H ;GET TO WHAT FONT TABLE INDEX NEEDS |
| FBF7 | 2809 | 27600 | | JR | Z,NOCT |
| FBF9 | FE1C | 27602 | | CP | 1CH |
| FBFB | 2805 | 27604 | | JR | Z,NOCT |
| FBFD | FE1E | 27606 | | CP | 1EH |
| FBFF | 2801 | 27608 | | JR | Z,NOCT |
| FC01 | 0C | 27700 | | INC | C ;COUNT OFF NON-SPACE CHARACTERS |
| FC02 | 5F | 27800 | NOCT | LD | E,A |
| FC03 | 1600 | 27900 | | LD | D,0 ;SET UP ADDER |

```
FC05  E5           28000            PUSH  HL         ;SAVE STRING ADDRESS
FC06  2A71FD       28100            LD    HL,(CTBL)  ;BEGINNING OF FONT
FC09  19           28200            ADD   HL,DE
FC0A  19           28300            ADD   HL,DE      ;HL NOW HAS CHAR. WIDTH ADDRESS IN TABLE
FC0B  5E           28400            LD    E,(HL)     ;LSB WIDTH
FC0C  23           28500            INC   HL
FC0D  56           28600            LD    D,(HL)     ;MSB
FC0E  2A74FD       28700            LD    HL,(TOTAL) ;NOW GET COUNT IN HL
FC11  19           28800            ADD   HL,DE      ;ADD CHARACTER WIDTH TO TOTAL
FC12  2274FD       28900            LD    (TOTAL),HL ;SAVE TOTAL FOR NOW
FC15  E1           29000            POP   HL         ;GET STRING ADDRESS BACK
FC16  23           29100            INC   HL         ;NEXT CHAR.
FC17  05           29200            DEC   B          ;TOTAL IN STRING-1
FC18  20DA         29300            JR    NZ,MCHAR
FC1A  79           29400            LD    A,C        ;NON-SPACE COUNT
FC1B  3241FA       29500            LD    (COUNT),A
FC1E  2A74FD       29600            LD    HL,(TOTAL) ;FOR BASIC
FC21  C39A0A       29700            JP    0A9AH      ;RETURN TO BASIC
                   29800     ; GET A NUMERIC STRING USING BASIC ROM
FC24  CD7F0A       29900     GET    CALL  0A7FH      ;GET VARPTR TO HL
FC27  46           30000            LD    B,(HL)     ;STRING LENGTH
FC28  E5           30100            PUSH  HL
FC29  23           30200            INC   HL
FC2A  5E           30300            LD    E,(HL)     ;LSB STRING ADDRESS
FC2B  23           30400            INC   HL
FC2C  56           30500            LD    D,(HL)     ;MSB
FC2D  EB           30600            EX    DE,HL      ;HL NOW HAS STRING ADDRESS
FC2E  CDD905       30700            CALL  5D9H       ;ROM INPUT ROUTINE
FC31  E1           30800            POP   HL
FC32  70           30900            LD    (HL),B     ;NEW STRING LENGTH
FC33  2600         31000            LD    H,0
FC35  6F           31100            LD    L,A        ;TERMINATOR
FC36  C39A0A       31200            JP    0A9AH      ;LOAD TERM TO FUNCTION
                   31300     ;
                   31400     ;
                   31500     ;ROUTINNE TO CHECK FOR BREAK & EXIT TO BASIC IF PRESSED
                   31600     ;
FC39  E5           31700     BREAK  PUSH  HL
FC3A  214038       31800            LD    HL,3840H   ;KEYBOARD ADDRESS FOR BREAK
FC3D  CB56         31900            BIT   2,(HL)     ;BIT FOR BREAK
FC3F  C21A1A       32000            JP    NZ,1A19H   ;BASIC REENTRY
FC42  E1           32100            POP   HL
FC43  C9           32200            RET
                   32300     ;
                   32400     ;
                   32500     ;PRINT COUNT TO THE VIDEO SCREEN
3C0E               32600     VIDEO  EQU   3C0EH
FC44  E5           32700     PRTCT  PUSH  HL
FC45  D5           32800            PUSH  DE
FC46  212020       32900            LD    HL,2020H   ;2 SPACES
FC49  220E3C       33000            LD    (VIDEO),HL ;CLEAR THE FIELD
FC4C  22103C       33100            LD    (VIDEO+2),HL
```

```
FC4F  2A6BFD        33300            LD      HL,(CT)      ;GET COUNT
FC52  CD9A0A        33400            CALL    0A9AH        ;ROM TO LOAD HL TO ACC
FC55  CDBD0F        33500            CALL    0FBDH        ;ROM TO MAKE A STRING
FC58  110E3C        33600            LD      DE,VIDEO
FC5B  7E            33700   PRTLP    LD      A,(HL)       ;HL HAS THE STRING ADDRESS
FC5C  B7            33800            OR      A
FC5D  2805          33900            JR      Z,POUT       ;STRING TERMINATES WITH A 0
FC5F  12            34000            LD      (DE),A       ;TO SCREEN
FC60  13            34100            INC     DE
FC61  23            34200            INC     HL
FC62  18F7          34300            JR      PRTLP
FC64  D1            34400   POUT     POP     DE
FC65  E1            34500            POP     HL
FC66  C9            34600            RET
              34700   ;
              34800   ;ROUTINE TO GET THE 'CT' ADDRESS AND THE COUNT FOR DISPLAY
FC67  CD7F0A        34900   CTIN     CALL    0A7FH        ;GET CT ADDRESS FROM VARPTR
FC6A  22BFFD        35000            LD      (CTADD),HL
FC6D  7E            35100            LD      A,(HL)
FC6E  326BFD        35200            LD      (CT),A
FC71  23            35300            INC     HL
FC72  7E            35400            LD      A,(HL)
FC73  326CFD        35500            LD      (CT+1),A
FC76  C9            35600            RET
              35700   ;
              35800   ;ROUTINE TO PUT THE 'CT' BACK
FC77  E5            35900   CTOUT    PUSH    HL
FC78  2A6BFD        36000            LD      HL,(CTADD)
FC7B  3A6BFD        36100            LD      A,(CT)
FC7E  77            36200            LD      (HL),A
FC7F  23            36300            INC     HL
FC80  3A6CFD        36400            LD      A,(CT+1)
FC83  77            36500            LD      (HL),A
FC84  E1            36600            POP     HL
FC85  97            36700            SUB     A
FC86  3244FA        36800            LD      (STRCH),A    ;CLEAR STRING CHAR FOR RETURN
FC89  3E0F          36900            LD      A,0FH        ;CURSOR OFF
FC8B  CD3300        37000            CALL    33H
FC8E  C39A0A        37100            JP      0A9AH        ;TO BASIC
              37200   ;
              37300   ;INCREMENT 'CT'
FC91  E5            37400   INCCT    PUSH    HL
FC92  2A6BFD        37500            LD      HL,(CT)
FC95  23            37600            INC     HL
FC96  226BFD        37700            LD      (CT),HL
FC99  E1            37800            POP     HL
FC9A  C9            37900            RET
              38000   ;
              38100   ;DECREMENT 'CT'
FC9B  E5            38200   DECCT    PUSH    HL
FC9C  2A6BFD        38300            LD      HL,(CT)
FC9F  2B            38400            DEC     HL
```

```
FCA0  7C           385500                    LD      A,H           ;CHECK MSB FOR NEGATIVE NUMBER
FCA1  E680         386500                    AND     80H
FCA3  2803         387500                    JR      Z,$+5
FCA5  210000       388500                    LD      HL,0          ;SET TO 0
FCA8  226BFD       389500                    LD      (CT),HL
FCAB  E1           390500                    POP     HL
FCAC  C9           391500                    RET
                   392500
                   393500
                   394500
                   395500  ;  LINE INPUT ROUTINE FOR MAIN ENGRAVING INPUT
FCAD  CD7F0A       396500  LINE       CALL   0A7FH         ;GET STRING PARAS FROM USR(VARPTR(STRING))
FCB0  3A44FA       397500          LD     A,(STRCH)
FCB3  B7           398500          OR     A
FCB4  2004         399500          JR     NZ,NO0        ;IF RETURNING CHAR, DO NOT CLEAR STRCT
FCB6  97           400100          SUB    A
FCB7  3243FA       401100          LD     (STRCT),A     ;WE MAKE IT ZERO
FCBA  3E0E         402100  NO0     LD     A,0EH
FCBC  CD3300       403100          CALL   33H           ;TURN ON CURSOR
FCBF  23           404100          INC    HL
FCC0  5E           405100          LD     E,(HL)        ;LSB
FCC1  23           406100          INC    HL
FCC2  56           407100          LD     D,(HL)        ;MSB STRING ADDRESS (BS)
FCC3  EB           408100          EX     DE,HL
FCC4  3A43FA       409100          LD     A,(STRCT)
FCC7  5F           410100          LD     E,A
FCC8  1600         411100          LD     D,0
FCCA  19           412100          ADD    HL,DE         ;POINT TO PLACE FOR NEXT CHARACTER
FCCB  2269FD       413100          LD     (STRAD),HL
FCCE  CD44FC       414100          CALL   PRTCT         ;INIT PRINTING OF COUNT
FCD1  3A44FA       415100          LD     A,(STRCH)     ;IF >0 THEN USE THIS FIRST
FCD4  1803         416100          JR     LINEL
FCD6  CD8AFA       417100  LINEL   CALL   KEYBD         ;OUT CHARACTER INPUT ROUTINE
FCD9  B7           418100          ORA    A
FCDA  28FA         419100          JR     Z,LINEL       ;0=NO LETTER NOW
FCDC  FE20         420100          CP     20H           ;IS IT A LETTER ABOVE 20H
FCDE  F22FFD       421100          JP     P,LETR
                   422300  ;CONTROL CODE ROUTINES
FCE1  FE02         423300          CP     02            ;2 IS USED AS RETURN BLUFF CODE
FCE3  CAD6FC       424500          JP     Z,LINEL
FCE6  FE08         425500          CP     08H           ;BACKSPACE
FCE8  203F         426500          JR     NZ,NX1
                   427500  ;BACKSPACE ROUTINE
FCEA  210050       428500  BKSP    LD     HL,5000H      ;WAIT FIRST TIME
FCED  226FFD       429500          LD     (WAIT),HL
FCF0  2143FA       430100          LD     HL,STRCT      ;STRING COUNR ADDR
FCF3  7E           431100          LD     A,(HL)        ;GET STRING COUNT
FCF4  B7           432100          OR     A
FCF5  2006         433100          JR     NZ,GT0        ;AT 0 COUNT, WE DON'T BACKSPACE HERE
FCF7  210800       434100          LD     HL,0008H      ;LET BASIC TAKE CARE OF IT
FCFA  C377FC       435100          JP     CTOUT         ;ROM USR LOAD RETURN
FCFD  35           436100  GT0     DEC    (HL)          ;STRING COUNT-1
```

| | | | | |
|---|---|---|---|---|
| FCFE | CD9BFC | | CALL | DECCT ;LINE COUNT-1 |
| FD01 | CD44FC | | CALL | PRTCT |
| FD04 | 2A69FD | | LD | HL,(STRAD) ;STRING ADDRESS |
| FD07 | 2B | | DEC | HL |
| FD08 | 2269FD | | LD | (STRAD),HL ;PUT NEXT LETTER N-1 |
| FD0B | 3E08 | | LD | A,08H ;BACKSPACE CODE |
| FD0D | CD3300 | | CALL | 33H ;ROM SCREEN ROUTINE |
| FD10 | 2A6FFD | ; MORE BACKSPACING? |  | |
| FD10 | 2A6FFD | | LD | HL,(WAIT) ;FOR ROM DELAY ROUTINE |
| FD13 | 3A4038 | KEY | LD A, | (3840H) ;KEYBD ADDR FOR BS |
| FD16 | E620 | | AND | 20H ;BS BIT |
| FD18 | CAD6FC | | JP | Z,LINE1 ;BS KEY UP SP GET ANOTHER CHAR |
| FD1B | 2B | | DEC | HL |
| FD1C | 7D | | LD | A,L |
| FD1D | B4 | | OR | H |
| FD1E | 20F3 | | JR | NZ,KEY |
| FD20 | 21000C | | LD | HL,0C00H |
| FD23 | 226FFD | | LD | (WAIT),HL ;CYCLE WAIT TIME |
| FD26 | C3F0FC | | JP | BKSP |
| FD29 | 6F | NX1 | LD | L,A |
| FD2A | 2600 | | LD | H,0 |
| FD2C | C377FC | | JP | CTOUT |
| FD2F | F5 | LETR | PUSH | AF |
| FD30 | 2143FA | | LD | HL,STRCT |
| FD33 | 7E | | LD | A,(HL) ;TEST STRING COUNT |
| FD34 | FE32 | | CP | 50 ;>50 MEANS LET BASIC HANDLE IT |
| FD36 | FA40FD | | JP | M,LT50 |
| FD39 | F1 | | POP | AF |
| FD3A | 6F | | LD | L,A ;GIVE CHAR TO BASIC |
| FD3B | 2600 | | LD | H,0 |
| FD3D | C377FC | | JP | CTOUT ;ROM USR LOAD RETURN |
| FD40 | 34 | | INC | (HL) ; STRING COUNT+1 |
| FD41 | 2A69FD | LT50 | LD | HL,(STRAD) |
| FD44 | F1 | | POP | AF |
| FD45 | 77 | | LD | (HL),A ;CHAR TO STRING |
| FD46 | 23 | | INC | HL |
| FD47 | 2269FD | | LD | (STRAD),HL ;STORE NEXT STRING ADDR |
| FD4A | 2A2040 | | LD | HL,(4020H) ;CURSOR ADDR |
| FD4D | 77 | | LD | (HL),A ;CHARACTER |
| FD4E | 23 | | INC | HL |
| FD4F | 365F | | LD | (HL),5FH ;CURSOR |
| FD51 | 222040 | | LD | (4020H),HL ;REPLACE ADDR |
| FD54 | CD91FC | | CALL | INCCT ;PLATE COUNT+1 |
| FD57 | CD44FC | | CALL | PRTCT ;DISPLAY IT |
| FD5A | 3A3EFA | | LD | A,(OK) ;CHECK IF FOUND IN TABLE |
| FD5D | B7 | | OR | A |
| FD5E | CAD6FC | | JP | Z,LINE1 ;3 IS CODE FOR NOT FOUND |
| FD61 | 2E03 | | LD | L,3 |
| FD63 | 2600 | | LD | H,0 |
| FD65 | C377FC | | JP | CTOUT ;LAST BYTE CHECKED BY TOTAL ROUTINE |
| FD68 | 00 | XXX | NOP | |
| FD69 | 0000 | STRAD | DEFW | 0 |

```
FD62  0000          49100  CT       DEFW    0
FD6D  0000          49200  CTADD    DEFW    0
FD6F  0000          49300  WAIT     DEFW    0
0002                49400  CTBL     DEFS    2          ;CURRENT FONT TABLE ADDRESS
0001                49500  SAVE     DEFS    1
0002                49600  TOTAL    DEFS    2
0010                49700           DEFS    10H        ;SPACE
0249                49800  TABLE    DEFS    585
FFCF  00            49900  ZZZZZ    DEFB    0
                    50000           END
00000 TOTAL ERRORS 0000                00020  DATE     EQU     0224H
0000                00040  *
0000                00060  *  DATE --- CHANGE EVERY ASSEMBLY
0000                00080  *
0000                00100  *        PGM5 PGM5 PGM5 PGM5 PGM5
0000                00120  *
0000                00140  *
0000                00160  *
0000                00180  * SYSTEM SWITCH
0000                00200  *  SET BUGS=0 FOR TRS-80 SYSTEM
0000                00220  *  SET BUGS=1 FOR SOL SYSTEM
0000                00240  BUGS     EQU     0
0000                00260  TRS      EQU     BUGS-1
0000                00280  * SET TSOL=1 FOR TRS-80 GET WITH BUGS IN SOL
0000                00300  TSOL     EQU     0
0000                00320  *        IF      BUGS
0000                00380  * SET SINGLE/MULTIPLE CHANGES HERE
0000                00400  * SET STAKS=0 FOR SINGLE; SET=TOP ADDRESS OF PSEUDO STACK FOR MULTIPLE
0000                00402  * SET=C3FFH FOR TESTING WITH 1K RAM IN CONTROL UNIT
0000                00420  STAKS    EQU     0FFFFH          FOR FULL 16K
0000                00440  *
0000                00460  * PROGRAM ORIGINS
0000                00480  *
0000                00500  *        IF      TRS
0000                00520  BIG      EQU     0
0000                00540  *        ENDIF
0000                00560  *        IF      BUGS
0000                00620  LIT      EQU     BIG+700H
0000                00640  SUB      EQU     LIT+480H
0000                00660  BR       EQU     SUB+680H
0000                00680  *
0000                00700  * COMMON EQUATES
0000                00720  *
0000                00740  PSW      EQU     6
0000                00760  STEPC    EQU     75
0000                00780  CTR0     EQU     0D0H
0000                00800  CTR1     EQU     0D1H
0000                00820  CTR2     EQU     0D2H
0000                00840  CTRXX    EQU     0D3H
0000                00860  S1POR    EQU     0DBH        SWITCH PORT 1
0000                00880  S2POR    EQU     0DCH        SWITCH PORT 2
0000                00900  MPORT    EQU     0DAH        MISC OUTPUT PORT
0000                00920  TPORT    EQU     0DEH        TRS-80 COMMUNICATION PORT
```

```
0000  0940  SPORT  EQU   0D7H      STATUS INPUT PORT
0000  0960  XPORT  EQU   0D8H      STEP X PORT
0000  0980  YPORT  EQU   0D9H      STEP Y PORT
0000  1000  FPORT  EQU   0FFH      FF PORT FOR NEW IMSAI TESTS
0000  1020  * CONSTANTS FOR SLEW ROUTINES
0000  1040  * TMUP-AMOUNT TO INCREASE TIMER NO. FOR SLOWING DOWN
0000  1060  TMUP   EQU   20
0000  1080  * (-)TMDN-AMOUNT TO DECREASE TIMER NO. FOR SPEEDING UP
0000  1100  TMDN   EQU   -20
0000  1120  * (-)TMHI-HIGEST COUNTER NUMBER FOR SLOWEST SPEED
0000  1140  TMHIP  EQU   3300
0000  1160  TMHI   EQU   -TMHIP
0000  1180  * (-)TMLOW-LOWEST COUNTER NUMBER FOR FASTEST SPEED
0000  1200  TMLOW  EQU   -425
0000  1220  * (-)DNBEG-COUNT AT WHICH SLOW DOWN IS TO BEGIN
0000  1240  DNBEG  EQU   -145
0000  1260  CLSB   EQU   75
0000  1280  CMSB   EQU   0
0000  1300  *
0000  1320  * MAJOR DATA AREAS
0000  1340  *
0000  1360         IF    TRS
0000  1380  CSS    EQU   1400H
0000  1400  FNT01  EQU   CSS+800H
0000  1420  DATA   EQU   0C000H
0000  1440  STDEF  EQU   DATA+100H
0000  1460  MEMST  EQU   4000H
0000  1480         ENDIF
0000  1500         IF    BUGS
0000  1640  *
0000  1660  * JUMP TABLE DEFINITIONS
0000  1680  *
0000  1700  * BIG
0000  1720         ORG   BIG
0003  1740  INITL  DS    3
0003  1760  START  DS    3
0006  1780  CLEAR  DS    3
0009  1800  CUTIN  DS    3
000C  1820  NXCOD  DS    3
000F  1840  CLRCT  DS    3
0012  1860  MVIT   DS    3
0015  1880  *
0015  1900  * LIT
0700  1920         ORG   LIT
0703  1940  CONTR  DS    3
0706  1960  GOTO   DS    3
0706  1980  *
0706  2000  * SUB
0B80  2020         ORG   SUB
0B80  2040  ROUTC  DS    3
0B83  2060  GOIN   DS    3
0B86  2080  ADDCT  DS    3
```

```
0B89  2120 SUBCT   DS   3
0B8C  2140 CFIND   DS   3
0B8F  2160 XYPRT   DS   3
0B92  2180       IF   BUGS
0B92  2240 ABORT   DS   3
0B95  2280 ABORT   DS   3
0B98  2300 XYAVE   DS   3
0B9B  2320 XYCAL   DS   3
0B9E  2340 XYINI   DS   3
0BA1  2360 XLEFT   DS   3
0BA4  2380 XRGHT   DS   3
0BA7  2400 YTO     DS   3
0BAA  2420 YAWAY   DS   3
0BAD  2440 SAVXY   DS   3
0BB0  2460         DS   2
0BB2  2480 COILS   DS   0AH     FOR LETTER DEBUG ROUTINE
0BBC  2500 *                    DATE
0BBC  2520 * BR
0BBC  2540       ORG  BR
1200  2560 BITPA   DS   3
1203  2580 ROUTI   DS   3
1206  2600 DEBUG   DS   3
1209  2620 LETTE   DS   3
120C  2640 *
120C  2660 * COMMON DATA AREA
120C  2680 * DO NOT CHANGE ORDER OR ADDRESSES FROM 8026 TO 8038
120C  2700 * WITHOUT CHANGING SUBROUTINE PROGRAM AND CHECKING
120C  2720 * ALL REFERENCES TO THE DATA FIELDS
120C  2740 * COUNTERS: BYTES 1-3 ARE BCD: 4-5 ARE BINARY
120C  2760         ORG  DATA          START OF NEW RAM AREA
C000  2780 ENDFT   DS   1             USED TO HOLD FF BYTE TO STOP FONT LOOKUP IF 48K FILLED
C001  2800 XADD    DS   2
C003  2820 YADD    DS   2
C005  2840 TIMHD   DS   1
C006  2860 SIZHX   DS   3
C009  2880 SIZHY   DS   3
C00C  2900       IF   BUGS
C00C  2960 DOWN    DS   1
C00D  2980 CFONT   DS   2           HOLDS CURRENT FONT STARTING ADD
C00E  3000 STAK    DS   2
C010  3020 SLOWB   DS   2           SWITCH FOR SET/RESET SLEW SLOW
C012  3040 STRHD   DS   1
C013  3060 TIMCT   DS   2
C015  3080 ITALS   DS   1           ITALIC SWITCH X.XX   MIDDLE BYTE IS SENT FROM BASIC
C016  3100 ITALS   DS   3
C019  3120 MIRRO   DS   1
C01A  3140 * SPEED DATA FIELDS - DO NOT CHANGE ORDER =-
C01A  3160 SPD1    DS   2           TMUP
C01C  3180 SPD2    DS   2           TMDN
C01E  3200 SPD3    DS   2           TMHIP
C020  3220 SPD4    DS   2           TMHI
```

| Addr | Line | Label | Op | Val | Comment |
|---|---|---|---|---|---|
| C022 | 3240 | SPD5 | DS | 2 | |
| C024 | 3260 | SPD6 | DS | 2 | |
| C026 | 3280 | SPD7 | DS | 1 | |
| C027 | 3300 | SPD8 | DS | 1 | |
| C028 | 3320 | SPD9 | DS | 1 | UP/DN DELAY |
| C029 | 3340 | XXYY | DS | 2 | INIT TO 0; BASIC POKES ADDR TO START SAVING X/Y POSITIONS |
| C02B | 3342 | XPP | DS | 2 | FIXED ORDER NEXT 3 / HOLDS MIN & MAX POSITIONS |
| C02D | 3344 | XMM | DS | 2 | |
| C02F | 3346 | YPP | DS | 2 | |
| C031 | 3348 | YMM | DS | 2 | |
| C033 | 3360 | * SCRAMBLE RAMS THAT NEED NO PRESET | | | |
| C033 | 3380 | RCNT | DS | 2 | HOLD AREA FOR SLEW |
| C035 | 3400 | TMNUM | DS | 2 | |
| C037 | 3420 | XCNT | DS | 2 | |
| C039 | 3440 | YCNT | DS | 2 | |
| C03B | 3460 | XTIME | DS | 2 | |
| C03D | 3480 | YTIME | DS | 2 | |
| C03F | 3500 | TMPHL | DS | 2 | |
| C041 | 3520 | * SCRAMBLE RAMS THAT NEED PRESET | | | |
| C041 | 3540 | COILX | DS | 2 | CURRENT COIL TABLE ADDRESS |
| C043 | 3560 | COILY | DS | 2 | |
| C045 | 3580 | MBYTE | DS | 1 | MISC OUTPUT PORT BYTE |
| C046 | 3590 | STRIN | DS | 2 | HOLDS CURRENT STRING STARTING ADDRESS |
| C048 | 3600 | * RAMS THAT MUST BE PRESET TO ZERO | | | |
| C048 | 3620 | BAKSW | DS | 1 | BACKUP WAITS SWITCH |
| C049 | 3640 | * | | | |
| C049 | 3660 | * DATA BYTES TAKEN FROM BIG | | | |
| C049 | 3680 | * | | | |
| C049 | 3700 | * STRAIGHT LINE | | | |
| C049 | 3720 | HOLDH | DS | 2 | |
| C04B | 3740 | TRSIN | DS | 2 | |
| C04D | 3760 | GOXPO | DS | 2 | NEXT LETTER CODE ADDRESS |
| C04F | 3780 | GOXNE | DS | 2 | FIXED ORDER! NEXT 4 HOLD BETWEEN LETTER MOVEMENTS |
| C051 | 3800 | GOYPO | DS | 2 | FIXED ORDER! |
| C053 | 3820 | GOYNE | DS | 2 | FIXED ORDER! |
| C055 | 3822 | SIZCX | DS | 3 | FIXED ORDER! |
| C058 | 3824 | SIZCY | DS | 3 | FIXED ORDER! NEXT TWO HOLD SIZE REDUCING COUNT |
| C05B | 3840 | * DIAGONAL MOVEMENT | | | |
| C05B | 3860 | TIMAD | DS | 2 | STARTING ADDRESS DIAG. BIT PAIRS BYTES |
| C05D | 3880 | FOURC | DS | 1 | BIT PAIR COUNT FOR DIAG. MOVES |
| C05E | 3900 | HOLDA | DS | 1 | BIT PAIR BYTE |
| C05F | 3920 | DADDR | DS | 2 | ADDRESS FOLLOWING BIT PAIR BYTES |
| C061 | 3940 | * CIRCULAR MOVEMENT | | | |
| C061 | 3960 | CTBEG | DS | 2 | CIRCLE TABLE ADDRESS HOLD |
| C063 | 3980 | CTHIS | DS | 2 | CIRCLE TABLE ADDRESS HOLD |
| C065 | 4000 | CCFOU | DS | 1 | BIT COUNT |
| C066 | 4020 | CCBYT | DS | 1 | CIRCLE BITS BYTE |
| C067 | 4040 | CCURT | DS | 1 | CIRCLE TABLE NUMBER |
| C068 | 4060 | CPM | DS | 1 | +/- PART |
| C069 | 4080 | CREV | DS | 1 | REVERSE PART |
| C06A | 4100 | OVAL | DS | 3 | OVAL X.XX NUMBER TO ADD/SUB TO OVALC |
| C06D | 4120 | OVALC | DS | 3 | X.XX COUNTER TO TELL WHEN TO DO A FULL STEP |
| C070 | 4122 | OVALD | DS | 2 | HOLDS ADDRESS OF OVAL OR ZZROS |

| Addr | Line | Label | Op | Operand | Comment |
|---|---|---|---|---|---|
| C072 | 4124 | OVALR | DS | 1 | HOLDS CODE TO TELL TO ADD OR SUB "OVALD" |
| C073 | 4140 | * | | | |
| C073 | 4160 | * DATA BYTES TAKEN FROM LIT | | | |
| C073 | 4180 | * | | | |
| C073 | 4200 | SLBYT | DS | 1 | SLEW DIRECTION BYTE |
| C074 | 4220 | FADD | DS | 2 | FONT ADDRESS DURING WIDTH TABLE GENERATION |
| C076 | 4240 | * | | | |
| C076 | 4260 | * DATA BYTES TAKEN FROM SUB | | | |
| C076 | 4280 | * | | | |
| C076 | 4300 | XCOUN | DS | 1 | FIXED ORDER! |
| C077 | 4320 | YCOUN | DS | 1 | FIXED ORDER! |
| C078 | 4340 | SIZHA | DS | 1 | |
| C079 | 4380 | HLHOL | DS | 2 | |
| C07B | 4400 | ADDUP | DS | 2 | |
| C07D | 4420 | DIRSA | DS | 1 | |
| C07E | 4440 | YRESE | DS | 1 | |
| C07F | 4480 | XRESE | DS | 1 | |
| C080 | 4500 | THRES | DS | 1 | |
| C081 | 4520 | STEPS | DS | 1 | |
| C082 | 4540 | | IF | BUGS | |
| C082 | 4600 | * | | | |
| C082 | 4620 | * DATA BYTES TAKEN FROM BR | | | |
| C082 | 4640 | * | | | |
| C082 | 4660 | * DATA BYTES USED BY THE RUN PARTS | | | |
| C083 | 4680 | HOLDB | DS | 1 | |
| C084 | 4700 | PAIRC | DS | 2 | |
| C086 | 4720 | BTADD | DS | 2 | |
| C087 | 4740 | XYDIR | DS | 1 | |
| C087 | 4760 | * DATA BYTES USED BY THE BIT PAD INPUT & DEBUG ROUTINES | | | |
| C088 | 4780 | YSTAR | DS | 1 | |
| C089 | 4800 | YSPAC | DS | 1 | |
| C08A | 4820 | XSTAR | DS | 1 | |
| C08B | 4840 | XSPAC | DS | 2 | |
| C08D | 4860 | EXIT | DS | 1 | |
| C08E | 4880 | HOLD | DS | 1 | |
| C08F | 4900 | NEWDI | DS | 1 | |
| C091 | 4920 | XPREV | DS | 2 | |
| C093 | 4940 | XNOW | DS | 2 | |
| C095 | 4960 | XCCNT | DS | 2 | |
| C097 | 4980 | YPREV | DS | 2 | |
| C099 | 5000 | YNOW | DS | 2 | |
| C09B | 5020 | YCCNT | DS | 2 | |
| C09D | 5040 | YZERO | DS | 2 | |
| C09E | 5060 | SLOCH | DS | 1 | |
| C09F | 5080 | PACKB | DS | 1 | |
| C0A0 | 5100 | PACKC | DS | 2 | |
| C0A2 | 5120 | MEMCT | DS | 2 | |
| C0A4 | 5140 | CNTAD | DS | 2 | |
| C0A6 | 5160 | BYTEC | DS | 2 | |
| C0A8 | 5180 | MEM | DS | 1 | |
| C0A9 | 5200 | CUTHL | DS | 2 | |
| C0AB | 5220 | FIRST | DS | 2 | |
| | 5240 | DNUM | EQU | $-XADD | COUNT TO CLEAR TO ZEROS |

SYMBOL TABLE

| | | | | | | | | | |
|---|---|---|---|---|---|---|---|---|---|
| ABORT | 0B95 | ADDCT | 0B86 | ADDUP | C07B | BAKSW | C048 | BIG | 0000 |
| BITPA | 1200 | BR | 1200 | BTADD | C084 | BUGS | 0000 | BYTEC | C0A4 |
| CCBYT | C066 | CCFOU | C065 | CCURT | C067 | CFIND | 0B8C | CFONT | C0OE |
| CLEAR | 0006 | CLRCT | 000F | CLSB | 004B | CMSB | 0000 | CNTAD | C0A2 |
| COILS | 0BB2 | COILX | C041 | COILY | C043 | CONTR | 0700 | CPM | C068 |
| CREV | C069 | CSS | 1400 | CTBEQ | C061 | CTHIS | C063 | CTRO | 00D0 |
| CTR1 | 00D1 | CTR2 | 00D2 | CTRXX | 00D3 | CUTHL | C0A8 | CUTIN | 0009 |
| DADDR | C05F | DATA | C000 | DATE | 0224 | DEBUG | 1206 | DIRSA | C07D |
| DNBEG | FF6F | DNUM | 00AA | DOWN | C00D | ENDFT | C000 | EXIT | C08B |
| FADD | C074 | FIRST | C0A9 | FNT01 | 1C00 | FOURC | C05D | FPORT | 00FF |
| GOIN | 0B83 | GOTO | 0703 | GOXNE | C04F | GOXPO | C04D | GOYNE | C053 |
| GOYPO | C051 | HLHOL | C079 | HOLD | C08D | HOLDA | C05E | HOLDB | C082 |
| HOLDH | C049 | INITL | 0000 | ITALS | C016 | LETTE | 1209 | LIT | 0700 |
| MBYTE | C045 | MEM | C0A6 | MEMCT | C0A0 | MEMST | 4000 | MIRRO | C019 |
| MPORT | 00DA | MVIT | 0012 | NEWDI | C08E | NXCOD | 000C | OVAL | C06A |
| OVALC | C06D | OVALD | C070 | OVALR | C072 | PACKB | C09E | PACKC | C09F |
| PAIRC | C083 | PSW | 0006 | RCNT | C033 | ROUTC | 0B80 | ROUTI | 1203 |
| S1POR | 00DB | S2POR | 00DC | SAVXY | 0BAD | SIZCX | C055 | SIZCY | C058 |
| SIZHA | C078 | SIZHX | C006 | SIZHY | C009 | SLBYT | C073 | SLOCH | C09D |
| SLOWB | C012 | SPD1 | C01A | SPB2 | C01C | SPD3 | C01E | SPD4 | C020 |
| SPD5 | C022 | SPD6 | C024 | SPD7 | C026 | SPD8 | C027 | SPD9 | C028 |
| SPORT | 00DF | STAK | C010 | STAKS | FFFF | START | 0003 | STDEF | C100 |
| STEPC | 004B | STEPS | C081 | STRHD | C013 | STRIN | C046 | SUB | 0B80 |
| SUBCT | 0BB9 | THRES | C080 | TIMAD | C05B | TIMCT | C015 | TIMHD | C005 |
| TMDN | FFEC | TMHI | C080 | TMHIP | 0CE4 | TMLOW | FE57 | TMNUM | C035 |
| TMPHL | C03F | TMJP | 0014 | TPORT | 00DE | TRS | FFFF | TRSIN | C04B |
| TSQL | 0000 | XADD | C001 | XCCNT | C093 | XCNT | C037 | XCOUN | C076 |
| XLEFT | 0BA1 | XMM | C02D | XNOW | C091 | XPORT | 00D8 | XPP | C02B |
| XPREV | C08F | XRESE | C07F | XRGHT | 0BA4 | XSPAC | C08A | XSTAR | C089 |
| XTIME | C03B | XXYY | C029 | XYAVE | 0B98 | XYCAL | 0B9B | XYDIR | C086 |
| XYINI | 0B9E | XYPRT | 0B8F | YADD | C003 | YAWAY | 0BAA | YCCNT | C099 |
| YCNT | C039 | YCOUN | C077 | YMM | C031 | YNOW | C097 | YPORT | 00D9 |
| YPP | C02F | YPREV | C095 | YRESE | C07E | YSPAC | C088 | YSTAR | C087 |
| YTIME | C03D | YTO | 0BA7 | YZERO | C09B | | | | |

```
0000             0010 *
0000             0020 *
0000             0030 *         ORG   BIG
0000             0040 * JUMP TABLE
0000 C3 27 00    0050           JMP   JMP1        INITL
0003 C3 C9 00    0060           JMP   JMP2        START
0006 C3 BF 00    0070           JMP   JMP3        CLEAR
0009 C3 0A 05    0080           JMP   JMP5        CUTIN
000C C3 1F 01    0090           JMP   JMP6        NXCODE
000F C3 EA 04    0100           JMP   JMP7        CLRCTR
0012 C3 82 04    0110           JMP   MOVE        DO ACCUMULATED STEPS
0015             0120           DS    10H         ROOM FOR DEBUG
0025 24 02       0130           DW    DATE
0027             0140 * INITIALIZE RAM DATA BYTES
0027 00          0150 JMP1      NOP
0028             0160 * CLEAR OUT DATA AREA TO ZEROS
0028 21 00 C0    0170           LXI   H,ENDFT     FIRST BYTE OF DATA AREA
```

```
002B 06 AA           0180            MVI   B,DNUM      COUNT OF BYTES
002D 97              0190     ZLOOP  SUB   A
002E 77              0200            MOV   M,A
002F 23              0210            INX   H
0030 05              0220            DCR   B
0031 C2 2E 00        0230            JNZ   ZLOOP
0034 21 00 C1        0240            LXI   H,STDEF
0037 22 46 00        0250            SHLD  STRING      STRING DEFAULT
003A 3E FF           0260            MVI   A,0FFH      INITIAL RESET
003C 32 FF C0        0270            STA   STDEF-1     SET FONT8 AREA TO NO FONT
003F 32 00 C0        0275            STA   ENDFT
0042                 0280            IF    TRS
                     0290            LXI   SP,STDEF-2  FF STOPS SEARCH IF 48K USED
0042 31 FE C0        0300            ENDIF             SET SP BEHIND FONT 8 AREA
                     0310            IN    TPORT       INIT INPUT PORT TO BE READY
0045 DB DE           0320            MVI   A,49H       I = INITIALIZATION
0047 3E 49           0330            OUT   TPORT       WHAT'S DOING MESSAGE
0049 D3 DE           0340            LXI   H,COILS+1   THIS IS THE 0,0 PATTERN
004B 21 B3 0B        0350            SHLD  COILX       TABLE ADDRESS SAVE AREA
004E 22 41 C0        0360            SHLD  COILY
0051 22 43 C0        0370            MOV   A,M         GET THE COIL PATTERN
0054 7E              0380            OUT   XPORT       INITIALIZE STEPPERS
0055 D3 D8           0390            OUT   YPORT
0057 D3 D9           0395            LXI   H,FNTO1
0059 21 00 1C        0397            SHLD  CFONT
005C 22 0E C0        0400     * LOAD SPEED PARAMETERS FOR DEFAULT
                     0410            LXI   H,TMUP
005F 21 14 00        0420            SHLD  SPD1
0062 22 1A C0        0430            LXI   H,TMDN
0065 21 EC FF        0440            SHLD  SPD2
0068 22 1C C0        0450            LXI   H,TMHIP
006B 21 E4 0C        0460            SHLD  SPD3
006E 22 1E C0        0470            LXI   H,TMHI
0071 21 1C F3        0480            SHLD  SPD4
0074 22 20 C0        0490            LXI   H,TMLOW
0077 21 57 FE        0500            SHLD  SPD5
007A 22 22 C0        0510            LXI   H,DNBEG
007D 21 6F FF        0520            SHLD  SPD6
0080 22 24 C0        0530            MVI   A,CLSB
0083 3E 4B           0540            STA   SPD7
0085 32 26 C0        0550            MVI   A,CMSB
0088 3E 00           0560            STA   SPD8
008A 32 27 C0        0570            MVI   A,0A0H      DEFAULT UP/DN DELAY
008D 3E A0           0580            STA   SPD9
008F 32 28 C0        0590     * INIT COUNTERS
                     0600            MVI   A,0
0092 3E 00           0610            OUT   MPORT       MISC PORT INIT OUTPUT
0094 D3 DA           0620            OUT   FPORT       SET ERROR PORT TO ZERO
0096 D3 FF           0630            MVI   A,30H       CTR 0 MODE WORD
0098 3E 30           0640            OUT   CTRXX
009A D3 D3           0650            MVI   A,70H       CTR 1 MODE WORD
009C 3E 70           0660            OUT   CTRXX
009E D3 D3           0670            MVI   A,0B0H      CTR 2 MODE WORD
00A0 3E B0
```

| Addr | Bytes | | | Label | Op | Operand | Comment |
|---|---|---|---|---|---|---|---|
| 00A2 | D3 | D3 | | | OUT | CTRXX | TO GET INIT HIGH OUTPUT |
| 00A4 | D3 | D0 | | | OUT | CTR0 | |
| 00A6 | D3 | D0 | | | OUT | CTR0 | |
| 00A8 | D3 | D1 | | | OUT | CTR1 | |
| 00AA | D3 | D1 | | | OUT | CTR1 | |
| 00AC | D3 | D2 | | | OUT | CTR2 | |
| 00AE | D3 | D2 | | | OUT | CTR2 | |
| 00B0 | 3E | 01 | | | MVI | A,1 | |
| 00B2 | 32 | 06 | C0 | | STA | SIZHX | |
| 00B5 | 32 | 09 | C0 | | STA | SIZHY | |
| 00B8 | 32 | 05 | C0 | | STA | TIMHD | |
| 00BB | | | | | IF | TRS | |
| 00BB | C3 | 03 | 00 | | JMP | START | |
| 00BE | | | | | ENDIF | | |
| 00BE | C9 | | | | RET | | FOR BUGS. |
| 00BF | | | | * CLEAR COUNTERS | | | |
| 00BF | 21 | 00 | 00 | JMP3 | LXI | H,0 | |
| 00C2 | 22 | 01 | C0 | | SHLD | XADD | |
| 00C5 | 22 | 03 | C0 | | SHLD | YADD | |
| 00C8 | C9 | | | | RET | | |
| 00C9 | | | | * | | | |
| 00C9 | | | | * INITIALIZE SIZE COUNTERS | | | |
| 00C9 | | | | JMP2 | NOP | | |
| 00CA | DB | | | MORE | IN | S1POR | |
| 00CC | E6 | 10 | | | ANI | 10H | 0001 0000 POWER SAVER |
| 00CE | C2 | 46 | C0 | | JNZ | MOREX | |
| 00D1 | 97 | | | | SUB | A | |
| 00D2 | D3 | D8 | | | OUT | XPORT | SHUT DOWN STEPPERS |
| 00D4 | D3 | D9 | | | OUT | YPORT | |
| 00D6 | DB | DC | | MOREX | IN | S2POR | |
| 00D8 | 2F | | | | CMA | | |
| 00D9 | E6 | 08 | | | ANI | 8 | 0000 1000 TEST FOR AUTO-TEST SW. ON |
| 00DB | CA | FC | 00 | | JZ | GETMR | |
| 00DE | 2A | 46 | C0 | | LHLD | STRING | STRTIN START TO DE |
| 00E1 | EB | | | | XCHG | | |
| 00E2 | 21 | F2 | 00 | | LXI | H,CODES | ROOM FOR MANY MORE |
| 00E5 | 06 | 80 | | | MVI | B,80H | |
| 00E7 | 7E | | | | MOV | A,M | |
| 00E8 | 12 | | | LDAC | STA | D | LOAD TEST CODES TO STRING |
| 00E9 | 23 | | | | INX | H | |
| 00EA | 13 | | | | INX | D | |
| 00EB | 05 | | | | DCR | B | |
| 00EC | C2 | E7 | 00 | | JNZ | LDAC | DO A FEW MORE |
| 00EF | C3 | 00 | 01 | | JMP | DOTST | |
| 00F2 | AB | | | CODES | DB | 0ABH | STOP |
| 00F3 | B0 | | | | DB | 0B0H | GOTO |
| 00F4 | 80 | 25 | | | DW | 2580H | X=12 |
| 00F6 | 00 | 19 | | | DW | 1900H | Y=8 |
| 00F8 | A5 | A4 | | | DW | 0A4A5H | CUTTER DN/UP |
| 00FA | A3 | | | | DB | 0A3H | RTZ |
| 00FB | AA | | | | DB | 0AAH | RETURN TO START OF CODE |
| 00FC | 00 | | | GETMR | NOP | | |

```
00FD                            1210        IF      TSOL
00FD                            1250        IF      TRS
00FD  CD FB 05                  1260        CALL    GETRS       GET A STRING
0100                            1270        ENDIF
0100  2A 41 C0            DOTST 1280        LHLD    COILX
0103  7E                        1290        MOV     A,M
0104  D3 D8                     1300        OUT     XPORT       GET THE LAST PATTERN
0106  2A 43 C0                  1310        LHLD    COILY
0109  7E                        1320        MOV     A,M
010A  D3 D9                     1330        OUT     YPORT       START 'EM UP
010C                            1340  * INITIALIZE PSEUDO STACK
010C  21 FF FF                  1350        LXI     H,STAKS     RESET PSEUDO STACK
010F  22 10 C0                  1360        SHLD    STAK        USED FOR BACKUP SWITCH
0112  97                        1370        SUB     A
0113  32 48 C0                  1380        STA     BAKSW       RESET BACKUP WAITS SWITCH
0116                            1390  * INITIALIZE TO FIRST CODE
0116  2A 46 C0                  1400        LHLD    STRING
0119  22 13 C0                  1410        SHLD    STRHD
011C  C3 2A 01                  1420        JMP     GETONE
011F                            1430  * BACK HERE FOR NEXT CODE
011F  3E 45               JMP6  1440        MVI     A,45H       E=ENGRAVING
0121  D3 DE                     1450        OUT     TPORT       WHAT'S DOING MESSAGE
0123  2A 13 C0            NOXMI 1460        LHLD    STRHD
0126  23                        1470        INX     H
0127  22 13 C0                  1480        SHLD    STRHD
012A                            1490        IF      BUGS
012A  CD 70 05            GETON 1520        CALL    RSTART      CHECK IF RESTARTS OR ABORT WANTED
012D  3A 45 C0                  1530        LDA     MBYTE       SET COUNTER TO ENGRAVE
0130  E6 DF                     1540        ANI     0DFH        11011111
0132  32 45 C0                  1550        STA     MBYTE
0135  D3 DA                     1560        OUT     MPORT
0137  7E                        1570        MOV     A,M
0138  FE FF                     1580        CPI     0FFH        THIS GETS THE CODE
013A                            1590        IF      TRS              EOJ CODE
013A  CA CA 00                  1600        JZ      MORE
013D                            1610        ENDIF
013D                            1620        IF      TSOL             NO WAY OUT NOW
013D                            1650        IF      BUGS
013D  FE 00                     1680        CPI     0
013F  CA 0C 00                  1690        JZ      NXCODE      NULL CODE
0142  FE 7E                     1700        CPI     7EH         SLUFF NULL
0144  D2 00 07                  1710        JNC     CONTRL      IS IS A CONTROL CHAR?
0147                            1720  * PROCESS A LETTER
0147  2A 0E C0                  1730        LHLD    CFONT
014A  CD 8C 0B                  1740        CALL    CFIND
014D  D2 55 01                  1750        JNC     GOODC
0150                            1760        IF      BUGS
0150  3E 04                     1820        MVI     A,4
0152  D3 FF                     1830        OUT     FPORT
0154  76                        1840        HLT
0155                            1850  *
0155                            1860  * DO ACTUAL PROCESS OF VALID LETTER FROM FONT TABLE
```

| | | | | | |
|---|---|---|---|---|---|
| 0155 | 23 | 1870 | * | | |
| 0155 | 46 | 1880 | GOODC | MOV | INX H |
| 0156 | 05 | 1890 | | MOV | B,M |
| 0157 | 05 | 1900 | | DCR | B |
| 0158 | 05 | 1910 | | DCR | B |
| 0159 | 05 | 1920 | | DCR | B |
| 015A | 05 | 1930 | | DCR | B |
| 015B | 05 | 1940 | | DCR | B |
| 015C | 23 | 1950 | | INX | H |
| 015D | 23 | 1960 | | INX | H |
| 015E | 23 | 1970 | | INX | H |
| 015F | 23 | 1980 | | INX | H |
| 0160 | 23 | 1990 | | INX | H |
| | | 2000 | * DECODE OP CODE | | |
| 0161 | C5 | 2010 | NEXTC | PUSH | B | SAVE BYTE COUNT |
| 0162 | 3A 05 C0 | 2020 | | LDA | TIMHD |
| 0165 | 32 15 C0 | 2030 | | STA | TIMCT | RESET TIMES COUNT |
| 0168 | | 2040 | | IF | BUGS |
| 0168 | 7E | 2050 | | MOV | A,M | GET A CODE !!!! |
| 0169 | FE 01 | 2070 | | CPI | 01H |
| 016B | CA 94 F0 | 2080 | | JZ | BITLET | BITPAD LETTERS |
| 016E | E6 F0 | 2090 | | ANI | 0F0H | LOOK AT FIRST FOUR |
| 0170 | FE 10 | 2100 | | CPI | 10H |
| 0172 | CA B4 01 | 2110 | | JZ | STLINE | 1X=STRAIGHT LINE MOVEMENT |
| 0175 | FE 60 | 2120 | | CPI | 60H |
| 0177 | CA B4 01 | 2130 | | JZ | STLINE | 6X=TWO BYTE STRAIGHT LINE MOVE |
| 017A | FE 20 | 2140 | | CPI | 20H |
| 017C | CA 3E 02 | 2150 | | JZ | DIAGON | 2X=DIAGONAL MOVEMENT |
| 017F | FE 30 | 2160 | | CPI | 30H |
| 0181 | CA E6 02 | 2170 | | JZ | CIRCLE | 3X=CIRCULAR MOVEMENT |
| 0184 | FE 70 | 2180 | | CPI | 70H |
| 0186 | CA FB 04 | 2190 | | JZ | CUTTER | 7X=CUTTER UP/DOWN |
| | | 2200 | * ALL OUT SO MUST BE CODE ERROR | | |
| 0189 | | 2210 | | IF | BUGS |
| 0189 | 3E 05 | 2220 | | MVI | A,5 |
| 018B | D3 FF | 2280 | | OUT | FPORT |
| 018D | 76 | 2290 | | HLT | |
| | | 2300 | * RETURN HERE AFTER FINISHING OP CODE | | |
| 018E | C2 61 01 | 2310 | RTNC | JNZ | NEXTC |
| 0191 | C3 0C 00 | 2320 | | JMP | NXCODE |
| | | 2330 | * | | |
| 0194 | | 2340 | * OP CODE ROUTINES | | |
| 0194 | | 2350 | * | | |
| 0194 | | 2360 | * BIT PAD LINK FOR LETTERS | | |
| 0194 | | 2370 | * | | |
| 0194 | 23 | 2380 | BITLE | INX | H | POINT TO ENTRY # |
| 0195 | E5 | 2390 | | PUSH | H |
| 0196 | 7E | 2400 | | MOV | A,M |
| 0197 | 2A 0E C0 | 2410 | | LHLD | CFONT | SET UP FOR SEARCH |
| 019A | 11 10 00 | 2420 | | LXI | D,10H | CURRENT FONT STARTING ADDRESS |
| 019D | 19 | 2430 | | DAD | D | ADDER TO GET TO BIT AREA |
| 019E | CD 8C 0B | 2440 | | CALL | CFIND |
| 01A1 | D2 A9 01 | 2450 | | JNC | BITOK |

```
01A4                2470              IF    BUGS
01A4  3E 03         2530              MVI   A,3
01A6  D3 FF         2540              OUT   FPORT
01A8  76            2550              HLT
01A9  CD 09 12      2560  BITOK       CALL  LETTER
01AC  E1            2570              POP   H              H,L HAS START
01AD  23            2580              INX   H              POINT TO NEXT CODE
01AE  C1            2590              POP   B
01AF  05            2600              DCR   B
01B0  05            2610              DCR   B              COUNT NOW OK
01B1  C3 8E 01      2620              JMP   RTNC
01B4                2630       *
01B4                2640       ** STRAIGHT LINE MOVEMENT
01B4                2650       *
01B4  7E            2660  STLIN       MOV   A,M
01B5  22 5B C0      2670              SHLD  TIMAD          GET FULL BYTE BACK
01B8  07            2680              RLC                  STORE START ADDRESS FOR TIMES LOOP
01B9  07            2690              RLC
01BA  07            2700              RLC
01BB  07            2710              RLC
01BC  57            2720              MOV   D,A            SAVE FULL BYTE
01BD  23            2730  STLOO       INX   H
01BE  4E            2740              MOV   C,M            GET LSB STEP COUNT
01BF  06 00         2750              MVI   B,0            DEFAULT MSB
01C1  E6 01         2760              ANI   1              AFTER 4-RLC, 1 MEANS 1 BYTE CODE
01C3  C2 C8 01      2770              JNZ   ST1BT
01C6  23            2780              INX   H
01C7  46            2790              MOV   B,M            LET MSB ON TWO BYTE CODE
01C8  23            2800  ST1BT       INX   H
01C9  22 49 C0      2810              SHLD  HOLDHL
01CC                2820       * CHECK FOR CUTTER UP - IF UP, THEN ADD TO COUNTS
01CC  3A 45 C0      2830              LDA   MBYTE          MISC OUTPUT BYTE
01CF  E6 01         2840              ANI   1              BIT 0=CUTTER UP/DN; 1=DN
01D1  CA EE 01      2850              JZ    UP
01D4  7A            2860  STAGN       MOV   A,D
01D5  CD 80 0B      2870              CALL  ROUTC          GET CONTROL BYTE BACK
01D8  0B            2880              DCX   B              COUNT-1
01D9  78            2890              MOV   A,B
01DA  B1            2900              ORA   C
01DB  C2 D4 01      2910              JNZ   STAGN
01DE  3A 15 C0      2920              LDA   TIMCT
01E1  3D            2930              DCR   A
01E2  CA 2E 02      2940              JZ    STOUT
01E5  32 15 C0      2950              STA   TIMCT
01E8  2A 5B C0      2960              LHLD  TIMAD
01EB  C3 B4 01      2970              JMP   STLINE
01EE                2980       * CUTTER IS UP SO ADD TO COUNTS
01EE  7A            2990  UP          MOV   A,D            GET CONTROL BYTE
01EF  21 4D C0      3000              LXI   H,GOXPOS
01F2  E6 C0         3010              ANI   0C0H           1100 0000  X
01F4  FE 80         3020              CPI   80H            1000 0000  X+
01F6  CA 19 02      3030              JZ    SET
```

| | | | | | |
|---|---|---|---|---|---|
| 01F9 | 21 4F C0 | 3040 | | LXI | H,GOXNEG |
| 01FC | FE C0 | 3050 | | CPI | 0C0H |
| 01FE | CA 19 02 | 3060 | | JZ | SET |
| 0201 | 7A | 3070 | | MOV | A,D |
| 0202 | 21 51 C0 | 3080 | | LXI | H,GOYPOS |
| 0205 | E6 30 | 3090 | | ANI | 30H |
| 0207 | FE 20 | 3100 | | CPI | 20H |
| 0209 | CA 19 02 | 3110 | | JZ | SET |
| 020C | 21 53 C0 | 3120 | | LXI | H,GOYNEG |
| 020F | FE 30 | 3130 | | CPI | 30H |
| 0211 | CA 19 02 | 3140 | | JZ | SET |
| 0214 | | 3150 | | IF | BUGS |
| 0214 | 3E 06 | 3210 | | MVI | A,6 |
| 0216 | D3 FF | 3220 | | OUT | FPORT |
| 0218 | 76 | 3230 | | HLT | |
| 0219 | 79 | 3240 | SET | MOV | A,C |
| 021A | 86 | 3250 | | ADD | M |
| 021B | 77 | 3260 | | MOV | M,A |
| 021C | 23 | 3270 | | INX | H |
| 021D | 78 | 3280 | | MOV | A,B |
| 021E | 8E | 3290 | | ADC | M |
| 021F | 77 | 3300 | | MOV | M,A |
| 0220 | 2B | 3310 | | DCX | H |
| 0221 | 3A 15 C0 | 3320 | | LDA | TIMCT |
| 0224 | 3D | 3330 | | DCR | A |
| 0225 | CA 2E 02 | 3340 | | JZ | STOUT |
| 0228 | 32 15 C0 | 3350 | | STA | TIMCT |
| 022B | C3 19 02 | 3360 | | JMP | SET |
| 022E | 2A 49 C0 | 3370 | STOUT | LHLD | HOLDHL |
| 0231 | C1 | 3380 | | POP | B |
| 0232 | 7A | 3390 | | MOV | A,D |
| 0233 | E6 01 | 3400 | | ANI | 1 |
| 0235 | C2 39 02 | 3410 | | JNZ | $+4 |
| 0238 | 05 | 3420 | | DCR | B |
| 0239 | 05 | 3430 | | DCR | B |
| 023A | 05 | 3440 | | DCR | B |
| 023B | C3 8E 01 | 3450 | | JMP | RTNC |
| 023E | | 3460 | * | | |
| 023E | | 3470 | * DIAGONAL MOVEMENT | | |
| 023E | | 3480 | * | | |
| 023E | 7E | 3490 | DIAGO | MOV | A,M |
| 023F | 22 5B C0 | 3500 | | SHLD | TIMAD |
| 0242 | E6 05 | 3510 | | ANI | 5 |
| 0244 | 07 | 3520 | | RLC | |
| 0245 | 07 | 3530 | | RLC | |
| 0247 | 07 | 3540 | | RLC | |
| 0248 | 4F | 3550 | | MOV | C,A |
| 0249 | 23 | 3560 | | INX | H |
| 024A | 56 | 3570 | | MOV | D,M |
| 024B | 23 | 3580 | | INX | H |
| 024C | 5E | 3590 | | MOV | E,M |

1100 0000 X—
                                                          GET CONTROL BYTE
                                                          0011 0000 Y+
                                                          0010 0000 Y+
                                                          0011 0000 Y—

CHARS. COUNT
                                                          COUNTER

MSB
                                                          ADD W/CARRY

FINISHED

GET BYTE COUNT
                                                          FULL CODE BYTE
                                                          3 BYTE CODE?
                                                          LESS ONE MORE BYTE

GET FULL BYTE BACK
                                                          SAVE START ARRDESS FOR TIMES LOOP
                                                          00000101

MOVE TO FRONT
                                                          STORE THE +/— PART

STORE REPEATS

STORE FINISH COUNT

| | | | | | |
|---|---|---|---|---|---|
| 024D | 23 | | 3610 | | INX H |
| 024E | 22 5F C0 | | 3620 | | SHLD DADDR |
| 0251 | | | 3630 | * FIND END OF X/Y BYTES | |
| 0251 | 7A | | 3640 | | MOV A,D |
| 0252 | FE 00 | | 3650 | | CPI 0 |
| 0254 | CA 89 02 | | 3660 | | JZ DENDST |
| 0257 | C3 5B 02 | | 3670 | | JMP DSTART |
| 025A | 23 | | 3680 | DLOOP | INX H |
| 025B | 3E 04 | | 3690 | DSTAR | MVI A,4 |
| 025D | 32 5D C0 | | 3700 | | STA FOURCT |
| 0260 | 7E | | 3710 | | MOV A,M |
| 0261 | 32 5E C0 | | 3720 | DPAIR | STA HOLDA |
| 0264 | E6 C0 | | 3730 | | ANI 0C0H |
| 0266 | CA 7E 02 | | 3740 | | JZ DCOUNT |
| 0269 | CD DC 02 | | 3750 | | CALL DSETUP |
| 026C | 3A 5D C0 | | 3760 | | LDA FOURCT |
| 026F | 3D | | 3770 | | DCR A |
| 0270 | CA 5A 02 | | 3780 | | JZ DLOOP |
| 0273 | 32 5D C0 | | 3790 | | STA FOURCT |
| 0276 | 3A 5E C0 | | 3800 | | LDA HOLDA |
| 0279 | 07 | | 3810 | | RLC |
| 027A | 07 | | 3820 | | RLC |
| 027B | C3 61 02 | | 3830 | | JMP DPAIR |
| 027E | | | 3840 | * LOOP CONTROL | |
| 027E | 2A 5F C0 | | 3850 | DCOUN | LHLD DADDR |
| 0281 | 15 | | 3860 | | DCR D |
| 0282 | C2 5B 02 | | 3870 | | JNZ DSTART |
| 0285 | C3 89 02 | | 3880 | | JMP DENDST |
| 0288 | | | 3890 | * LAST FEW TO GO! | |
| 0288 | 23 | | 3900 | DENDL | INX H |
| 0289 | 3E 04 | | 3910 | DENDS | MVI A,4 |
| 028B | 32 5D C0 | | 3920 | | STA FOURCT |
| 028E | 7E | | 3930 | | MOV A,M |
| 028F | 32 5E C0 | | 3940 | DENDP | STA HOLDA |
| 0292 | 97 | | 3950 | | SUB A |
| 0293 | BB | | 3960 | | CMP E |
| 0294 | CA B2 02 | | 3970 | | JZ DOUT |
| 0297 | 3A 5E C0 | | 3980 | | LDA HOLDA |
| 029A | E6 C0 | | 3990 | | ANI 0C0H |
| 029C | CD DC 02 | | 4000 | | CALL DSETUP |
| 029F | 1D | | 4010 | | DCR E |
| 02A0 | 3A 5D C0 | | 4020 | | LDA FOURCT |
| 02A3 | 3D | | 4030 | | DCR A |
| 02A4 | CA 88 02 | | 4040 | | JZ DENDLP |
| 02A7 | 32 5D C0 | | 4050 | | STA FOURCT |
| 02AA | 3A 5E C0 | | 4060 | | LDA HOLDA |
| 02AD | 07 | | 4070 | | RLC |
| 02AE | 07 | | 4080 | | RLC |
| 02AF | C3 8F 02 | | 4090 | | JMP DENDPR |
| 02B2 | | | 4100 | * END ROUTINE | |
| 02B2 | 3A 15 C0 | | 4110 | DOUT | LDA TIMCT |
| 02B5 | 3D | | 4120 | | DCR A |

DO WE HAVE ZERO COMPLETE PASSES?

GET X/Y BYTE 11000000
00=END OF PAIRS

MOVE NEXT PAIR UP

LOOP COUNT-1

WE ARE THROUGH

11000000

| Addr | Bytes | | | Line | Label | Op | Operand | Comment |
|---|---|---|---|---|---|---|---|---|
| 02B6 | CA | C2 | 02 | 4130 | | JZ | DEND | |
| 02B9 | 32 | 15 | C0 | 4140 | | STA | TIMCT | |
| 02BC | 2A | 5B | C0 | 4150 | | LHLD | TIMAD | |
| 02BF | C3 | 3E | 02 | 4160 | | JMP | DIAGON | |
| 02C2 | C1 | | | 4170 | DEND | POP | B | |
| 02C3 | 05 | | | 4180 | | DCR | B | |
| 02C4 | 05 | | | 4190 | | DCR | B | |
| 02C5 | 05 | | | 4200 | | DCR | B | |
| 02C6 | 05 | | | 4210 | | DCR | B | BYTE COUNT-BASIC FOUR BYTES |
| 02C7 | 2A | 5F | C0 | 4220 | | LHLD | DADDR | |
| 02CA | C3 | CF | 02 | 4230 | | JMP | DCTST | |
| 02CD | 05 | | | 4240 | DCTLP | DCR | B | |
| 02CE | 23 | | | 4250 | | INX | H | |
| 02CF | 7E | | | 4260 | DCTST | MOV | A,M | |
| 02D0 | E6 | 03 | | 4270 | | ANI | 3 | 00000011 |
| 02D2 | C2 | CD | 02 | 4280 | | JNZ | DCTLP | AT ZERO WE HAVW FOUND LAST BYTE |
| 02D5 | 23 | | | 4290 | | INX | H | POINT TO NEXT OP CODE |
| 02D6 | 78 | | | 4300 | | MOV | A,B | |
| 02D7 | FE | 00 | | 4310 | | CPI | 0 | |
| 02D9 | C3 | 8E | 01 | 4320 | | JMP | RTNC | SET ZERO FLAG FOR RETURN |
| 02DC | | | | 4330 | * SUBROUTINE TO SET UP A CONTROL BYTE | | | |
| 02DC | 47 | | | 4340 | DSETU | MOV | B,A | |
| 02DD | 0F | | | 4350 | | RRC | | MOVE Y BIT OVER |
| 02DE | B0 | | | 4360 | | ORA | B | PUT THEM BACK TOGETHER |
| 02DF | E6 | A0 | | 4370 | | ANI | 0A0H | 10100000 |
| 02E1 | B1 | | | 4380 | | ORA | C | ADD THE +/- PART |
| 02E2 | CD | 80 | 0B | 4390 | | CALL | ROUTC | |
| 02E5 | C9 | | | 4400 | | RET | | |
| 02E6 | | | | 4410 | * | | | |
| 02E6 | | | | 4420 | * CIRCULAR MOVEMENT | | | |
| 02E6 | | | | 4430 | * | | | |
| 02E6 | 7E | | | 4440 | CIRCL | MOV | A,M | |
| 02E7 | E6 | 0F | | 4450 | | ANI | 0FH | GET FULL BYTE BACK |
| 02E9 | E5 | | | 4460 | | PUSH | H | 00001111 |
| 02EA | F5 | | | 4470 | | PUSH | PSW | |
| 02EB | CD | 9E | 0B | 4480 | | CALL | XYINIT | INTIIALIZE AVERAGING ROUTINE |
| 02EE | F1 | | | 4490 | | POP | PSW | |
| 02EF | CD | 55 | 04 | 4500 | | CALL | CNOOP | INITIALIZE CONTROL BYTE |
| 02F2 | E1 | | | 4510 | | POP | H | |
| 02F3 | 23 | | | 4520 | | INX | H | |
| 02F4 | 7E | | | 4530 | | MOV | A,M | CIRCLE NUMBER |
| 02F5 | E5 | | | 4540 | | PUSH | H | |
| 02F6 | 21 | 00 | 14 | 4550 | | LXI | H,CSS | CSS IS CIRCLE TABLE |
| 02F9 | CD | 8C | 0B | 4560 | | CALL | CFIND | GET CIRCLE ADDRESS |
| 02FC | 23 | | | 4570 | | INX | H | |
| 02FD | 23 | | | 4580 | | INX | H | |
| 02FE | 23 | | | 4590 | | INX | H | POINT TO FIRST X/Y BYTE |
| 02FF | 22 | 63 | C0 | 4600 | | SHLD | CTHIS | |
| 0302 | 22 | 61 | C0 | 4610 | | SHLD | CTBEG | |
| 0305 | 7E | | | 4620 | | MOV | A,M | INIT. FIRST X/Y BYTE |
| 0306 | 32 | 66 | C0 | 4630 | | STA | CCBYT | |

```
0309 E1           4640            POP   H           BACK TO CODES
030A D2 12 03     4650            JNC   CNOERR      NOW SEE IF NO MATCH
030D              4660            IF    BUGS
030D 3E 07        4720            MVI   A,7
030F D3 FF        4730            OUT   FPORT
0311 76           4740            HLT
0312 23           4750  CNOER     INX   H
0313 7E           4760            MOV   A,M
0314              4770  * OVAL NO IS IN FORM X.XXXXXXX WITH .XXXXXXX IN MOD 128
0314 37           4780            STC
0315 3F           4790            CMC               CLEAR CARRY
0316 17           4800            RAL
0317 32 6B C0     4810            STA   OVAL+1      MIDDLE OF X.XX
031A 3E 00        4820            MVI   A,0
031C 32 6C C0     4830            STA   OVAL+2      LAST OF X.XX
031F 17           4840            RAL
0320 32 6A C0     4850            STA   OVAL        FIRST OF X.XX
0323 23           4860            INX   H
0324 4E           4870            MOV   C,M         C HAS NULL COUNT
0325 23           4880            INX   H
0326 56           4890            MOV   D,M
0327 23           4900            INX   H
0328 5E           4910            MOV   E,M         D,E HAVE STEP COUNT
0329 23           4920            INX   H
032A E5           4930            PUSH  H           SAVE NEXT OP CODE ADDR.
032B 3E 05        4940            MVI   A,5         INIT. BITS COUNT 4+1
032D 32 65 C0     4950            STA   CCFOUR
0330              4960  * COUNT THROUGH NULL STEPS
0330 0C           4970            INR   C           SET TO NULL COUNT+1
0331 0D           4980  CINLP     DCR   C
0332 CA 3B 03     4990            JZ    CPROC
0335 CD D3 03     5000            CALL  CSTEP
0338 C3 31 03     5010            JMP   CINLP
033B              5020  * NOW WE CAN OUTPUT STEPS
033B D5           5030  CPROC     PUSH  D
033C CD D3 03     5040            CALL  CSTEP       SAVE STEP COUNT
033F CD 00 04     5050            CALL  CNTEN       GET A CONTROL BYTE
0342 21 6F C0     5060  CAGN      LXI   H,OVALCT+2  FINISH SECOND PART
0345 EB           5070            XCHG              X.XX COUNTER FOR OVALS
0346 2A 70 C0     5080            LHLD  OVALD
0349 3A 72 C0     5090            LDA   OVALR       ADDRESS OF 0 OR OVAL AMOUNT
034C B7           5100            ORA   A           OVALR=0 FOR ADD; =1 FOR SUBTRTACT DE
034D C2 56 03     5110            JNZ   $+9         0=POS  1=NEG MOVE
0350 CD 86 0B     5120            CALL  ADDCT
0353 C3 59 03     5130            JMP   $+6
0356 CD 89 0B     5140            CALL  SUBCT
0359 3A 6D C0     5150            LDA   OVALCT
035C B7           5160            ORA   A
035D 78           5170            MOV   A,B
035E CA 79 03     5180            JZ    CCALL       FIRST OF X.XX COUNTER
0361 3A 6D C0     5190            LDA   OVALCT      GET CONTROL BYTE IN A
```

```
0364  FE 80              5200           CPI   80H           TESTING FOR 01,02 OR FF,FE, ETC.
0366  78                 5210           MOV   A,B           GET Y PART
0367  F2 73 03           5220           JP    GONEG
036A                     5230  * TIME FOR A POSITIVE OVAL MOVE
036A  F6 80              5240  GOPOS    ORI   80H           1000 0000  ADD X+ PART
036C  21 6D C0           5250           LXI   H,OVALCT
036F  35                 5260           DCR   M
0370  C3 79 03           5270           JMP   CCALL
0373                     5280  * NEGATIVE OVAL MOVE
0373  F6 C0              5290  GONEG    ORI   0C0H          1100 0000  ADD X- PART
0375  21 6D C0           5300           LXI   H,OVALCT
0378  34                 5310           INR   M
0379  B7                 5320  CCALL    ORA   A
037A  CA 9B 03           5330           JZ    TLOOP
037D  F5                 5340           PUSH  PSW
037E  C5                 5350           PUSH  B
037F  CD 98 0B           5360           CALL  XYAVER        AVERAGING ROUTINE WILL GO TO ROUTC IF 1X
0382  C1                 5370           POP   B
0383  F1                 5380           POP   PSW
0384                     5390  * TEST IF ONE X IS NOT ENOUGH - EXPANDING WILL NEED MORE
0384  3A 6D C0           5400           LDA   OVALCT
0387  B7                 5410           ORA   A             ANY MORE TO DO?
0388  CA 9B 03           5420           JZ    TLOOP         0 MEANS THAT WE ARE COOL
038B  78                 5440           MOV   A,B           DIRECTIVE BYTE
038C  E6 10              5445           ANI   10H           0001 0000  LEAVE ONLY Y DIRECTION PART
038E  57                 5446           MOV   D,A           TEMP SAVE
038F  3A 6D C0           5447           LDA   OVALCT
0392  FE 80              5448           CPI   80H           NOW TEST ADD/SUB
0394  7A                 5449           MOV   A,D           SAME TEST AS ABOVE
0395  F2 73 03           5450           JP    GONEG         X MOVE ONLY WITH Y DIRECTION
0398  C3 6A 03           5460           JMP   GOPOS
039B                     5470  * DO TIMES LOOP
039B  3A 15 C0           5480  TLOOP    LDA   TIMCT
039E  3D                 5490           DCR   A
039F  CA A9 03           5500           JZ    CCTDN
03A2  32 15 C0           5510           STA   TIMCT
03A5  78                 5520           MOV   A,B
03A6  C3 42 03           5530           JMP   CAGN          DO TIMES ON Y BUT ADD/SUB TO GET X
03A9  3A 05 C0           5540  CCTDN    LDA   TIMHD
03AC  32 15 C0           5550           STA   TIMCT
03AF  D1                 5560           POP   D             GET STEP COUNT
03B0  1B                 5570           DCX   D             STEP COUNTER-1
03B1  97                 5580           SUB   A
03B2  BA                 5590           CMP   D
03B3  C2 3B 03           5600           JNZ   CPROC
03B6  BB                 5610           CMP   E             LOW ZERO? YES WE ARE DONE
03B7  C2 3B 03           5620           JNZ   CPROC
03BA                     5630  * END ROUTINE
03BA  CD 9B 0B           5640           CALL  XYCALL        FINISH ANY REMAINING STEPS
03BD  C2 BA 03           5650           JNZ   $-3           CLEAR ALL REMAINING COUNTS
03C0  97                 5660           SUB   A
```

| | | | | |
|---|---|---|---|---|
| 03C1 | 32 6D C0 | 5670 | STA | OVALCT | CLEAR COUNTER |
| 03C4 | 32 6E C0 | 5680 | STA | OVALCT+1 | |
| 03C7 | 32 6F C0 | 5690 | STA | OVALCT+2 | |
| 03CA | E1 | 5700 | POP | H | H WAS SET TO NEXT OP CODE |
| 03CB | C1 | 5710 | POP | B | GET BYTE COUNT |
| 03CC | 78 | 5720 | MOV | A,B | |
| 03CD | D6 06 | 5730 | SUI | 6 | THIS ROUTINE IS 6 BYTES |
| 03CF | 47 | 5740 | MOV | B,A | |
| 03D0 | C3 8E 01 | 5750 | JMP | RTNC | |
| | | 5760 | * SUBROUTINE TO SET UP CONTROL BYTE IN A | | |
| 03D3 | 3A 65 C0 | 5770 | CSTEP LDA | CCFOUR | |
| 03D6 | 3D | 5780 | DCR | A | BITS COUNT-1 |
| 03D7 | C2 E7 03 | 5790 | JNZ | CINBYT | |
| 03DA | 2A 63 C0 | 5800 | LHLD | CTHIS | |
| 03DD | 23 | 5810 | INX | H | |
| 03DE | 22 63 C0 | 5820 | CRST SHLD | CTHIS | POINT TO NEXT X/Y BYTE |
| 03E1 | 7E | 5830 | MOV | A,M | |
| 03E2 | 32 66 C0 | 5840 | STA | CCBYT | STORE THE NEXT BYTE |
| 03E5 | 3E 04 | 5850 | MVI | A,4 | RESET BITS COUNT |
| 03E7 | 32 65 C0 | 5860 | STA | CCFOUR | STORE NEW BITS COUNT |
| 03EA | 3A 66 C0 | 5870 | CINBY LDA | CCBYT | |
| 03ED | 47 | 5880 | MOV | B,A | |
| 03EE | 07 | 5890 | RLC | | |
| 03EF | 07 | 5900 | RLC | | |
| 03F0 | 32 66 C0 | 5910 | STA | CCBYT | SET FOR NEXT TIME |
| 03F3 | 78 | 5920 | MOV | A,B | |
| 03F4 | E6 C0 | 5930 | ANI | 0C0H | 11000000 |
| 03F6 | C0 | 5940 | RNZ | | |
| 03F7 | CD 41 04 | 5950 | CALL | CTABLE | CHANGE CONTROL BYTES |
| 03FA | 2A 61 C0 | 5960 | LHLD | CTBEG | SET ADDRESS TO START |
| 03FD | C3 DE 03 | 5970 | JMP | CRST | |
| | | 5980 | * CHECK FOR REVERSE | | |
| 0400 | 47 | 5990 | CNTEN MOV | B,A | |
| 0401 | 3A 69 C0 | 6000 | LDA | CREV | X0000000 X=1=REVERSE |
| 0404 | 07 | 6010 | RLC | | |
| 0405 | D2 14 04 | 6020 | JNC | CSET | |
| | | 6030 | * REVERSE X & Y MOVE FIELDS (NO +/- DATA) | | |
| 0408 | 78 | 6040 | MOV | A,B | |
| 0409 | 67 | 6050 | MOV | H,A | |
| 040A | 0F | 6060 | RRC | | |
| 040B | E6 40 | 6070 | ANI | 40H | MOVE 7TH TO 6TH |
| 040D | 47 | 6080 | MOV | B,A | 01000000 |
| 040E | 7C | 6090 | MOV | A,H | |
| 040F | 07 | 6100 | RLC | | MOVE 6TH TO 7TH |
| 0410 | E6 80 | 6110 | ANI | 80H | 10000000 |
| 0412 | 80 | 6120 | ADD | B | |
| 0413 | 47 | 6130 | MOV | B,A | |
| | | 6140 | * NOW SET UP DIRECTIVE BYTE | | |
| 0414 | 21 32 06 | 6150 | CSET LXI | H,ZZROS+2 | |
| 0417 | 0E 00 | 6160 | MVI | C,0 | C WILL STORE OVALR NO. |
| 0419 | 78 | 6170 | MOV | A,B | B HOLDS DIRECTIVE BYTE |
| 041A | E6 80 | 6180 | ANI | 80H | 1000 0000 X STEP? |
| 041C | CA 2C 04 | 6190 | JZ | NOSQEZ | |

```
041F                          * THERE IS AN X STEP
041F 21 6C CO          6210           LXI    H,OVAL+2
0422 3A 68 CO          6220           LDA    CPM
0425 E6 40             6230           ANI    40H              0100 0000   +/- PART
0427 CA 2C 04          6240           JZ     $+5
042A 0E 01             6250           MVI    C,1
042C 78                6260   NOSGE   MOV    A,B
042D 0F                6270           RRC
042E 80                6280           ORA    B                MOVE Y BIT OVER
042F E6 A0             6290           ANI    0A0H             PUT THEM BACK TOGETHER
0431 47                6300           MOV    B,A              1010 0000
0432 3A 68 CO          6310           LDA    CPM
0435 80                6320           ADD    B                +/- PART
0436 E6 70             6330   OVRET   ANI    70H              0111 0000 SEND ONLY X DIR AND COMPLETE Y PART
0438 47                6340           MOV    B,A              B WILL SAVE THE DIRECTIVE BYTE
0439 22 70 CO          6350           SHLD   OVALD            OVALD WILL SAVE 0 OR THE OVAL NO FOR ADD/SUB
043C 79                6360           MOV    A,C
043D 32 72 CO          6370           STA    OVALR            OVALR WILL SAVE 0=ADDCT; 1=SUBCT
0440 C9                6380           RET
0441                   6390   * SUBROUTINE TO CHANGE CONTROL BYTES BY TABLE LOOKUP
0441 3A 67 CO          6400   CTABL   LDA    CCURTN           GET CURRENT TABLE NUMBER
0444 3C                6410           INR    A                NUMBER+1
0445 FE 04             6420           CPI    4                TIME TO LOOP CLOCKWISE?
0447 C2 4E 04          6430           JNZ    CCK9
044A 97                6440           SUB    A                OVER 3: SET TO 0
044B C3 55 04          6450           JMP    CNOOP
044E FE 09             6460   CCK9    CPI    9                TIME TO LOOP CCW?
0450 C2 55 04          6470           JNZ    CNOOP
0453 3E 05             6480           MVI    A,5              OVER 8: SET TO 5
0455 32 67 CO          6490   CNOOP   STA    CCURTN           STORE CURRENT TABLE NUMBER
0458 21 60 05          6500           LXI    H,CTBLST
045B BE                6510   CHUNT   CMP    M
045C CA 64 04          6520           JZ     CFOUND
045F 23                6530           INX    H                POINT TO NEXT
0460 23                6540           INX    H
0461 C3 5B 04          6550           JMP    CHUNT
0464 23                6560   CFOUN   INX    H                POINT TO CONTROL BYTE
0465 7E                6570           MOV    A,M
0466 E6 50             6580           ANI    50H              01010000
0468 32 68 CO          6590           STA    CPM              +/- PART
046B 7E                6600           MOV    A,M
046C E6 80             6610           ANI    80H              10000000
046E 32 69 CO          6620           STA    CREV             REVERSE PART
0471 97                6630           SUB    A
0472 32 6D CO          6640           STA    OVALCT
0475 32 6E CO          6650           STA    OVALCT+1
0478 32 6F CO          6660           STA    OVALCT+2
047B CD 9B OB          6670           CALL   XYCALL
047E C2 7B 04          6680           JNZ    $-3
0481 C9                6690           RET
0482                   6700   *
0482                   6710   * ROUTINES TO CHECK FOR AND OUTPUT STEPS THAT HAVE      CLEAR OUT REMAINING COUNTS ON ANY DIRECTION CHG.
```

```
0482                    6720  * ACCUMULATED DURING CUTTER UP
0482                    6730  *
0482                    6740  * MOVE ROUTINE WILL OUTPUT STEPS TO CUTTER DOWN PLACE
0482  2A 4D C0          6750  MOVE  LHLD  GOXPOS              X+ COUNTER
0485  EB                6760        XCHG
0486  2A 4F C0          6770        LHLD  GOXNEG
0489  CD 83 0B          6780        CALL  GOIN                X+ - X- ROUTINE
048C  EB                6790        XCHG
048D  22 4D C0          6800        SHLD  GOXPOS
0490  3E 00             6810        MVI   A,0                 X+
0492  F2 97 04          6820        JP    $+5                 FLAG SET BY SUB
0495  3E 40             6830        MVI   A,40H               0100 0000  X- BIT
0497  F5                6840        PUSH  PSW
0498  2A 51 C0          6850        LHLD  GOYPOS
049B  EB                6860        XCHG
049C  2A 53 C0          6870        LHLD  GOYNEG
049F  CD 83 0B          6880        CALL  GOIN
04A2  EB                6890        XCHG
04A3  22 51 C0          6900        SHLD  GOYPOS
04A6  06 00             6910        MVI   B,0                 Y+
04A8  F2 AD 04          6920        JP    $+5
04AB  06 10             6930        MVI   B,10H               0001 0000  Y- BIT
04AD  F1                6940        POP   PSW
04AE  80                6950        ADD   B                   NOT X+Y DIRECTION BITS
04AF                    6960  * NOW OUTPUT STEPS UNTIL X & Y COUNTERS = 0
04AF  F6 A0             6970  LOOPR ORI   0A0H                1010 0000  SETS X & Y TO GO
04B1  21 4E C0          6980        LXI   H,GOXPOS+1          HIGH BITS
04B4  CD D8 04          6990        CALL  ZERO
04B7  C2 BC 04          7000        JNZ   $+5
04BA  E6 70             7010        ANI   70H                 0111 0000  TURN X OFF
04BC  21 52 C0          7020        LXI   H,GOYPOS+1
04BF  CD D8 04          7030        CALL  ZERO
04C2  C2 D2 04          7040        JNZ   CALLR
04C5  E6 D0             7050        ANI   0D0H                1101 0000  TURN Y OFF
04C7  47                7060        MOV   B,A
04C8  E6 A0             7070        ANI   0A0H                1010 0000  ARE BOTH OFF?
04CA  C2 D1 04          7080        JNZ   $+7
04CD  CD 0F 00          7090        CALL  CLRCTR
04D0  C9                7100        RET
04D1  78                7110        MOV   A,B
04D2  CD 80 0B          7120  CALLR CALL  ROUTC
04D5  C3 AF 04          7130        JMP   LOOPR               KEEP STEPPING
04D8                    7140  * SUBROUTINE TO DECREMENT COUNTER IN H,L
04D8                    7150  * AND SET ZERO FLAG IF ZERO.  SAVES A
04D8  47                7160  ZERO  MOV   B,A
04D9  7E                7170        MOV   A,M                 HIGH BITS
04DA  2B                7180        DCX   H                   LOW BITS
04DB  B6                7190        ORA   M                   H "OR" L
04DC  78                7200        MOV   A,B
04DD  C8                7210        RZ                        NO DECREMENT AND ZERO SET
04DE  3E FF             7220        MVI   A,0FFH              CARRY CHECK
04E0  35                7230        DCR   M                   LOW
```

```
04E1  BE           7240        CMP   M                WITH FF
04E2  C2 E7 04     7250        JNZ   $+5              HIGH (NO CARRY HERE SINCE CTR N=0)
04E5  23           7260        INX   H
04E6  35           7270        DCR   M                WILL RESET ZERO FLAG
04E7  B7           7280        ORA   A
04E8  78           7290        MOV   A,B
04E9  C9           7300        RET
04EA              7310  * SUBROUTINE TO CLEAR X+,X-,Y+,Y- COUNTERS
04EA              7320  * ALSO NOW CLEARS SIZCX & SIZCY
04EA  C5           7330  JMP7  PUSH  B
04EB  E5           7340        PUSH  H
04EC  06 0E        7350        MVI   B,8+6
04EE  21 4D C0     7360        LXI   H,GOXPOS
04F1  36 00        7370        MVI   M,0
04F3  23           7380        INX   H
04F4  05           7390        DCR   B
04F5  C2 F1 04     7400        JNZ   $-4
04F8  E1           7410        POP   H
04F9  C1           7420        POP   B
04FA  C9           7430        RET
04FB              7440  *
04FB              7450  * CUTTER UP/DOWN
04FB              7460  *
04FB  7E           7470  CUTTE MOV   A,M              GET BYTE BACK
04FC  E6 01        7480        ANI   1                00000001
04FE  0F           7490        RRC
04FF  E5           7500        PUSH  H
0500  CD 09 00     7510        CALL  CUTIN
0503  E1           7520        POP   H
0504  23           7530        INX   H                POINT TO NEXT OP CODE
0505  C1           7540        POP   B                BYTE COUNT-1
0506  05           7550        DCR   B
0507  C3 8E 01     7560        JMP   RTNC
050A              7570  * ENTER HERE FROM OUTSIDE PROGRAMS
050A              7580  * CODE IN A; BITS 0-6=0; BIT 7=1 FOR DOWN,=0 FOR UP
050A  00           7590  JMP5  NOP
050B  D2 2E 05     7600        JNC   CUTUP
050E              7610  * CUTTER GOING DOWN
050E              7620  * CUTTER GOING DOWN
050E  CD 82 04     7630        CALL  MOVE             CUTTER GOING DOWN SO GET THERE
0511  3E 57        7640        MVI   A,57H            W=WAITING
0513  D3 DE        7650        OUT   TPORT            WHAT'S DOING MESSAGE
0515  DB DB        7660  PAWS  IN    S1POR
0517  E6 02        7670        ANI   2                0000 0010
0519  CA 15 05     7680        JZ    PAWS
051C  3E 45        7690        MVI   A,45H            E=ENGRAVE
051E  D3 DE        7700        OUT   TPORT            WHAT'S DOING MESSAGE
0520  3A 45 C0     7710        LDA   MBYTE            MISC OUTPUT PORT BYTE
0523  E6 01        7720        ANI   1                CHECK IF BIT0 = 1
0525  C0           7730        RNZ                    NZ=ALREADY DOWN
0526  3A 45 C0     7740        LDA   MBYTE            GET MISC BYTE BACK
```

| Addr | Bytes | Line | Label | Op | Operand | Comment |
|---|---|---|---|---|---|---|
| 0529 | F6 01 | 7750 | | ORI | 1 | TURN BIT 0 ON |
| 052B | | 7760 | | IF | BUGS | |
| 052B | C3 39 05 | 7810 | | JMP | CUT | |
| 052E | | 7820 | * CUTTER GOING UP | | | |
| 052E | 3A 45 C0 | 7830 | CUTUP | LDA | MBYTE | MISC PORT OUTPUT BYTE |
| 0531 | E6 01 | 7840 | | ANI | 1 | CHECK IF BIT0 = 0 |
| 0533 | C8 | 7850 | | RZ | | Z=ALREADY UP |
| 0534 | 3A 45 C0 | 7860 | | LDA | MBYTE | GET MISC BYTE BACK |
| 0537 | E6 FE | 7870 | | ANI | 0FEH | TURN BIT 0 OFF |
| 0539 | 32 45 C0 | 7880 | CUT | STA | MBYTE | |
| 053C | D3 DA | 7890 | | OUT | MPORT | |
| 053E | 3A 28 C0 | 7900 | | LDA | SPD9 | HIGH VARIABLE |
| 0541 | B7 | | | | | |
| 0542 | CA 50 05 | 7930 | | MVI | B,0 | FIXED |
| 0545 | 06 00 | 7940 | | DCR | B | *TIME DELAY |
| 0547 | 05 | 7950 | | JNZ | $-1 | * |
| 0548 | C2 47 05 | 7960 | | DCR | A | * |
| 054B | 3D | 7970 | | JNZ | $-5 | * |
| 054C | C2 47 05 | 7980 | | RET | | |
| 054F | C9 | | | | | |
| 0550 | | | | | | |
| 0552 | 3E D4 | 8020 | | MVI | A,30H | |
| 0554 | 3E 30 | 8030 | | OUT | CTR2 | |
| 0556 | D3 D2 | 8040 | TIMOR | IN | SPORT | |
| 0558 | DB DF | 8050 | | ANI | 10H | CTR2 READY BIT |
| 055A | E6 10 | 8060 | | JZ | TIMOR | WAIT TIL TIME UP |
| 055C | CA 58 05 | 8070 | | RET | | |
| 055F | C9 | 8080 | CTBLS | DW | 1000H | MSB |
| 0560 | 00 10 | 8090 | | DW | 0D001H | |
| 0562 | 01 D0 | 8100 | | DW | 4002H | |
| 0564 | 02 40 | 8110 | | DW | 8003H | |
| 0566 | 03 80 | 8120 | | DW | 5005H | |
| 0568 | 05 50 | 8130 | | DW | 9006H | |
| 056A | 06 90 | 8140 | | DW | 0007H | |
| 056C | 07 00 | 8150 | | DW | 0C008H | |
| 056E | 08 C0 | 8160 | * SUBROUTINE TO TEST FOR/DO RESTART | | | |
| 0570 | | 8170 | RSTAR | IN | S1POR | TEST RESTARTS.ABORT |
| 0570 | DB DB | 8180 | | CMA | | |
| 0572 | 2F | 8190 | | ANI | 2CH | 0010 1100 |
| 0573 | E6 2C | 8200 | | JNZ | ON | |
| 0575 | C2 8E 05 | 8210 | | LDA | BAKSW | BACKUP WAITS SWITCH |
| 0578 | 3A 48 C0 | 8220 | | ORA | A | |
| 057B | B7 | 8230 | | RZ | | 0=NOT NOW (WAIT NOT ON) |
| 057C | C8 | 8240 | | MVI | A,53H | S=START SWITCH |
| 057D | 3E 53 | 8250 | | OUT | TPORT | WHAT'S DOING MESSAGE |
| 057F | D3 DE | 8260 | | IN | S1POR | NOW WAIT FOR START ENGRAVE SWITCH |
| 0581 | DB DB | 8270 | | ANI | 1 | 0000 0001 |
| 0583 | E6 01 | 8280 | | JNZ | $-4 | |
| 0585 | C2 81 05 | | | | | |

| | | | | |
|---|---|---|---|---|
| 0588 | 32 48 C0 | 8290 | STA | BAKSW | RESET BACKUP WAITS SWITCH |
| 058B | C3 F6 05 | 8300 | JMP | NOWOT |
| 058E | DB DB | 8310 ON | IN | S1POR |
| 0590 | 2F | 8320 | CMA |
| 0591 | E6 0C | 8330 | ANI | 0CH | 0000 1100 |
| 0593 | C2 C3 05 | 8340 | JNZ | RRTZ | RESTART OR CANCEL TAKE PRECEDENCE |
| 0596 | | | | |
| 0596 | 3E 57 | | | |
| 0598 | D3 DE | | | |
| 059A | 2A 10 C0 | | | |
| 059D | 23 | | | |
| 059E | 7D | | | |
| 059F | B7 | | | |
| 05A0 | CA C3 05 | | | |
| 05A3 | 5E | | | |
| 05A4 | 23 | | | |
| 05A5 | 56 | | | |
| 05A6 | 22 10 C0 | | | |
| 05A9 | EB | | | |
| 05AA | 2B | | | |
| 05AB | 2B | | | |
| 05AC | 2B | | | |
| 05AD | 2B | | | |
| 05AE | 2B | | | |
| 05AF | 7E | | | |
| 05B0 | FE B0 | | | |
| 05B2 | C2 F3 05 | | | |
| 05B5 | 22 13 C0 | | | |
| 05B8 | 3E 01 | | | |
| 05BA | 32 48 C0 | | | |
| 05BD | CD 0F 00 | | | |
| 05C0 | C3 F6 05 | | | |
| 05C3 | | 8590 * RTZ | | |
| 05C3 | 21 2F 06 | 8600 RRTZ | LXI | H,ZZROS-1 |
| 05C6 | CD 03 07 | 8610 | CALL | GOTO |
| 05C9 | 21 FF FF | 8620 | LXI | H,STAKS | RESET PSEUDO STACK |
| 05CC | 22 10 C0 | 8630 | SHLD | STAK |
| 05CF | 2A 46 C0 | 8640 | LHLD | STRING | BEGINNING OF CURRENT STRING ADDRESS |
| 05D2 | 22 13 C0 | 8650 | SHLD | STRHD |
| 05D5 | 3E 57 | 8660 | MVI | A,57H | W=WAITING |
| 05D7 | D3 DE | 8670 | OUT | TPORT | WHAT'S DOING MESSAGE |
| 05D9 | | 8680 * NOW TEST FOR RESTART SWITCHES OFF AND IF ABORT WANTED |
| 05D9 | DB DB | 8690 NOWOF | IN | S1POR | REST RESTARTS ONLY |
| 05DB | 2F | 8700 | CMA |
| 05DC | E6 24 | 8710 | ANI | 24H | 0010 0100 |
| 05DE | C2 D9 05 | 8720 | JNZ | NOWOF |
| 05E1 | DB DB | 8730 | IN | S1POR |
| 05E3 | E6 08 | 8740 | ANI | 08H | TEST ABORT |
| 05E5 | C2 F6 05 | 8750 | JNZ | NOWOT | 0000 1000 |
| 05E8 | DB DB | 8760 ALLOF | IN | S1POR |
| 05EA | 2F | 8770 | CMA | | NOW TEST FOR ALL OFF |

```
05EB  E6 2C              ANI   2CH                           0010 1100
05ED  C2 E8 05           JNZ   ALLOF
05F0  C3 00 00           JMP   INITL
05F3  2A 13 C0     LHLD  STRHD
05F6  3E 45              MVI   A,45H                         E=ENGRAVING
05F8  D3 DE              OUT   TPORT                         WHAT'S DOING MESSAGE
05FA  C9                 RET
05FB
05FB
05FB        *
05FB        * INPUT A COMPLETE COMMAND STRING FROM THE TRS-80
05FB        *
05FB  2A 46 05     GETRS LHLD  STRING                        CURRENT STRING STARTING ADDRESS
05FE  06 05              MVI   B,5                           STOP CODE = 5-FF
0600  3E 52              MVI   A,52H                         R=READY
0602  D3 DE              OUT   TPORT                         WHAT'S DOING MESSAGE
0604  DB DF              IN    SPORT
0606  E6 01              ANI   1
0608  C2 04 06           JNZ   WAIT
060B  3E 54              MVI   A,54H                         T= TRANSFER
060D  D3 DE              OUT   TPORT
060F  C3 19 06           JMP   GETIT
0612  DB DF        TRYIN IN    SPORT                         STATUS
0614  E6 01              ANI   1                             0000 0001
0616  C2 12 06           JNZ   TRYIN                         1 = NO BYTE TO READ YET
0619  DB DE        GETIT IN    TPORT                         GET THE BYTE FROM TRS-80
061B  77                 MOV   M,A                           PUT IT
061C  23                 INX   H
061D  FE FF              CPI   OFFH
061F  CA 27 06           JZ    *+8                           STOP CODE
0622  06 05              MVI   B,5
0624  C3 12 06           JMP   TRYIN                         RESET COUNT ON NON FF
0627  05                 DCR   B
0628  C2 12 06           JNZ   TRYIN
062B  3E 45              MVI   A,45H                         Z=ENGRAVING
062D  D3 DE              OUT   TPORT                         WHAT'S DOING MESSAGE
062F  C9                 RET
0630  00 00        ZZROS DW    0
0632  00 00        ZZZZZ DW    0
0634               EQU   *
```

SYMBOL TABLE

```
ALLOF 05E8   BITLE 0194   BITOK 01A9   CAGN  0342   CALLR 04D2
CCALL 0379   CCK9  044E   CCTDN 03A9   CFOUN 0464   CHUNT 045B
CINBY 03E7   CINLP 0331   CIRCL 02E6   CNOER 0312   CNOOP 0455
CNTEN 0400   CODES 00F2   CPROC 033B   CRST  03DE   CSET  0414
CSTEP 03D3   CTABL 0441   CTBLS 0560   CUT   0539   CUTTE 04FB
CUTUP 052E   DCOUN 027E   DCTLP 02CD   DCTST 02CF   DEND  02C2
DENDL 0288   DENDP 028F   DENDS 0289   DIAGO 023E   DLOOP 025A
DOTST 0100   DOUT  02B2   DPAIR 0261   DSETU 02DC   DSTAR 025B
GETIT 0619   GETMR 00FC   GETON 012A   GETRS 05FB   GONEG 0373
GOODC 0155   GOPOS 036A   JMP1  0027   JMP2  00C9   JMP3  00BF
JMP5  050A   JMP6  011F   JMP7  04EA   LDAC  00E7   LOOPR 04AF
MORE  00CA   MOREX 00D6   MOVE  0482   NEXTC 0161   NOSQE 042C
```

| | | | | | | | |
|---|---|---|---|---|---|---|---|
| NOWOF | 05D9 | NOWOT | 05F6 | NOXMI | 0123 | ON | 058E | OVRET | 0436 |
| PAWS | 0515 | RESOT | 05F3 | RRTZ | 05C3 | RSTAR | 0570 | RTNC | 018E |
| SET | 0219 | ST1BT | 01C8 | STAGN | 01D4 | STLIN | 01B4 | STLOG | 0160 |
| STOUT | 022E | TIMER | 0550 | TIMOR | 0558 | TLOOP | 039B | TRYIN | 0612 |
| UP | 01EE | WAIT | 0604 | ZERO | 04D8 | ZLOOP | 002E | ZZROS | 0630 |
| ZZZZZ | 0634 | | | | | | | | |

SAVED SYMBOL TABLE

| | | | | | | | | | |
|---|---|---|---|---|---|---|---|---|---|
| ABORT | 0B95 | ADDCT | 0B86 | ADDUP | C07B | BAKSW | C048 | BIG | 0000 |
| BITPA | 1200 | BR | 1200 | BTADD | C084 | BUGS | 0000 | BYTEC | C0A4 |
| CCBYT | C066 | CCFOU | C065 | CCURT | C067 | CFIND | 0BBC | CFONT | C00E |
| CLEAR | 0006 | CLRCT | 000F | CLSB | 004B | CMSB | 0000 | CNTAD | C0A2 |
| COILS | 0BB2 | COILX | C041 | COILY | 0043 | CONTR | 0700 | CPM | C068 |
| CREV | C069 | CSS | 1400 | CTBEG | C061 | CTHIS | C063 | CTRO | 00D0 |
| CTR1 | 00D1 | CTR2 | 00D2 | CTRXX | 00D3 | CUTHL | C0A8 | CUTIN | 0009 |
| DADDR | C05F | DATA | C000 | DATE | 0224 | DEBUG | 1206 | DIRSA | C07D |
| DNBEG | FF6F | DNUM | 00AA | DOWN | C00D | ENDFT | C000 | EXIT | C08B |
| FADD | C074 | FIRST | C0A9 | FNT01 | 1C00 | FOURC | C05D | FPORT | 00FF |
| GOIN | 0BB3 | GOTO | 0703 | GOXNE | C04F | GOXPO | C04D | GOYNE | C053 |
| GOYPO | C051 | HLHOL | C079 | HOLD | C08D | HOLDA | C05E | HOLDB | C082 |
| HOLDH | C049 | INITL | 0000 | ITALS | C016 | LETTE | 1209 | LIT | 0700 |
| MBYTE | 0BB2 | MEM | C0A6 | MEMCT | C0A0 | MEMST | 4000 | MIRRO | C019 |
| MPORT | 00DA | MVIT | 0012 | NEWDI | C08E | NXCOD | 000C | OVAL | C06A |
| OVALC | C06D | OVALD | C070 | OVALR | C072 | PACKB | C09E | PACKC | C09F |
| PAIRC | C083 | PSW | 0006 | RCNT | C033 | ROUTC | 0BB0 | ROUTI | 1203 |
| S1POR | 00DB | S2POR | 00DC | SAVXY | 0BAD | SIZCX | C055 | SIZCY | C058 |
| SIZHA | C078 | SIZHX | C006 | SIZHY | C009 | SLBYT | C073 | SLOCH | C09D |
| SLOWB | 0012 | SPD1 | C01A | SPD2 | C01C | SPD3 | C01E | SPD4 | C020 |
| SPD5 | C022 | SPD6 | C024 | SPD7 | C026 | SPD8 | C027 | SPD9 | C028 |
| SPORT | 00DF | STAK | C010 | STAKS | FFFF | START | 0003 | STDEF | C100 |
| STEPC | 004B | STEPS | C081 | STRHD | C013 | STRIN | C046 | SUB | 0BB0 |
| SUBCT | 0BB9 | THRES | C080 | TIMAD | C05B | TIMCT | C015 | TIMHD | C005 |
| TMDN | FFEC | TMHI | F31C | TMHIP | 0CE4 | TMLOW | FE57 | TMNUM | C035 |
| TMPHL | C03F | TMUP | 0014 | TPORT | 00DE | TRS | FFFF | TRSIN | C04B |
| TSOL | 0000 | XADD | C001 | XCCNT | C093 | XCNT | C037 | XCOUN | C076 |
| XLEFT | 0BA1 | XMM | C02D | XNOW | C091 | XPORT | 00D8 | XPP | C02B |
| XPREV | C08F | XRESE | C07F | XRGHT | 0BA4 | XSPAC | C0BA | XSTAR | C089 |
| XTIME | C03B | XXYY | C029 | XYAVE | 0B98 | XYCAL | C0B9B | XYDIR | C086 |
| XYINI | 0B9E | XYPRT | 0B8F | YADD | C003 | YAWAY | 0BAA | YCCNT | C099 |
| YCNT | C039 | YCOUN | C077 | YMM | C031 | YNOW | C097 | YPORT | 00D9 |
| YPP | C02F | YPREV | C095 | YRESE | C07E | YSPAC | C088 | YSTAR | C087 |
| YTIME | C03D | YTO | 0BA7 | YZERO | C09B | | | | |

```
0000
0000
0000
0000
0010 *                        LIT
0020 * *
0030 * *
0040 *                  ORG    LIT
0050 *                  JUMP   TABLE
0060                           JMP    JMP1            CONTRL
0700                           JMP    JMP2            GOTO
0700                           DW     DATE
0700 C3 0A 07
0703 C3 8E 08
0706 24 02
```

```
0708              0090 *
0708              0100 *
0708              0110 * EXIT
0708 00           0120 JMPOU  NOP
0709 C9           0130        RET            WAY HOME
070A              0140 *
070A              0150 *CONTROL PROGRAMS BEGIN HERE
070A              0160 *
070A              0170 * CONTROL CODES ARE HERE
070A              0180 *
070A 00           0190 JMP1   NOP
070B FE FF        0230        CPI    0FFH    FF IS RETURN CODE
070D CA 08 07     0240        JZ     JMPOUT
0710 FE 7E        0250        CPI    7EH     BITPAD CODE
0712 CA 2B 08     0260        JZ     BITS
0715 FE A0        0310        CPI    0A2H    CLEAR X,Y (TO DO) COUNTERS
0717 CA 9A 07     0320        JZ     CCONT
071A FE A2        0330        CPI    0A3H    RETURN TO ZERO
071C CA 0F 08     0340        JZ     RTZIN
071F FE A3        0350        CPI    0A4H    CUTTER UP
0721 CA 2B 08     0360        JZ     CTLCUT
0724 FE A4        0370        CPI    0A5H    CUTTER DOWN
0726 CA DE 07     0380        JZ     CTLCUT
0729 FE A5        0390        CPI    0A6H    MOTOR OFF
072B CA DE 07     0400        JZ     MOTOFF
072E FE A6        0410        CPI    0A7H    MOTOR ON
0730 CA E7 07     0420        JZ     MOTON
0733 FE A7        0430        CPI    0A9H    BELL
0735 CA ED 07     0440        JZ     BELLIN
0738 FE A9        0450        CPI    0AAH    RETURN TO START
073A CA 15 08     0460        JZ     RTSIN
073D FE AA        0470        CPI    0ABH    STOP
073F CA BC 07     0480        JZ     STOPIN
0742 FE AB        0490        CPI    0ACH    SLEW SLOW SET
0744 CA CC 07     0500        JZ     SLOWIN
0747 FE AC        0510        CPI    0ADH    RESET SLEW TO FAST
0749 CA 1C 08     0520        JZ     SLOWOT
074C FE AD        0530        CPI    0AEH    FINISH LETTER
074E CA 24 08     0540        JZ     FINISH
0751 FE AE        0550        CPI    0B0H    GOTO X/Y
0753 CA 4A 08     0560        JZ     GOTOIN
0756 FE B0        0570        CPI    0B1H    LOAD SIZE DATA
0758 CA 78 08     0580        JZ     LOAD
075B FE B1        0590        CPI    0B2H    LOAD FONT DATA
075D CA E5 08     0600        JZ     LFONT
0760 FE B2        0610        CPI    0B3H    FONT WIDTH TABLE GENERATION
0762 CA 50 08     0620        JZ     FTBLE
0765 FE B3        0630        CPI    0B4H    LOAD SPEED AND DELAY PARAMETERS
0767 CA 14 0A     0640        JZ     LDSPD
076A FE B4
076C CA DD 08
```

```
076F  FE B5              CPI   0B5H              LOOP X TIMES THRU STRING
0771  CA A2 07           JZ    LOOP
0774  FE B6 0A
0776  CA B5 0A
0779  FE B7              CPI   0B7H              RE-INITIALIZESYSTEM
077B  CA 00 00           JZ    INITL             THIS ADDR IN BIG
077E  E6 F0              ANI   0F0H              11110000
0780  FE 90              CPI   90H
0782  CA F8 08           JZ    SLEW
0785  3E 02              MVI   A,2
0787  D3 FF              OUT   FPORT
0789                     IF    BUGS
0789  76                 HLT
078A
078A
078A
078A
078A
078A  * LOOP X TIMES THRU STRING
078A  *
078A  * LOOP X TIMES THRU STRING
078A  *
078A  2A 10 C0   LOOP    LHLD  STRHD
078D  7D                 INX   H
078E  B7                 MOV   A,M
078F  CA 0C 00           INX   H
0792  3A 14 C0           ORA   M
0795  77                 JZ    NLOOP             AT ZERO WE ARE DONE
0796  2B                 MOV   D,M               MSB
0797  3A 13 C0           DCX   H
079A  77                 MOV   E,M               LSB
079B  2B                 DCX   H                 COUNT-1
079C  22 10 C0           MOV   M,E
079F  C3 0C 00           MOV   H
07A2                     INX   H
07A2                     MOV   M,D               COUNT NOW BACK - 1
07A2  2A 13 C0           JMP   RTSIN             RESTART CODE WILL FINISH
07A5  23                 SHLD  STRHD             H,L NOW POINTS AT LAST BYTE OF CODE
07A6  7E
07A7  23
07A8  B6
07A9  CA B6 07
07AC  56
07AD  2B
07AE  5E
07AF  1B
07B0  73
07B1  23
07B2  72
07B3  C3 BC 07
07B6  22 13 C0  NLOOP
```

```
07B9  C3 0C 00       0889            JMP   NXCODE
07BC                 0890     *
07BC                 0895     * RETURN TO START
07BC                 0900     *
07BC  21 FF FF       0910  RTSIN  LXI   H,STAKS        RESET PSEUDO STACK
07BF  22 10 C0       0912         SHLD  STAK
07C2  2A 46 C0       0914         LHLD  STRING
07C5  2B             0916         DCX   H              CORRECT TO
07C6  22 13 C0       0920         SHLD  STRHD          RESET TO BEGINNING OF STRING
07C9  C3 0C 00       0930         JMP   NXCODE
07CC                 0940     *
07CC                 0950     * STOP
07CC                 0960     *
07CC  3E 53          0970  STOPI  MVI   A,53H          S=START
07CE  D3 DE          0980         OUT   TPORT          WHAT'S DOING MESSAGE
07D0  DB DB          0990         IN    S1POR
07D2  E6 01          1000         ANI   1              0000 0001
07D4  C2 CC 07       1010         JNZ   STOPI          WAIT FOR SWITCH ON
07D7  3E 45          1020         MVI   A,45H          E=ENGRAVE
07D9  D3 DE          1030         OUT   TPORT          WHAT'S DOING MESSAGE
07DB  C3 0C 00       1040         JMP   NXCODE
07DE                 1050     *
07DE                 1060     * CONTROL CODE CUTTER UP/DOWN
07DE                 1070     *
07DE  E6 01          1080  CTLCU  ANI   1              00000001
07E0  0F             1090         RRC
07E1  CD 09 00       1100         CALL  CUTIN
07E4  C3 0C 00       1110         JMP   NXCODE
07E7                 1120     *
07E7                 1130     * MOTOR ON/OFF ROUTINE
07E7  3A 45 C0       1140  MOTOF  LDA   MBYTE
07EA  C3 F0 07       1150         JMP   MOTOUT
07ED  3A 45 C0       1160  MOTON  LDA   MBYTE
07F0  32 45 C0       1170  MOTOU  STA   MBYTE
07F3  C3 0C 00       1180         JMP   NXCODE
07F6                 1190     *
07F6                 1200     * BITPAD CALL FROM HERE TO ROUTE SECTION
07F6                 1210     *
07F6  23             1220  BITS   INX   H
07F7  22 13 C0       1230         SHLD  STRHD
07FA  7E             1240         MOV   A,M
07FB  21 00 40       1250         LXI   H,MEMST
07FE  CD 8C 0B       1260         CALL  CFIND
0801  D2 09 08       1270         JNC   FOUND
0804  3E 03          1280         MVI   A,3
0806  D3 FF          1290         OUT   FPORT          POINT TO CODE BYTE
0808  76             1300         IF    BUGS           SET FOR NXCODE
0809  CD 09 12       1360         HLT                  SET FOR SEARCH
080C  C3 0C 00       1370  FOUND  CALL  LETTER
080F                 1380         JMP   NXCODE
                     1390     *
```

```
080F                1400 * CLEAR X,Y (STEPS IN HOLD) COUNTERS
080F                1410 *
080F  CD 0F 00      1420 CCONT  CALL  CLRCTR
0812  C3 0C 00      1430        JMP   NXCODE
0815                1440 *
0815                1450 * BELL
0815                1460 *
0815  3E 07         1470 BELLI  MVI   A,7         BELL
0817  D3 FD         1480        OUT   0FDH        SOL PARALLEL PORT
0819  C3 0C 00      1490        JMP   NXCODE
081C                1500 *
081C                1510 * SLOW SLEW
081C                1520 *
081C  3E 01         1530 SLOWI  MVI   A,1
081E  32 12 C0      1540        STA   SLOWBT
0821  C3 0C 00      1550        JMP   NXCODE
0824  97            1560 SLOWO  SUB   A
0825  32 12 C0      1570        STA   SLOWBT
0828  C3 0C 00      1580        JMP   NXCODE
082B                1590 *
082B                1600 * RETURN TO ZERO
082B                1610 *
082B  2A 13 C0      1620 RTZIN  LHLD  STRHD
082E  22 3F C0      1630        SHLD  TMPHL
0831  21 45 08      1640        LXI   H,ZEROS-1
0834  CD 03 07      1650        CALL  GOTO
0837  21 FF FF      1655        LXI   H,STAKS
083A  22 10 C0      1658        SHLD  STAK        MUST SAVE TO FOOL GOTO
083D  2A 3F C0      1660        LHLD  TMPHL
0840  22 13 C0      1670        SHLD  STRHD
0843  C3 0C 00      1680        JMP   NXCODE
0846  00 00         1690 ZEROS  DW    00          ON RTZ RESET PSEUDO STACK
0848  00 00         1700        DW    00
084A                1710 *
084A                1860 * FINISH LETTER ROUTINE
084A                1870 * USED FOR DEBUGGING FONTS
084A  CD 12 00      1880 FINIS  CALL  MVIT        GO DO ACCUMULATED STEPS
084D  C3 0C 00      1890        JMP   NXCODE
0850                1900 *
0850                1910 * LOAD FONT DATA
0850                1920 *
0850  23            1930 LFONT  INX   H
0851  7E            1940        MOV   A,M         FONT NO.
0852  E5            1950        PUSH  H
0853  21 00 1C      1960        LXI   H,FNT01     FIRST FONT IN THE BUNCH
0856  CD 80 0A      1970        CALL  FFIND       FONT TABLE SEARCH
0859  23            1980        INX   H           GET PAST NO. AND LENGTH BYTES
085A  23            1990        INX   H
085B  23            2000        INX   H
085C  22 0E C0      2010        SHLD  CFONT       MAKE THIS THE CURRENT FONT
085F  E1            2020        POP   H
```

```
0860  D2 68 08   2040         JNC   FNTOK        CARRY MEANS NOT FOUND
0863  3E 01      2050         MVI   A,1          ERROR CODE
0865  D3 FF      2060         OUT   FPORT
0867        2070         IF    BUGS
0867  76         2130         HLT
0868  23         2140 FNTOK   INX   H
0869  7E         2150         MOV   A,M
086A  32 17 C0   2160         STA   ITALS+1      ITALIC SWITCH IS MIDDLE BYTE OF ITALIC AMOUNT
086D  23         2170         INX   H
086E  7E         2180         MOV   A,M
086F  32 19 C0   2190         STA   MIRRO        REVERSE SWITCH
0872  22 13 C0   2200         SHLD  STRHD        SET H,L AHEAD
0875  C3 0C 00   2210         JMP   NXCODE
0878             2220   *
0878             2230   * GOTO X/Y
0878             2240   * REGULAR ENTRY HERE
0878  CD 03 07   2250 GOTOI   CALL  GOTO
087B  3A 48 C0   2260         LDA   BAKSW        BACKUP WAITS SWITCH
087E  B7         2261         ORA   A
087F  CA 0C 00   2262         JZ    NXCODE       0=NOT NOW
0882  11 00 00   2263         LXI   D,0          WAIT COUNTER
0885  1B         2265         DCX   D
0886  7B         2267         MOV   A,E
0887  B2         2274         ORA   D
0888  C2 85 08   2275         JNZ   $-3
088B  C3 0C 00   2279         JMP   NXCODE
088E             2280   *OUTSIDE ENTRY HERE
088E  97         2290 JMP2    SUB   A
088F  32 73 C0   2300         STA   SLBYTE
0892  23         2310         INX   H
0893  5E         2320         MOV   E,M
0894  23         2330         INX   H
0895  56         2340         MOV   D,M
0896  E5         2350         PUSH  H
0897  2A 01 C0   2360         LHLD  XADD
089A  3E 08      2370         MVI   A,8          FROM (AT NOW)
089C  32 73 C0   2380         STA   SLBYTE       0000 1000  SLEW +X
089F  CD 83 0B   2390         CALL  GOIN         SUBTRACT SUBROUTINE
08A2  EB         2400         XCHG
08A3  22 37 C0   2410         SHLD  XCNT
08A6  CA B1 08   2420         JZ    NGTX
08A9  F2 B1 08   2430         JP    NGTX
08AC  3E 0C      2440         MVI   A,0CH        0000 1100  SLEW -X
08AE  32 73 C0   2450         STA   SLBYTE
08B1  E1         2460 NGTX    POP   H
08B2  23         2470         INX   H
08B3  5E         2480         MOV   E,M          LOW BITS TO
08B4  23         2490         INX   H
08B5  56         2500         MOV   D,M          HI
08B6  22 13 C0   2510         SHLD  STRHD        MOVE OVER TO POINT TO NEXT CODE
08B9  2A 03 C0   2520         LHLD  YADD         FROM
```

```
08BC  3A 73 C0         2530           LDA   SLBYTE        GET THE X/Y CODE BYTE
08BF  F6 02            2540           ORI   2             00000010  SET FOR Y+
08C1  32 73 C0         2550           STA   SLBYTE
08C4  CD 83 0B         2560           CALL  GOIN          SUBTRACT
08C7  EB               2570           XCHG
08C8  22 39 C0         2580           SHLD  YCNT
08CB  CA D9 08         2590           JZ    GOOUT         NOTHING ON Y
08CE  F2 D9 08         2600           JP    GOOUT
08D1  3A 73 C0         2610           LDA   SLBYTE
08D4  F6 01            2620           ORI   1             00000001  MAKE IT - FOR Y-
08D6  32 73 C0         2630           STA   SLBYTE
08D9  CD 1A 09         2640           CALL  SLIN          GO DO IT
08DC  C9               2650  GOOUT    RET
08DD                   2660  *
08DD                   2670  * LOAD SPEED AND DELAY DATA
08DD                   2680  *
08DD  06 0F            2690  LDSPD    MVI   B,15          BYTE COUNT
08DF  11 19 C0         2700           LXI   D,SPD1-1      TO ADDRESS
08E2  C3 EA 08         2710           JMP   LDLOO         USE SIZE DATA ROUTINE
08E5                   2720  *
08E5                   2730  * LOAD SIZE DATA
08E5                   2740  *
08E5  06 07            2750  LOAD     MVI   B,7           BYTE COUNT
08E7  11 04 C0         2760           LXI   D,TIMHD-1     TIMES ADDRESS
08EA  23               2770  LDLOO    INX   H
08EB  13               2780           INX   D
08EC  7E               2790           MOV   A,M
08ED  12               2800           STAX  D             GET BYTE
08EE  05               2810           DCR   B             STORE IN RAM
08EF  C2 EA 08         2820           JNZ   LDLOOP        COUNT-1
08F2  22 13 C0         2830           SHLD  STRHD
08F5  C3 0C 00         2840           JMP   NXCODE        SET TO H,L+7
08F8                   2850  *
08F8                   2860  * SLEW ROUTINES
08F8                   2870  *
08F8                   2880  * ENTRY FOR SLEW OP CODE
08F8  CD 06 09         2890  SLEW     CALL  SLEWR
08FB  2A 13 C0         2900           LHLD  STRHD
08FE  23               2910           INX   H             MUST ADD 2 TO NEXT CODE ADDRESS
08FF  23               2920           INX   H
0900  22 13 C0         2930           SHLD  STRHD
0903  C3 0C 00         2940           JMP   NXCODE
0906                   2950  * BEGIN ROUTINE
0906  7E               2960  SLEWR    MOV   A,M           GET BYTE BACK
0907  CD 06 0A         2970           CALL  DELAY
090A  E6 0F            2980           ANI   0FH           00001111  SET UP CONTROL BYTE
090C  32 73 C0         2990           STA   SLBYTE        SAVE CONTROL BYTE
090F  23               3000           INX   H
0910  5E               3010           MOV   E,M           LOW COUNT BITS
0911  23               3020           INX   H
0912  56               3030           MOV   D,M           HIGH
0913                   3040  * ENTER HERE FROM OTHER ROUTINES (WITH CALL)
```

```
0913                 3050 * CONTROL CODE IN "SLBYTE"
0913                 3060 * COUNT IN D,E
0913                 3070 * TEMP PATCH
0913  EB             3080 SLEWI  XCHG
0914  22 37 C0       3090        SHLD  XCNT
0917  22 39 C0       3100        SHLD  YCNT
091A                 3110 * END PATCH
091A                 3120 * INITIALIZATION
091A  2A 1E C0       3130 SLIN   LHLD  SPD3          ENTER HERE FROM A GOTO
091D  22 3B C0       3140        SHLD  XTIME
0920  22 3D C0       3150        SHLD  YTIME
0923  3A 45 C0       3160        LDA   MBYTE
0926  F6 20          3170        ORI   20H           00100000 SET BIT5=SLEW
0928  32 45 C0       3180        STA   MBYTE
092B  D3 DA          3190        OUT   MPORT
092D  00             3208 SLEND  NOP
092E                 3210 * ADD ABORT TESTS HERE
092E                 3220 * X SLEW ROUTINES
092E  3A 73 C0       3230        LDA   SLBYTE
0931  E6 08          3240        ANI   8             DO WE MOVE X?
0933  CA 73 09       3250        JZ    TESTY         00001000  X MOVE
0936  DB DF          3260        IN    SPORT
0938  E6 04          3270        ANI   4             00000100  OUT CTRO
093A  CA 73 09       3280        JZ    TESTY
093D                 3290 * OK TO MOVE ON X
093D  2A 37 C0       3300        LHLD  XCNT
0940  EB             3310        XCHG
0941  2A 3B C0       3320        LHLD  XTIME         COUNTER & TIMER SUBROUTINE
0944  CD C1 09       3330        CALL  STEP
0947  22 3B C0       3340        SHLD  XTIME
094A  EB             3350        XCHG
094B  22 37 C0       3360        SHLD  XCNT
094E  DA 5C 09       3370        JC    DOX           CARRY=OK TO STEP
0951  3A 73 C0       3380        LDA   SLBYTE
0954  E6 07          3390        ANI   7             00000111 TURN OFF X
0956  32 73 C0       3400        STA   SLBYTE
0959  C3 73 09       3410        JMP   TESTY
095C                 3420 * DO AN X STEP
095C  7B             3430 DOX    MOV   A,E           LSB FOR COUNTER
095D  D3 D0          3440        OUT   CTRO
095F  7A             3450        MOV   A,D           MSB
0960  D3 D0          3460        OUT   CTRO
0962  3A 73 C0       3470        LDA   SLBYTE
0965  E6 04          3480        ANI   4             00000100  +/-  0=+
0967  CA 70 09       3490        JZ    DOXP
096A  CD A1 0B       3500        CALL  XLEFT         X-
096D  C3 73 09       3510        JMP   TESTY
0970  CD A4 0B       3520 DOXP   CALL  XRGHT
0973                 3530 * Y SLEW ROUTINES
0973  3A 73 C0       3540 TESTY  LDA   SLBYTE        DO WE MOVE Y?
0976  E6 02          3550        ANI   2             00000010  Y MOVE
```

```
0978 CA B8 09              3560           JZ    TSTXY
097B DB DF                 3570           IN    SPORT
097D E6 08                 3580           ANI   8          00001000  OUT CTR1
097F CA B8 09              3590           JZ    TSTXY
0982                       3600     * OK TO MOVE ON Y
0982 2A 39 C0              3610           LHLD  YCNT
0985 EB                    3620           XCHG
0986 2A 30 C0              3630           LHLD  YTIME
0989 CD C1 09              3640           CALL  STEP       COUNTER & TIMER SUBROUTINE
098C 22 3D C0              3650           SHLD  YTIME
098F EB                    3660           XCHG
0990 22 39 C0              3670           SHLD  YCNT
0993 DA A1 09              3680           JC    DOY        CARRY=OK TO STEP
0996 3A 0D C0              3690           LDA   SLBYTE
0999 E6 0D                 3700           ANI   0DH        00001101  TURN OFF Y
099B 32 0D C0              3710           STA   SLBYTE
099E C3 B8 09              3720           JMP   TSTXY
09A1                       3730     * DO AN Y STEP
09A1 7B                    3740     DOY   MOV   A,E
09A2 D3 D1                 3750           OUT   CTR1
09A4 7A                    3760           MOV   A,D
09A5 D3 D1                 3770           OUT   CTR1
09A7 3A 73 C0              3780           LDA   SLBYTE
09AA E6 01                 3790           ANI   1          00000001  +/-  0=+
09AC CA B5 09              3800           JZ    DOYP
09AF CD AA 0B              3810           CALL  YAWAY
09B2 C3 B8 09              3820           JMP   TSTXY
09B5 CD A7 0B              3830     DOYP  CALL  YTO
09B8                       3840     * TEST IF BOTH X & Y ARE DONE
09B8 3A 73 C0              3850     TSTXY LDA   SLBYTE
09BB E6 0A                 3860           ANI   0AH        00001010  DO X&Y PART
09BD C8                    3870           RZ               WAY OUT
09BE C3 2D 09              3880           JMP   SLEND
                           3890     * SUBROUTINE TO TAKE CARE OF THE TIMER
                           3900     * NUMBER AND DECREMENT THE COUNT
                           3910     *
                           3920     * ENTER WITH STEP COUNT IN D,E
                           3930     *                TIMER NUMBER IN H,L
                           3940     * RETURNS NEW NUMBERS AND CARRY SET IF OK TO STEP
09C1                       3950     *
09C1 7A                    3960     * CHECK TIMER COUNT
09C2 B3                    3970     STEP  MOV   A,D
09C3 C8                    3980           ORA   E
09C4                       3990           RZ               0=DONE  CARRY RESET IS FLAG
09C4 22 35 C0              4000     * DECREMENT COUNT BY ONE
09C7 EB                    4010           SHLD  TMNUM      SAVE AREA
09C8 2B                    4020           XCHG
09C9 22 33 C0              4030           DCX   H
09CC                       4040           SHLD  RCNT       GET COUNT TO H,L
09CC EB                    4050     * TIME TO SLOW DOWN?
09CD 2A 24 C0              4060           XCHG            SAVE AREA
                           4070           LHLD  SPD6
```

```
09D0 EB                 4080         XCHG
09D1 19                 4090         DAD   D
09D2 2A 35 C0           4100         LHLD  TMNUM
09D5 D2 ED 09           4110         JNC   TDOWN       CARRY=SLOW DOWN
09D8                    4120 * TIMER COUNT TO SPEED UP OR STAY PUT
09D8 EB                 4130         XCHG
09D9 2A 22 C0           4140         LHLD  SPD5
09DC EB                 4150         XCHG
09DD 19                 4160         DAD   D
09DE 2A 35 C0           4170         LHLD  TMNUM
09E1 D2 FF 09           4180         JNC   TMOUT       NO CARRY=GO NO FASTER
09E4                    4190 * SPEED UP
09E4 EB                 4200         XCHG
09E5 2A 1C C0           4210         LHLD  SPD2
09E8 EB                 4220         XCHG
09E9 19                 4230         DAD   D
09EA C3 FF 09           4240         JMP   TMOUT
09ED                    4250 * TIMER COUNT GOING DOWN (OR ALREADY THERE)
09ED EB                 4260 TDOWN   XCHG
09EE 2A 20 C0           4270         LHLD  SPD4
09F1 EB                 4280         XCHG
09F2 19                 4290         DAD   D
09F3 2A 35 C0           4300         LHLD  TMNUM
09F6 DA FF 09           4310         JC    TMOUT       ARE WE THE SLOWEST WE WANT
09F9                    4320 * SLOW DOWN
09F9 EB                 4330         XCHG
09FA 2A 1A C0           4340         LHLD  SPD1
09FD EB                 4350         XCHG
09FE 19                 4360         DAD   D
09FF                    4370 * EXIT
09FF EB                 4380 TMOUT   XCHG
0A00 2A 33 C0           4390         LHLD  RCNT        GET COUNT BACK
0A03 EB                 4400         XCHG
0A04 37                 4410         STC               CARRY=STEP IT!!
0A05 C9                 4420         RET
0A06                    4430 * DELAY ROUTINE
0A06 C5                 4440 DELAY   PUSH  B
0A07 01 00 00           4450         LXI   B,0
0A0A 05                 4460         DCR   B
0A0B C2 0A 0A           4470         JNZ   $-1
0A0E 0D                 4480         DCR   C
0A0F C2 0A 0A           4490         JNZ   $-5
0A12 C1                 4500         POP   B
0A13 C9                 4510         RET
0A14                    4520 *
0A14                    4530 * FONT WIDTH TABLE GENERATION
0A14                    4540 *
0A14 3E B3              4550 FTBLE   MVI   A,0B3H      TRS-80 WILL SLUFF TILL THIS CODE
0A16 D3 DE              4560         OUT   TPORT
0A18 23                 4570         INX   H           POINT TO STARTING NUMBER
0A19 46                 4580         MOV   B,M
0A1A 22 13 C0           4590         SHLD  STRHD       CORRECT FOR NEXT CODE
```

| Addr | Bytes | Line | Label | Op | Operand | Comment |
|---|---|---|---|---|---|---|
| 0A1D | 0E 60 | 4600 | FLOOK | MVI | C,60H | STARTING CHARACTER-1FH |
| 0A1F | 21 00 1C | 4610 | | LXI | H,FNTO1 | FONT AREA START |
| 0A22 | 78 | 4620 | | MOV | A,B | |
| 0A23 | 3D | 4630 | | DCR | A | MAKE A LEGAL FONT NO |
| 0A24 | CD 80 0A | 4640 | | CALL | FFIND | |
| 0A27 | D2 2D 0A | 4650 | | JNC | $+6 | CARRY MEANS NO MATCH |
| 0A2A | 21 6B 0A | 4660 | | LXI | H,NOFON-3 | FFFF TO FOOL LOOKUP |
| 0A2D | 23 | 4670 | | INX | H | POINT TO ACTUAL FONT (OR DUMMY) |
| 0A2E | 23 | 4680 | | INX | H | |
| 0A2F | 23 | 4690 | | INX | H | |
| 0A30 | 22 74 C0 | 4700 | | SHLD | FADD | SAVE ADDRESS FOR RESETTING |
| 0A33 | 23 | 4710 | | INX | H | PIONT TO HEIGHT (LOW BITS) |
| 0A34 | 23 | 4720 | | INX | H | |
| 0A35 | 23 | 4730 | | INX | H | |
| | | 4732 | * PASS 13 SPECIAL FONT SPECIFICATION BYTES TO TRS-80 | | | |
| 0A36 | 16 0D | 4734 | | MVI | D,13 | |
| 0A38 | 7E | 4740 | SPEC | MOV | A,M | |
| 0A39 | CD 74 0A | 4750 | | CALL | TO80 | |
| 0A3C | 23 | 4760 | | INX | H | |
| 0A3D | 15 | 4770 | | DCR | D | |
| 0A3E | C2 38 0A | 4780 | | JNZ | SPEC | INDEX TO NEXT BYTE |
| 0A41 | 2A 74 C0 | 4820 | CLOOK | LHLD | FADD | RESET TO BEGFINNING OF FONT |
| 0A44 | 79 | 4830 | | MOV | A,C | CHARACTER-1FH |
| 0A45 | C6 1F | 4840 | | ADI | 1FH | MAKE IT A LEGAL LETTER |
| 0A47 | CD 8C 0B | 4850 | | CALL | CFIND | |
| 0A4A | D2 50 0A | 4860 | | JNC | $+6 | CARRY MEANS NO MATCH |
| 0A4D | 21 6B 0A | 4870 | | LXI | H,NOFON-3 | FFFF |
| 0A50 | 23 | 4880 | | INX | H | GET TO WIDTH |
| 0A51 | 23 | 4890 | | INX | H | |
| 0A52 | 23 | 4900 | | INX | H | |
| 0A53 | 7E | 4910 | | MOV | A,M | HIGH WIDTH IN BINARY |
| 0A54 | CD 74 0A | 4920 | | CALL | TO80 | |
| 0A57 | 23 | 4930 | | INX | H | |
| 0A58 | 7E | 4940 | | MOV | A,M | LOW |
| 0A59 | CD 74 0A | 4950 | | CALL | TO80 | |
| 0A5C | 0D | 4960 | | DCR | C | |
| 0A5D | C2 41 0A | 4970 | | JNZ | CLOOK | CHARACTER |
| 0A60 | 05 | 4980 | | DCR | B | |
| 0A61 | C2 1D 0A | 4990 | | JNZ | FLOOK | FONT |
| 0A64 | DB DF | 4992 | | IN | SPORT | |
| 0A66 | E6 02 | 4994 | | ANI | 2 | |
| 0A68 | CA 64 0A | 4996 | | JZ | $-4 | |
| 0A6B | C3 0C 00 | 5000 | | JMP | NXCODE | |
| 0A6E | FF FF | 5010 | NOFON | DW | 0FFFFH | |
| 0A70 | FF FF | 5020 | | DW | 0FFFFH | |
| 0A72 | FF FF | 5030 | | DW | 0FFFFH | |
| | | 5040 | * | | | |
| | | 5050 | * OUTPUT A BYTE TO THE TRS-80 | | | |
| | | 5060 | * | | | |
| 0A74 | F5 | 5070 | TO80 | PUSH | PSW | |
| 0A74 | DB DF | 5080 | BZ80 | IN | SPORT | WAIT TIL LAST BYTE READ |
| 0A77 | E6 02 | 5090 | | ANI | 2 | NOW LETS GET TO WORK |
| 0A79 | CA 75 0A | 5100 | | JZ | BZ80 | DUMMY NO FONT OR LETTER |
| 0A7C | F1 | 5110 | | POP | PSW | 0000 0010 |

```
0A7D D3 DE          5120           OUT   TPORT         THERE IT GOES!
0A7F C9             5130           RET
0A80                5140  *
0A80                5150  * SUBROUTINE TO DO NEW FONT SEARCH BY FONT POSITION, NOT FIRST NUMBER
0A80                5160  * ALSO NOW SETS FONT 8 TO STRING/FONT 8 AREA
0A80                5170  *
0A80 C5             5180  FFIND    PUSH  B
0A81 D5             5190           PUSH  D
0A82 0E 00          5200           MVI   C,0            SET COUNTER TO FONT 0
0A84 FE 09          5210           CPI   9              9 IS LOADABLE FONT 9 OR LOGO
0A86 C2 96 0A       5220           JNZ   LOOK
0A89 21 FF C0       5230           LXI   H,STDEF-1      STRING/FONT8 AREA
0A8C 3E FF          5232           MVI   A,0FFH
0A8E BE             5233           CMP   M              A FF MEANS WE DONT HAVE A FONT8/LOGO
0A8F C2 B0 0A       5235           JNZ   CHERE
0A92 37             5236           STC                  CARRY SET = NOT HERE
0A93 C3 B2 0A       5238           JMP   LKOUT
0A96 47             5270  LOOK     MOV   B,A
0A97 3E FF          5280           MVI   A,0FFH
0A99 BE             5290           CMP   M
0A9A 78             5300           MOV   A,B
0A9B C2 A2 0A       5310           JNZ   CCK
0A9E 37             5320           STC                  CARRY SET = NO MATCH
0A9F C3 B2 0A       5330           JMP   LKOUT
0AA2 B9             5332  CCK      CMP   C              COMPARE A (WANT) TO C (FONT#)
0AA3 CA B0 0A       5334           JZ    CHERE
0AA6 0C             5340  CMORE    INR   C              SET C TO NEXT FONT#
0AA7 23             5350           INX   H              LSB JUMP AMOUNT
0AA8 5E             5360           MOV   E,M
0AA9 23             5370           INX   H              MSB
0AAA 56             5380           MOV   D,M
0AAB 19             5390           DAD   D              INDEX TO NEXT FONT
0AAC 2B             5400           DCX   H              FIX
0AAD C3 96 0A       5410           JMP   LOOK
0AB0 37             5420  CHERE    STC
0AB1 3F             5430           CMC                  CARRY NOT SET = FONT FOUND
0AB2 D1             5440  LKOUT    POP   D
0AB3 C1             5450           POP   B
0AB4 C9             5460           RET
0AB5
0AB5
0AB5
0AB5 CD F3 0A
0AB8 B7
0AB9 C2 B5 0A
0ABC CD F3 0A
0ABF B7
0AC0 CA BC 0A
0AC3
0AC3 47
0AC4 3E 54
0AC6 D3 DE
```

```
0AC8  78
0AC9  21 FF C0
0ACC  77
0ACD  23
0ACE  CD F3 0A
0AD1  77
0AD2  23
0AD3  5F
0AD4  CD F3 0A
0AD7  77
0AD8  23
0AD9  57
0ADA  1B
0ADB  1B
0ADC  CD F3 0A
0ADF  77
0AE0  23
0AE1  1B
0AE2  7B
0AE3  B2
0AE4  C2 DC 0A
0AE7  22 46 C0
0AEA  21 FC 0A
0AED  22 13 C0
0AF0  C3 0C 00
0AF3
0AF3  DB DF
0AF5  E6 01
0AF7  C2 F3 0A
0AFA  DB DE
0AFC  C9
0AFD  FF
0AFE

5960  TRIX  DB   0FFH
                  7000  ZZZZZ EQU  *
```

SYMBOL TABLE

```
BELLI 0815   BITS  07F6   BZ80  0A75   CCK   0AA2   CCONT 080F
CHERE 0AB0   CLOOK 0A41   CMORE 0AA6   CTLCU 07DE   DELAY 0A06
DOX   095C   DOXP  0970   DOY   09A1   DOYP  09B5   FFIND 0A80
FINIS 084A   FLOOK 0A1D   FNTOK 0868   FONT9 0AB5   FOUND 0809
FTBLE 0A14   GETFT 0AF3   GETMR 0ADC   GOOUT 08D9   GOTOI 0878
JMP1  070A   JMP2  088E   JMPOU 0708   LDLOO 08EA   LDSPD 08DD
LFONT 0850   LKOUT 0AB2   LOAD  08E5   LOOK  0A96   LOOP  07A2
MOTOF 07E7   MOTON 07ED   MOTOU 07F0   NGTX  08B1   NLOOP 07B6
NOFON 0A6E   RTSIN 07BC   RTZIN 082B   SLEND 092D   SLEW  08F8
SLEWI 0913   SLEWR 0906   SLIN  091A   SLOWI 081C   SLOW0 0824
SPEC  0A38   STATU 078A   STEP  09C1   STOPI 07CC   TDOWN 09ED
TESTY 0973   TMOUT 09FF   TOBO  0A74   TRIX  0AFD   TSTXY 09B8
ZERO  0ABC   ZEROS 0846   ZZZZZ 0AFE
```

SAVED SYMBOL TABLE

```
ABORT 0B95   ADDCT 0B86   ADDUP C07B   BAKSW C048   BIG   0000
BITPA 1200   BR    1200   BTADD C084   BUGS  0000   BYTEC C0A4
```

| | | | | | | | |
|---|---|---|---|---|---|---|---|
| CCBYT | C066 | CCFOU | C065 | CCURT | C067 | CFIND | OBBC | CFONT | COOE |
| CLEAR | 0006 | CLRCT | 000F | CLSB | 004B | CMSB | 0000 | CNTAD | COA2 |
| COILS | OBB2 | COILX | C041 | COILY | C043 | CONTR | 0700 | CPM | C068 |
| CREV | C069 | CSS | 1400 | CTBEG | C061 | CTHIS | C063 | CTRO | OODO |
| CTR1 | 00D1 | CTR2 | 00D2 | CTRXX | 00D3 | CUTHL | COAB | CUTIN | 0009 |
| DADDR | C05F | DATA | C000 | DATE | 0224 | DEBUG | 1206 | DIRSA | C07D |
| DNBEG | FF6F | DNUM | 00AA | DOWN | C00D | ENDFT | C000 | EXIT | C08B |
| FADD | C074 | FIRST | COA9 | FNT01 | 1C00 | FOURC | C05D | FPORT | 00FF |
| GOIN | 0B83 | GOTO | 0703 | GOXNE | C04F | GOXPO | C04D | GOYNE | C053 |
| GOYPO | C051 | HLHOL | C079 | HOLD | C08D | HOLDA | C05E | HOLDB | C082 |
| HOLDH | C049 | INITL | 0000 | ITALS | C016 | LETTE | 1209 | LIT | 0700 |
| MBYTE | 0000 | MEM | COA6 | MEMCT | COAO | MEMST | 4000 | MIRRO | C019 |
| MPORT | OODA | MVIT | C012 | NEWDI | C08E | NXCOD | 000C | OVAL | C06A |
| OVALC | C06D | OVALD | C070 | OVALR | C072 | PACKB | C09E | PACKC | C09F |
| PAIRC | C083 | PSW | 0006 | RCNT | C033 | ROUTC | 0BB0 | ROUTI | 1203 |
| S1POR | 00DB | S2POR | 00DC | SAVXY | OBAD | SIZCX | C055 | SIZCY | C058 |
| SIZHA | C078 | SIZHX | C006 | SIZHY | C009 | SLBYT | C073 | SLOCH | C09D |
| SLOWB | C012 | SPD1 | C01A | SPD2 | C01C | SPD3 | C01E | SPD4 | C020 |
| SPD5 | C022 | SPD6 | C024 | SPD7 | C026 | SPD8 | C027 | SPD9 | C028 |
| SPORT | 00DF | STAK | C010 | STAKS | FFFF | START | 0003 | STDEF | C100 |
| STEPC | 004B | STEPS | C081 | STRHD | C013 | STRIN | C046 | SUB | 0BB0 |
| SUBCT | 0BB9 | THRES | C080 | TIMAD | C05B | TIMCT | C015 | TIMHD | C005 |
| TMDN | FFEC | TMHI | F31C | TMHIP | OCE4 | TMLOW | FE57 | TMNUM | C035 |
| TMPHL | C03F | TMUP | 0014 | TPORT | OODE | TRS | FFFF | TRSIN | C04B |
| TSOL | 0000 | XADD | C001 | XCCNT | C093 | XCNT | C037 | XCOUN | C076 |
| XLEFT | OBA1 | XMM | C031 | XNOW | C091 | XPORT | 00D8 | XPP | C02B |
| XPREV | C08F | XRESE | C07F | XRGHT | OBA4 | XSPAC | COA8 | XSTAR | C089 |
| XTIME | C03B | XXYY | C029 | XYAVE | 0B98 | XYCAL | 0B9B | XYDIR | C086 |
| XYINI | 0B9E | XYPRT | OBBF | YADD | C003 | YAWAY | OBAA | YCCNT | C099 |
| YCNT | C039 | YCOUN | C077 | YMM | C031 | YNOW | C097 | YPORT | 00D9 |
| YPP | C02F | YPREV | C095 | YRESE | C07E | YSPAC | C088 | YSTAR | C087 |
| YTIME | C03D | YTO | OBA7 | YZERO | C09B | | | | |

```
0000
0000          0010 * SUB *
0000          0020 * SUB *
0000          0030 *
0B80          0040 *        ORG    SUB
0B80          0050 * JMP TABLE
0B80          0060 *
0B80 C3 BC 0B 0070          JMP    JMP1        ROUTC
0B83 C3 75 0D 0080          JMP    JMP2        GOIN
0B86 C3 A4 0D 0090          JMP    JMP3        ADDCT
0B89 C3 B2 0D 0100          JMP    JMP4        SUBCT
0B8C C3 C0 0D 0110          JMP    JMP5        CFIND
0B8F C3 E2 0D 0120          JMP    JMP6        XYPRT
0B92 C3 E3 0D 0130          JMP    JMP7        ERROR
0B95 C3 74 0D 0140          JMP    JPS9        ABORT
0B98 C3 E9 0D 0150          JMP    JMP10       XYAVER
0B9B C3 16 0E 0160          JMP    JMP11       XYCALL
0B9E C3 79 0E 0170          JMP    JMP12       XYINIT
0BA1          0180 * XLEFT,XRGHT,YTO,YAWAY
0BA1 C3 AA 0E 0200          JMP    JPS13
0BA4 C3 CA 0E 0210          JMP    JPS14
0BA7 C3 EA 0E 0220          JMP    JPS15
0BAA C3 0A 0F 0230          JMP    JPS16
```

```
OBAD C3 73 OD      0240          JMP   JMP17      SAVXY FOR LETTER DEBUG
OBB0 24 02         0250          DW    DATE
OBB2               0260   * TABLE USED TO OUTPUT COIL PATTERNS
OBB2 00            0270          DB    0          END STOP -- DO NOT CHANGE ORDER OF NEXT 10 BYTES
OBB3 01 19         0280          DW    1901H      1
OBB5 08 1A         0290          DW    1A08H      2
OBB7 02 16         0300          DW    1602H      3
OBB9 04 15         0310          DW    1504H      4
OBBB 00            0320          DB    0          END STOP
OBBC               0330   *
OBBC               0340   * SUBROUTINE TO OUTPUT STEPPER PULSES
OBBC               0350   * DIRECTIVE BYTE MUST BE IN A
OBBC               0360   *     BIT 7 = 1 FOR X MOVEMENT
OBBC               0370   *         6 = 0 FOR + MOVE, 1 FOR - MOVE
OBBC               0380   *         5 = Y
OBBC               0390   *         4 = Y +/-
OBBC               0400   *
OBBC F5            0410   JMP1   PUSH  PSW
OBBD C5            0420          PUSH  B
OBBE D5            0430          PUSH  D
OBBF E5            0440          PUSH  H
OBC0               0450   * X/Y EXCHANGE ROUTINE
OBC0 47            0460          MOV   B,A
OBC1 3A 19 C0      0470          LDA   MIRROR
OBC4 B7            0480          ORA   A
OBC5 CA 00 0C      0490          JZ    ROUTB      0=NO SWITCHES
OBC8 E6 04         0500          ANI   4          0000 0100  0=NO EXCHANGE
OBCA CA DA 0B      0510          JZ    REVX
OBCD 78            0520          MOV   A,B
OBCE 0F            0530          RRC
OBCF 0F            0540          RRC                MOVE X PART TO Y
OBD0 E6 30         0550          ANI   30H          0011 0000
OBD2 4F            0560          MOV   C,A
OBD3 78            0570          MOV   A,B
OBD4 07            0580          RLC
OBD5 07            0590          RLC                MOVE Y PART TO X
OBD6 E6 C0         0600          ANI   0C0H         1100 0000
OBD8 B1            0610          ORA   C            PUT THEM TOGETHER
OBD9 47            0620          MOV   B,A
OBDA               0630   * MIRROR IMAGE ROUTINES
OBDA 3A 19 C0      0640   REVX   LDA   MIRROR
OBDD E6 01         0650          ANI   1            0000 0001  0=NO REVERSE
OBDF CA EC 0B      0660          JZ    REVY
OBE2 78            0670          MOV   A,B
OBE3 2F            0680          CMA
OBE4 E6 40         0690          ANI   40H          0100 0000   X +/- PART
OBE6 4F            0700          MOV   C,A
OBE7 78            0710          MOV   A,B
OBE8 E6 BF         0720          ANI   0BFH         1011 1111
OBEA B1            0730          ORA   C            NOW X +/- PART REVERSED
OBEB 47            0740          MOV   B,A
OBEC 3A 19 C0      0750   REVY   LDA   MIRROR
OBEF E6 02         0760          ANI   2            0000 0010  0=NO REVERSE
OBF1 CA 00 0C      0770          JZ    ROUTB
```

```
OBF4 78              0780        MOV   A,B
OBF5 2F              0790        CMA
OBF6 E6 10           0800        ANI   10H        0001 0000   Y +/- PART
OBF8 4F              0810        MOV   C,A
OBF9 78              0820        MOV   A,B
OBFA E6 EF           0830        ANI   0EFH       1110 1111
OBFC B1              0840        ORA   C          NOW Y +/- PART REVERSED
OBFD C3 01 OC        0850        JMP   ROUTX
OC00 78              0860 ROUTB  MOV   A,B
OC01 32 78 OC        0870 ROUTX  STA   SIZHA      SAVE X/Y DIRECTIVE BYTE
OC04                 0880 *
OC04                 0890 *  ADD OR SUBTRACT INTO SIZCX AND SIZCY
OC04                 0900 *  THESE 3 BYTE COUNTERS ARE IN THE FORM X.XX
OC04                 0910 *  THESE COUNTERS REPRESENT "WHERE WE SHOULD BE" IN EXACT AMOUNTS
OC04                 0920 *  A STEP IS TAKEN WHEN THE MSB IS LESS THAN 0 OR GREATER THAN 1
OC04                 0930 *
OC04 3A 78 CO        0940        LDA   SIZHA      GET DIRECTIVE BYTE
OC07 E6 80           0950        ANI   80H        1000 0000   X?
OC09 CA 31 OC        0960        JZ    TESTY
OC0C                 0970 *  THERE IS A X MOVE
OC0C 3A 19 CO        0980        LDA   MIRROR
OC0F E6 04           0990        ANI   4          0000 0100   X/Y EXCHANGE SWITCH
OC11 CA 1A OC        1000        JZ    $+9
OC14 21 OB OC        1010        LXI   H,SIZHY+2  USE Y SHRINK ON X BECAUSE OF EXCHANGE
OC17 C3 1D OC        1020        JMP   $+6
OC1A 21 08 OC        1030        LXI   H,SIZHX+2
OC1D 11 57 OC        1040        LXI   D,SIZCX+2
OC20 3A 78 CO        1050        LDA   SIZHA
OC23 E6 40           1060        ANI   40H        0100 0000   +/-?
OC25 CA 2E OC        1070        JZ    XPOS
OC28                 1080 *  SUBTRACT FOR X- MOVE
OC28 CD 89 OB        1090        CALL  SUBCT
OC2B C3 31 OC        1100        JMP   TESTY
OC2E                 1110 *  ADD FOR X+ MOVE
OC2E CD 86 OB        1120 XPOS   CALL  ADDCT
OC31                 1130 *  TEST FOR A Y MOVE
OC31 3A 78 CO        1140 TESTY  LDA   SIZHA
OC34 E6 20           1150        ANI   20H        0010 0000   Y?
OC36 CA 5E OC        1160        JZ    TESTS
OC39                 1170 *  THERE IS A Y MOVE
OC39 3A 19 CO        1180        LDA   MIRROR
OC3C E6 04           1190        ANI   4          0000 0100
OC3E CA 47 OC        1200        JZ    $+9
OC41 21 08 OC        1210        LXI   H,SIZHX+2  USE X SHRINK ON Y BECAUSE OF EXCHANGE
OC44 C3 4A OC        1220        JMP   $+6
OC47 21 OB OC        1230        LXI   H,SIZHY+2
OC4A 11 5A OC        1240        LXI   D,SIZCY+2  EXACT Y MOVE AMOUNT
OC4D 3A 78 CO        1250        LDA   SIZHA      Y COUNTER
OC52 E6 10           1260        ANI   10H        0001 0000   +/-?
OC52 CA 5B OC        1270        JZ    YPOS
OC55                 1280 *  SUBTRACT FOR Y- MOVE
OC55 CD 89 OB        1290        CALL  SUBCT
OC58 C3 5E OC        1300        JMP   TESTS
OC5B                 1310 *  ADD FOR Y+ MOVE
```

```
0C5B  CD 86 0B        1320 YPOS   CALL  ADDCT
0C5E                  1330 *
0C5E                  1340 * TEST IF WE HAVE ANY STEPS TO DO
0C5E                  1350 *
0C5E  3A 58 C0        1360 TESTS  LDA   SIZCY           MSB Y COUNTER
0C61  21 55 C0        1370        LXI   H,SIZCX         MSB X COUNTER
0C64  B6              1380        ORA   M               BOTH ZERO?
0C65  CA 6D 0D        1390        JZ    SEXIT
0C68                  1400 *
0C68                  1410 * TEST FOR X STEP
0C68                  1420 *
0C68  3A 55 C0        1430        LDA   SIZCX
0C6B  B7              1440        ORA   A
0C6C  CA E9 0C        1450        JZ    TRYY
0C6F                  1460 * CHECK X TIMER
0C6F  DB DF           1470 XT     IN    SPORT
0C71  E6 04           1480        ANI   4
0C73  CA 6F 0C        1490        JZ    XT              CTR0 READY
0C76                  1500 * X +/-?  MSB NE 0
0C76  3A 55 C0        1510        LDA   SIZCX
0C79  FE 80           1520        CPI   80H             TESTING FOR 01,02 - FF,FE ETC.
0C7B  FA A9 0C        1530        JM    XPOUT
0C7E                  1540 * STEP X-
0C7E  CD A1 0B        1550 XMOUT  CALL  XLEFT
0C81                  1560        IF    BUGS            ADD 1 TO REFLECT STEP TAKEN
0C81  21 55 C0        1590        LXI   H,SIZCX
0C84  34              1600        INR   M
0C85                  1610 * SET COUNTER
0C85  3A 26 C0        1620        LDA   SPD7
0C88  D3 D0           1630        OUT   CTR0
0C8A  3A 27 C0        1640        LDA   SPD8
0C8D  D3 D0           1650        OUT   CTR0
0C8F                  1660 * CHECK FOR - ITALIC MOVE
0C8F  3A 17 C0        1670        LDA   ITALS+1         ITALIC SWITCH
0C92  B7              1680        ORA   A
0C93  CA E9 0C        1690        JZ    TRYY
0C96  3A 19 C0        1700        LDA   MIRROR
0C99  E6 04           1710        ANI   4               0000 0100
0C9B  CA E9 0C        1720        JZ    TRYY            NO ITALIC HERE IF NO X/Y EXCHANGE
0C9E  3A 19 C0        1730        LDA   MIRROR
0CA1  E6 02           1740        ANI   2               0000 0010
0CA3  CA E0 0C        1750        JZ    PXTAL
0CA6  C3 D4 0C        1760        JMP   MXTAL
0CA9                  1770 * STEP X+
0CA9  CD A4 0B        1780 XPOUT  CALL  XRGHT
0CAC                  1790        IF    BUGS            SUBTRACT 1 TO REFLECT STEP TAKEN
0CAC  21 55 C0        1820        LXI   H,SIZCX
0CAF  35              1830        DCR   M
0CB0                  1840 * SET COUNTER
0CB0  3A 26 C0        1850        LDA   SPD7
0CB3  D3 D0           1860        OUT   CTR0
0CB5  3A 27 C0        1870        LDA   SPD8
0CB8  D3 D0           1880        OUT   CTR0
0CBA                  1890 * CHECK FOR + ITALIC MOVE
```

```
0CBA  3A 17 C0      1900        LDA   ITALS+1          ITALIC SWITCH
0CBD  B7            1910        ORA   A
0CBE  CA E9 0C      1920        JZ    TRYY
0CC1  3A 19 C0      1930        LDA   MIRROR
0CC4  E6 04         1940        ANI   4
0CC6  CA E9 0C      1950        JZ    TRYY             0000 0100
0CC9  3A 19 C0      1960        LDA   MIRROR           NO ITALIC HERE IF NO X/Y EXCHANGE
0CCC  E6 02         1970        ANI   2
0CCE  CA D4 0C      1980        JZ    MXTAL            0000 0010
0CD1  C3 E0 0C      1990        JMP   PXTAL
                    2000  * ROUTINES TO SET Y AXIS ITALIC COUNT
0CD4  21 18 C0      2010  MXTAL LXI   H,ITALS+2        ITALIC MOVE AMOUNT
0CD7  11 5A C0      2020        LXI   D,SIZCY+2        Y COUNTER
0CDA  CD 89 0B      2030        CALL  SUBCT
0CDD  C3 E9 0C      2040        JMP   TRYY
0CE0  21 18 C0      2050  PXTAL LXI   H,ITALS+2
0CE3  11 5A C0      2060        LXI   D,SIZCY+2
0CE6  CD 86 0B      2070        CALL  ADDCT
                    2080  *
                    2090  * TEST FOR Y STEP
                    2100  *
0CE9  3A 58 C0      2110  TRYY  LDA   SIZCY            MSB Y COUNTER
0CEC  B7            2120        ORA   A
0CED  CA 6A 0D      2130        JZ    ROUTE
                    2140  * CHECK Y TIMER
0CF0  DB DF         2150  YT    IN    SPORT
0CF2  E6 08         2160        ANI   8                CTR1 READY
0CF4  CA F0 0C      2170        JZ    YT
                    2180  * Y +/-? MSB NE 0
0CF7  3A 58 C0      2190        LDA   SIZCY
0CFA  FE 80         2200        CPI   80H
0CFC  FA 2A 0D      2210        JM    YPOUT            TESTING FOR 01,02 - FF,FE ETC.
                    2220  * STEP Y-
0CFF  CD A7 0B      2230  YMOUT CALL  YTO
0D02                2240        IF    BUGS
0D02  21 58 C0      2270        LXI   H,SIZCY
0D05  34            2280        INR   M                ADD 1 TO REFLECT STEP TAKEN
                    2290  * SET COUNTER
0D06  3A 26 C0      2300        LDA   SPD7
0D09  D3 D1         2310        OUT   CTR1
0D0B  3A 27 C0      2320        LDA   SPD8
0D0E  D3 D1         2330        OUT   CTR1
                    2340  * CHECK FOR - ITALIC MOVE
0D10  3A 17 C0      2350        LDA   ITALS+1          ITALIC SWITCH
0D13  B7            2360        ORA   A
0D14  CA 6A 0D      2370        JZ    ROUTE
0D17  3A 19 C0      2380        LDA   MIRROR           0000 0100
0D1A  E6 04         2390        ANI   4
0D1C  C2 6A 0D      2400        JNZ   ROUTE            NO ITALIC HERE IF X/Y EXCHANGE
                    2410  * DIRECTION DEPENDS ON MIRROR
0D1F  3A 19 C0      2420        LDA   MIRROR
0D22  E6 01         2430        ANI   1                0000 0001
0D24  CA 55 0D      2440        JZ    MITAL            0=NO MIRROR
0D27  C3 61 0D      2450        JMP   PITAL
```

```
0D2A                2460 * STEP Y+
0D2A  CD AA 0B      2470 YPOUT   CALL    YAWAY
0D2D                2480         IF      BUGS
0D2D  21 58 C0      2510         LXI     H,SIZCY
0D30  35            2520         DCR     M              SUBTRACT 1 TO REFLECT STEP TAKEN
0D31                2530 * SET COUNTER
0D31  3A 26 C0      2540         LDA     SPD7
0D34  D3 D1         2550         OUT     CTR1
0D36  3A 27 C0      2560         LDA     SPD8
0D39  D3 D1         2570         OUT     CTR1
0D3B                2580 * CHECK FOR + ITALIC MOVE
0D3B  3A 17 C0      2590         LDA     ITALS+1        ITALIC SWITCH
0D3E  B7            2600         ORA     A
0D3F  CA 6A 0D      2610         JZ      ROUTE
0D42  3A 19 C0      2620         LDA     MIRROR
0D45  E6 04         2630         ANI     4              0000 0100
0D47  C2 6A 0D      2640         JNZ     ROUTE          NO ITALIC HERE IF X/Y EXCHANGE
0D4A                2650 * DIRECTION DEPENDS ON MIRROR
0D4A  3A 19 C0      2660         LDA     MIRROR
0D4D  E6 01         2670         ANI     1              0000 0001
0D4F  CA 61 0D      2680         JZ      PITAL          0=NO MIRROR
0D52  C3 55 0D      2690         JMP     MITAL
0D55                2700 *
0D55                2710 * ROUTINES TO SET X AXIS ITALIC MOVES
0D55                2720 *
0D55  21 18 C0      2730 MITAL   LXI     H,ITALS+2      ITALIC MOVE AMOUNT
0D58  11 57 0B      2740         LXI     D,SIZCX+2      X COUNTER
0D5B  CD 89 0B      2750         CALL    SUBCT
0D5E  C3 6A 0D      2760         JMP     ROUTE
0D61  21 18 C0      2770 PITAL   LXI     H,ITALS+2
0D64  11 57 0B      2780         LXI     D,SIZCX+2
0D67  CD 86 0B      2790         CALL    ADDCT
0D6A                2800 * STEP ROUTINES EXIT HERE
0D6A  C3 5E 0C      2810 ROUTE   JMP     TESTS          TRY AGAIN AS WE MAY HAVE MORE TO DO
0D6D  00            2820 SEXIT   NOP
0D6E                2830         IF      BUGS
0D6E  E1            2890         POP     H
0D6F  D1            2900         POP     D
0D70  C1            2910         POP     B
0D71  F1            2920         POP     PSW
0D72  C9            2930         RET
0D73                2940 *
0D73                2950 * SAVE X/Y POSITIONS IN ADDR IN XXYY FOR LETTER DEBUG
0D73                2960 * SAVE THE MIN/MAX POSITIONS FOR THE FONT PROGRAMS
0D73                2970 *
0D73                2980 JMP17   EQU     $
0D73                2981         IF      BUGS           IF TRS
0D73  C9            3540         RET
0D74                3545 * ABORT SUBROUTINE WILL GO HERE
0D74  C9            3550 JPS9    RET
0D75                3560 *
0D75                3570 * ROUTINE TO SUBTRACT TWO NUMBERS IN D,E AND H,L.
0D75                3580 * ABSOLUTE DIFFRENCE IN D,E WITH SIGN & ZERO FLAGS
0D75                3590 * NORMALLY GOTO IN D AND PRESENT LOCATION IN H
```

```
0D75                 3600 * IF MINUS THEN MOVEMENT WILL BE MINUS
0D75                 3610 *
0D75 97              3620 JMP2   SUB  A
0D76 82              3630        ADD  D
0D77 FA A2 0D        3640        JM   GOOUT     NEGATIVE INVALID
0D7A FE 75           3650        CPI  75H
0D7C F2 A2 0D        3660        JP   GOOUT     OVER 30,000 INVALID
0D7F 97              3670        SUB  A
0D80 84              3680        ADD  H
0D81 FA A2 0D        3690        JM   GOOUT
0D84 FE 75           3700        CPI  75H
0D86 F2 A2 0D        3710        JP   GOOUT
0D89 7B              3720        MOV  A,E       LOW BITS
0D8A 95              3730        SUB  L
0D8B 5F              3740        MOV  E,A
0D8C 7A              3750        MOV  A,D       HIGH BITS
0D8D 9C              3760        SBB  H
0D8E 57              3770        MOV  D,A
0D8F B3              3780        ORA  E
0D90 C8              3790        RZ
0D91 97              3800        SUB  A
0D92 82              3810        ADD  D
0D93 FA 9A 0D        3820        JM   $+7
0D96 3E 01           3830        MVI  A,1
0D98 B7              3840        ORA  A         SET FLAGS NON-ZERO & POSITIVE
0D99 C9              3850        RET
0D9A 7B              3860        MOV  A,E       NEGATIVE NUMBER!
0D9B 2F              3870        CMA
0D9C 5F              3880        MOV  E,A
0D9D 7A              3890        MOV  A,D
0D9E 2F              3900        CMA
0D9F 57              3910        MOV  D,A       NOW ONES COMPLEMENT
0DA0 13              3920        INX  D         NOW TWOS
0DA1 C9              3930        RET            MINUS SET NOT ZERO
0DA2 97              3940 GOOUT  SUB  A         ZERO SET
0DA3 C9              3950        RET
0DA4                 3960 * ROUTINES TO ADD AND SUBTRACT INTO NEW "WHERE WE SHOULD BE" COUNTERS
0DA4                 3970 * EITHER SIZHX+2 OR SIZHY+2 MUST BE IN H,L
0DA4                 3980 * EITHER SIZCX+2 OR SIZCY+2 MUST BE IN D,E
0DA4                 3990 *
0DA4                 4000 * ADDCT
0DA4 1A              4010 JMP3   LDAX D         GET LSB OF COUNTER
0DA5 86              4020        ADD  M         LSB OF STEP VALUE
0DA6 12              4030        STAX D
0DA7 2B              4040        DCX  H
0DA8 1B              4050        DCX  D
0DA9 1A              4060        LDAX D
0DAA 8E              4070        ADC  M
0DAB 12              4080        STAX D
0DAC 2B              4090        DCX  H
0DAD 1B              4100        DCX  D
0DAE 1A              4110        LDAX D
0DAF 8E              4120        ADC  M
0DB0 12              4130        STAX D
```

```
ODB1  C9              4140        RET
ODB2                  4150  * SUBCT
ODB2  1A              4160  JMP4   LDAX  D
ODB3  96              4170         SUB   M
ODB4  12              4180         STAX  D
ODB5  2B              4190         DCX   D
ODB6  1B              4200         DCX   D
ODB7  1A              4210         LDAX  D
ODB8  9E              4220         SBB   M
ODB9  12              4230         STAX  D
ODBA  2B              4240         DCX   H
ODBB  1B              4250         DCX   D
ODBC  1A              4260         LDAX  D
ODBD  9E              4270         SBB   M
ODBE  12              4280         STAX  D
ODBF  C9              4290         RET
ODC0                  4300  *
ODC0                  4310  * SUBROUTINE TO SEARCH TABLE FOR KEY
ODC0                  4320  *
ODC0                  4330  * CHARACTER OR KEY IN A, TABLE ADDRESS IN H,L
ODC0                  4340  * RETURNS CHARACTER ADDRESS IN H,L
ODC0                  4350  *
ODC0  C5              4360  JMP5   PUSH  B
ODC1  D5              4370         PUSH  D
ODC2  16  00          4380         MVI   D,0
ODC4  BE              4390  CLOOK  CMP   M
ODC5  CA  DD  0D      4400         JZ    CHERE
ODC8  47              4410         MOV   B,A
ODC9  3E  FF          4420         MVI   A,0FFH
ODCB  BE              4430         CMP   M
ODCC  C2  D3  0D      4440         JNZ   CMORE
ODCF  37              4450         STC
ODD0  C3  DF  0D      4460         JMP   LKOUT
ODD3  23              4470  CMORE  INX   H
ODD4  5E              4480         MOV   E,M
ODD5  23              4490         INX   H
ODD6  56              4500         MOV   D,M
ODD7  19              4510         DAD   D
ODD8  2B              4520         DCX   H
ODD9  78              4530         MOV   A,B
ODDA  C3  C4  0D      4540         JMP   CLOOK
ODDD  37              4550  CHERE  STC
ODDE  3F              4560         CMC
ODDF  D1              4570  LKOUT  POP   D
ODE0  C1              4580         POP   B
ODE1  C9              4590         RET
ODE2                  4600  *
ODE2                  4610  * ROUTINE TO OUTPUT NEW X,Y COUNTS
ODE2                  4620  *
ODE2  00              4630  JMP6   NOP
ODE3                  4640         IF    BUGS
ODE3                  5910  *
ODE3                  5920  * ROUTINE TO PRINT MESSAGES
ODE3                  5930  * PUT ERROR LETTER IN ERRX
```

```
0DE3           5940  *
0DE3  00       5950  JMP7    NOP
0DE4           5960  *
0DE4  3E 09    6310          MVI   A,9
0DE6  D3 FF    6320          OUT   FPORT
0DE8  76       6330          HLT
0DE9           6770  *
0DE9           6780  *  SUBROUTINES TO AVERAGE X,Y OUTPUTS
0DE9           6790  *
0DE9           6800  *  ROUTINE TO SAVE X,Y COUNTS FOR AVERAGING
0DE9  47       6810  JMP10   MOV   B,A              SAVE CONTROL BYTE
0DEA           6811  *  TEST IF 1X - GO TO ROUTC IF SO
0DEA  3A 05 C0 6812          LDA   TIMHID
0DED  FE 01    6813          CPI   1
0DEF  78       6814          MOV   A,B
0DF0  C2 F7 0D 6815          JNZ   YESAV
0DF3  CD 80 0B 6816          CALL  ROUTC            DO IT DIRECT
0DF6  C9       6818          RET
0DF7  E6 50    6820  YESAV   ANI   50H              0101 0000  +/- PART
0DF9  32 7D C0 6830          STA   DIRSAV
0DFC           6840  *  ADD TO COUNTS
0DFC  21 76 C0 6850          LXI   H,XCOUNT
0DFF  78       6860          MOV   A,B
0E00  E6 80    6870          ANI   80H
0E02  CA 06 0E 6880          JZ    $+4              1000 0000  X MOVE BIT
0E05  34       6890          INR   M
0E06  23       6900          INX   H                Y COUNT
0E07  78       6910          MOV   A,B
0E08  E6 20    6920          ANI   20H              0010 0000  Y MOVE BIT
0E0A  CA 0E 0E 6930          JZ    $+4
0E0D  34       6940          INR   M
0E0E  7E       6950          MOV   A,M              Y COUNT TOTAL
0E0F  2B       6960          DCX   H
0E10  86       6970          ADD   M                A=X+Y
0E11  21 80 C0 6980          LXI   H,THRESH
0E14  BE       6990          CMP   M                ARE WE AT THRESHOLD NUMBER?
0E15  F8       7000          RM                     GO BACK IF UNDER
0E16           7010  *  ROUTINE TO OUTPUT AVERAGED X,Y COUNTS
0E16           7020  *  INTIALIZATION
0E16  21 81 C0 7030  JMP11   LXI   H,STEPS
0E19  4E       7040          MOV   C,M
0E1A           7050  *  NOW DOWN COUNT AND STEP
0E1A  21 76 C0 7060  CNTCK   LXI   H,XCOUNT
0E1D  7E       7070          MOV   A,M              CHECK IF WE ARE DONE
0E1E  23       7080          INX   H
0E1F  86       7090          ADD   M                Y COUNT
0E20  C8       7100          RZ                     GO HOME IF BOTH COUNTS = 0
0E21  06 00    7110          MVI   B,0              CLEAR OUTPUT BYTE
0E23  21 7F C0 7120          LXI   H,XRESET
0E26  35       7130          DCR   M
0E27  F2 42 0E 7140          JP    YCK
0E2A  3A 77 C0 7150          LDA   YCOUNT
0E2D  32 7F C0 7160          STA   XRESET
0E30  21 76 C0 7170          LXI   H,XCOUNT
```

| | | | | | | |
|---|---|---|---|---|---|---|
| 0E33 | 97 | | | 7180 | SUB | A |
| 0E34 | 86 | | | 7190 | ADD | M |
| 0E35 | CA 42 0E | | | 7200 | JZ | YCK |
| 0E38 | 21 76 C0 | | | 7210 | LXI | H,XCOUNT |
| 0E3B | 35 | | | 7220 | DCR | M |
| 0E3C | 06 80 | | | 7230 | MVI | B,80H | 1000 0000 X OUT BIT
| 0E3E | 0D | | | 7240 | DCR | C | NO OF STEPS COUNTER
| 0E3F | CA 60 0E | | | 7250 | JZ | OUTCK |
| 0E42 | 21 7E C0 | | | 7260 | YCK | LXI | H,VRESET
| 0E45 | 35 | | | 7270 | DCR | M |
| 0E46 | F2 60 0E | | | 7280 | JP | OUTCK |
| 0E49 | 3A 76 C0 | | | 7290 | LDA | XCOUNT |
| 0E4C | 32 7E C0 | | | 7300 | STA | VRESET |
| 0E4F | 21 77 C0 | | | 7310 | LXI | H,YCOUNT |
| 0E52 | 97 | | | 7320 | SUB | A |
| 0E53 | 86 | | | 7330 | ADD | M |
| 0E54 | CA 60 0E | | | 7340 | JZ | OUTCK |
| 0E57 | 21 77 C0 | | | 7350 | LXI | H,YCOUNT | Y TO GO -1
| 0E5A | 35 | | | 7360 | DCR | M |
| 0E5B | 78 | | | 7370 | MOV | A,B | 0010 0000 Y MOVE BIT
| 0E5C | C6 20 | | | 7380 | ADI | 20H |
| 0E5E | 47 | | | 7390 | MOV | B,A |
| 0E5F | 0D | | | 7400 | DCR | C | NO OF STEPS COUNTER
| 0E60 | 97 | | | 7410 | OUTCK | SUB | A
| 0E61 | 80 | | | 7420 | ADD | B |
| 0E62 | CA 1A 0E | | | 7430 | JZ | CNTCK | ZERO = NO OUT THIS TIME
| 0E65 | 21 7D C0 | | | 7440 | LXI | H,DIRSAV | +/- PART
| 0E68 | 86 | | | 7450 | ADD | M | NOW A COMPLETE CONTROL BYTE
| 0E69 | CD 80 0B | | | 7460 | CALL | ROUTC |
| 0E6C | 97 | | | 7470 | SUB | A |
| 0E6D | 81 | | | 7480 | ADD | C | STEPS COUNTER
| 0E6E | C2 1A 0E | | | 7490 | JNZ | CNTCK |
| 0E71 | 3A 76 C0 | | | 7500 | LDA | XCOUNT |
| 0E74 | 21 77 C0 | | | 7510 | LXI | H,YCOUNT |
| 0E77 | 86 | | | 7520 | ADD | M | SET FLAGS FOR CALLING ROUTINE
| 0E78 | C9 | | | 7530 | RET | |
| | | | | 7540 | * INITIALIZATION | |
| 0E79 | 3A 05 C0 | | | 7550 | JMP12 | LDA | TIMHD | TIMES NO.
| 0E7C | 21 2A 0F | | | 7560 | LXI | H,TABLE |
| 0E7F | BE | | | 7570 | XYLOO | CMP | M |
| 0E80 | CA 92 0E | | | 7580 | JZ | FOUND |
| 0E83 | F2 8C 0E | | | 7590 | JP | NOERR |
| 0E86 | 21 3C 0F | | | 7600 | LXI | H,TABLL |
| 0E89 | C3 92 0E | | | 7610 | JMP | FOUND | IF OVER RANGE, USE LAST ENTRY
| 0E8C | 23 | | | 7620 | NOERR | INX | H
| 0E8D | 23 | | | 7630 | INX | H |
| 0E8E | 23 | | | 7640 | INX | H |
| 0E8F | C3 7F 0E | | | 7650 | JMP | XYLOOP |
| 0E92 | 23 | | | 7660 | FOUND | INX | H
| 0E93 | 7E | | | 7670 | MOV | A,M |
| 0E94 | 32 80 C0 | | | 7680 | STA | THRESH |
| 0E97 | 23 | | | 7690 | INX | H |
| 0E98 | 7E | | | 7700 | MOV | A,M |
| 0E99 | 32 81 C0 | | | 7710 | STA | STEPS |

```
0E9C  97              SUB   A
0E9D  32 76 C0        STA   XCOUNT
0EA0  32 77 C0        STA   YCOUNT
0EA3  32 7F C0        STA   XRESET
0EA6  32 7E C0        STA   YRESET
0EA9  C9              RET
0EAA          *
0EAA          * ROUTINES FOR OUTPUTTING COIL ON PATTERNS TO STEPPERS
0EAA          *
0EAA          * XLEFT ROUTINE
0EAA  2A 41 C0  JPS13 LHLD  COILX           GET CURRENT TABLE ADDRESS
0EAD  23              INX   H               GO DOWN TO NEXT ADDRESS
0EAE  7E              MOV   A,M             GET PATTERN
0EAF  B7              ORA   A
0EB0  C2 B7 0E        JNZ   $+7             0 MEANS TABLE END
0EB3  21 B3 0B        LXI   H,COILS+1       RESET TABLE START
0EB6  7E              MOV   A,M
0EB7  22 41 C0        SHLD  COILX           SAVE NEXT TABLE ADDRESS
0EBA  D3 D8           OUT   XPORT
0EBC           * TEST FOR STEPPERS OFF - DONT CHANGE COUNT IF OFF
0EBC  DB DF           IN    SPORT               STATUS PORT HAS STEPPERS OFF INPUT
0EBE  2F              CMA
0EBF  E6 20           ANI   20H                 0010 0000
0EC1  C0              RNZ
0EC2  2A 01 C0        LHLD  XADD
0EC5  2B              DCX   H
0EC6  22 01 C0        SHLD  XADD
0EC9  C9              RET
0ECA          * XRGHT ROUTINE
0ECA  2A 41 C0  JPS14 LHLD  COILX
0ECD  2B              DCX   H
0ECE  7E              MOV   A,M
0ECF  B7              ORA   A
0ED0  C2 D7 0E        JNZ   $+7
0ED3  21 BA 0B        LXI   H,COILS+8
0ED6  7E              MOV   A,M
0ED7  22 41 C0        SHLD  COILX
0EDA  D3 D8           OUT   XPORT
0EDC  DB DF           IN    SPORT
0EDE  2F              CMA
0EDF  E6 20           ANI   20H
0EE1  C0              RNZ
0EE2  2A 01 C0        LHLD  XADD
0EE5  23              INX   H
0EE6  22 01 C0        SHLD  XADD
0EE9  C9              RET
0EEA          * YTO ROUTINE
0EEA  2A 43 C0  JPS15 LHLD  COILY
0EED  2B              DCX   H
0EEE  7E              MOV   A,M
0EEF  B7              ORA   A
0EF0  C2 F7 0E        JNZ   $+7
0EF3  21 BA 0B        LXI   H,COILS+8
0EF6  7E              MOV   A,M
```

```
0EF7  22 43 C0          SHLD  COILY
0EFA  D3 D9             OUT   YPORT
0EFC  DB DF             IN    SPORT
0EFE  2F                CMA
0EFF  E6 20             ANI   20H
0F01  C0                RNZ
0F02  2A 43 C0          LHLD  YADD
0F05  23                INX   H
0F06  22 43 C0          SHLD  YADD
0F09  C9                RET
0F0A              * YAWAY ROUTINE
0F0A  2A 43 C0  JPS16   LHLD  COILY
0F0D  23                INX   H
0F0E  7E                MOV   A,M
0F0F  B7                ORA   A
0F10  C2 17 0F          JNZ   $+7
0F13  21 B3 0B          LXI   H,COILS+1
0F16  7E                MOV   A,M
0F17  22 43 C0          SHLD  COILY
0F1A  D3 D9             OUT   YPORT
0F1C  DB DF             IN    SPORT
0F1E  2F                CMA
0F1F  E6 20             ANI   20H
0F21  C0                RNZ
0F22  2A 43 C0          LHLD  YADD
0F25  2B                DCX   H
0F26  22 43 C0          SHLD  YADD
0F29  C9                RET
0F2A              * DBUG ROUTINES
0F2A                    IF    BUGS
0F2A              * THRESH/STEPS TABLE (KEY IS TIMES NO.)
0F2A              TABLE DB    1
0F2B  00 02             DW    0200H
0F2D  02                DB    2
0F2E  0C 02             DW    020CH
0F30  03                DB    3
0F31  12 04             DW    0412H
0F33  04                DB    4
0F34  18 06             DW    0618H
0F36  05                DB    5
0F37  24 06             DW    0624H
0F39  06                DB    6
0F3A  24 06             DW    0624H
0F3C  07                DB    7
0F3D  24 06             DW    0624H
0F3F  FF        TABLL   DB    0FFH
0F40              ZZZZZ EQU   $              TABLE END

SYMBOL TABLE

CHERE  0DDD    CLOOK  0DC4    CMORE  0DD3    CNTCK  0E1A    FOUND  0E92
GOOUT  0DA2    JMP1   0BBC    JMP10  0DE9    JMP11  0E16    JMP12  0E79
JMP17  0D73    JMP2   0D75    JMP3   0DA4    JMP4   0DB2    JMP5   0DC0
JMP6   0DE2    JMP7   0DE3    JPS13  0EAA    JPS14  0ECA    JPS15  0EEA
```

```
JPS16 0F0A    JPS9  0F74    LKOUT 0DDF    MITAL 0D55    MXTAL 0CD4
NOERR 0E8C    OUTCK 0E60    PITAL 0D61    PXTAL 0CE0    REVX  0BDA
REVY  0B8C    ROUTB 0C00    ROUTE 0D6A    ROUTX 0C01    SEXIT 0D6D
TABLE 0F2A    TABLL 0F3C    TESTS 0C5E    TESTY 0C31    TRYY  0CE9
XMOUT 0C7E    XPOS  0C2E    XPOUT 0CA9    XT    0C6F    XYLOO 0E7F
YCK   0E42    YESAV 0DF7    YMOUT 0CFF    YPOS  0C5B    YPOUT 0D2A
YT    0CF0    ZZZZZ 0F40

SAVED SYMBOL TABLE

ABORT 0B95    ADDCT 0B86    ADDUP C07B    BAKSW C048    BIG   0000
BITPA 1200    BR    1200    BTADD C084    BUGS  0000    BYTEC C0A4
CCBYT C066    CCFOU C065    CCURT C067    CFIND 0B8C    CFONT C00E
CLEAR 0006    CLRCT 000F    CLSB  004B    CMSB  0000    CNTAD C0A2
COILS 0BB2    COILX C041    COILY C043    CNTR  0700    CPM   C068
CREV  C069    CSS   1400    CTBEG C061    CTHIS C063    CTRO  00D0
CTR1  00D1    CTR2  00D2    CTRXX 00D3    CUTHL C0AB    CUTIN 0009
DADDR C05F    DATA  C000    DATE  0224    DEBUG 1206    DIRSA C07D
DNBEG FF6F    DNUM  00AA    DOWN  C00D    ENDFT C000    EXIT  C08B
FADD  C074    FIRST C0A9    FNT01 1C00    FOURC C05D    FPORT 0FFF
GOIN  0B83    GOTO  0703    GOXNE C04F    GOXPO C04D    GOYNE C053
GOYFG C051    HLHOL C079    HOLD  C08D    HOLDA C05E    HOLDB C032
HOLDH C049    INITL 0000    ITALS C016    LETTE 1209    LIT   0700
MBYTE C045    MEM   C0A6    MEMCT C0A0    MEMST 4000    MIRRO C019
MPORT 00DA    MVIT  0012    NEWDI C0BE    NXCOD 000C    OVAL  C06A
OVALC C06D    OVALD C070    OVALR C072    PACKB C09E    PACKC C09F
PAIRC C083    PSW   0006    RCNT  C033    ROUTC 0B80    ROUTI 1203
S1POR 00DB    S2POR 00DC    SAVXY 0BAD    SIZCX C055    SIZCY C058
SIZHA C078    SIZHX C006    SIZHY C009    SLBYT C073    SLOCH C09D
SLOWB C012    SPD1  C01A    SPD2  C01C    SPD3  C01E    SPD4  C020
SPD5  C022    SPD6  C024    SPD7  C026    SPD8  C027    SPD9  C028
SPORT 00DF    STAK  C010    STAKS FFFF    START 0003    STDEF C100
STEPC 004B    STEPS C081    STRHD C013    STRIN C046    SUB   0B80
SUBCT 0B89    THRES C080    TIMAD C05B    TIMCT C015    TIMHD C005
TMDN  FFEC    TMHI  F31C    TMHIP 0CE4    TMLOW FE57    TMNUM C035
TMPHL C03F    TMUP  0014    TPORT 00DE    TRS   FFFF    TRSIN C04B
TSQL  0000    XADD  C001    XCCNT C093    XCNT  C037    XCOUN C076
XLEFT 0BA1    XMM   C02D    XNOW  C091    XPORT 00D8    XPP   C02B
XPREV C08F    XRESE C07F    XRGHT 0BA4    XSPAC C0A    XSTAR C089
XTIME C03B    XYYY  C029    XYAVE 0B98    XYCAL 0B9B    XYDIR C086
XYINI 0B9E    XYPRT 0B8F    YADD  C003    YAWAY 0BAA    YCCNT C099
YCNT  C039    YCOUN C077    YMM   C031    YNOW  C097    YPORT 00D9
YPP   C02F    YPREV C095    YRESE C07E    YSPAC C088    YSTAR C087
YTIME C03D    YT0   0BA7    YZERO C09B 0000           0010 *
0000           0020 * * BR
0000           0030 *
0000           0040 * JUMP TABLE
1200           0050 *     ORG    BR
1200 C3 0E 12  0060       JMP    JMP1         BITPAD
1203 C3 14 12  0070       JMP    JMP2         ROUTIT
1206 C3 E2 12  0080       JMP    JMP3         DEBUG
1209 C3 22 12  0090       JMP    JMP4         LETTER (H,L MUST HAVE TABLE START ADDRESS)
```

```
120C 24 02                0100        DW    DATE
120E 00                   0110 JMP1   NOP
120F                      0120        IF    BUGS
120F 3E 0A                4430        MVI   A,10
1211 D3 FF                4440        OUT   FPORT
1213 76                   4450        HLT
1214                      4460 *
1214                      4470 *
1214                      4480 * DRIVER PORTION OF PROGRAM
1214                      4490 *
1214 00                   4500 JMP2   NOP
1215 CD 00 00             4511        CALL  INITL         CLEAR COUNTERS
1218 DB                   4512        IN    SIPOR         WAIT?
121A E6 01                4513        ANI   1
121C C2 18 12             4514        JNZ   $-4
121F 21 00 40             4519        LXI   H,MEMST
1222 23                   4520 JMP4   INX   H             GET PAST BYTE CODE
1223 23                   4530        INX   H             GET PAST BYTE COUNT
1224 23                   4540        INX   H
1225 22 84 C0             4550        SHLD  BTADDR
1228 CD 9E 0B             4560        CALL  XYINIT        INITIALIZE AVERAGING ROUTINE
122B 3E 01                4590        MVI   A,1           CAUSES RESET
122D 32 83 C0             4590        STA   PAIRCT
1230                      4600 * RUN
1230 CD BB 12             4610 ROUTE  CALL  PAIR
1233 B7                   4620        ORA   A
1234 CA 59 12             4630        JZ    CHANGE        0=CHANGE BITS
1237 07                   4640        RLC                 SEPARATE
1238 1F                   4650        RAR                 X,Y
1239 1F                   4660        RAR                 BITS
123A E6 A0                4670        ANI   0A0H          1010 0000
123C 47                   4680        MOV   B,A           STORE IT
123D 3A 86 C0             4690        LDA   XYDIR
1240 07                   4700        RLC                 SEPARATE
1241 1F                   4710        RAR                 A,Y
1242 1F                   4720        RAR                 DIRECTION
1243 1F                   4730        RAR                 BITS
1244 E6 50                4740        ANI   50H           0101 0000
1246 B0                   4750        ORA   B             PUT TOGETHER CONTROL BYTE
1247 21 05 C0             4760        LXI   H,TIMHD
124A 46                   4770        MOV   B,M           GET TIMES NUMBER
124B F5                   4780        PUSH  PSW
124C C5                   4790 RLOOP  PUSH  B
124D CD 98 0B             4800        CALL  XYAVER        AVERAGING ROUTINE
1250 C1                   4810        POP   B
1251 F1                   4820        POP   PSW
1252                      4830 * TIMES ROUTINE
1252 05                   4840        DCR   B             COUNT-1
1253 C2 4B 12             4850        JNZ   RLOOP         TIMES LOOP
1256 C3 30 12             4860        JMP   ROUTE
1259 CD BB 12             4870        CALL  PAIR
125C B7                   4880 CHANO  ORA   A
125D C2 67 12             4890        JNZ   G00N          ZERO IS WAY OUT
1260 CD 9B 0B             4900        CALL  XYCALL        DUMP ANY REMAINING STEPS
```

```
1263 C2 60 12          4920            JNZ     $-3             CLEAR ALL REMAINING COUNTS
1266 C9                4930            RET                     ALL DONE
1267 FE 80             4940  GOON      CPI     80H             1000 0000 SLOW DOWN
1269 C2 72 12          4950            JNZ     TRYCUT
126C CD BB 12          4960            CALL    PAIR            TAKE OUT WHEN ALL SLOWDOWNS ARE GONE
126F C3 30 12          5010            JMP     ROUTE
1272 FE 40             5020  TRYCU     CPI     40H             0100 0000 CUTTER UP/DN
1274 C2 82 12          5030            JNZ     TRYDIR
1277 CD BB 12          5040            CALL    PAIR
127A 07                5050            RLC
127B 0F                5060            RRC                     SET CARRY FOR CUTIN
127C CD 09 00          5070            CALL    CUTIN           GOTO MAIN PROGRAM
127F C3 30 12          5080            JMP     ROUTE
1282 FE C0             5090  TRYDI     CPI     0C0H            1100 0000 DIRECTION CHANGE
1284 C2 96 12          5100            JNZ     NOTOK
1287 CD BB 12          5110            CALL    PAIR            GET NEW X,Y DIRECTION
128A 32 86 C0          5120            STA     XYDIR
128D CD 9B 0B          5130            CALL    XYCALL          MUST CLEAR IF WE CHANGE DIRECTION
1290 C2 8D 12          5140            JNZ     $-3             CLEAR ALL COUNTS ON A DIR. CHG.
1293 C3 30 12          5150            JMP     ROUTE
1296 00                5160  NOTOK     NOP
1297                   5170            IF      BUGS
1297 3E 0B             5220            MVI     A,11
1299 D3 FF             5230            OUT     FPORT
129B 76                5240            HLT
129C 0A 0D             5250  BADCD     DW      0D0AH
129E 2A 2A 2A 20 42    5260            DB      '*** BAD CODE IN MEMORY ***'
     41 44 20 43 4F
     44 45 20 49 4E
     20 4D 45 4D 4F
     52 59 20 2A 2A
     2A
12B8 0A 0D             5270            DW      0D0AH
12BA 00                5280            DB      0
                       5290  * SUBROUTINE TO UNPACK BYTES IN 2 BIT LOTS
                       5300  * RETURNS IN A: BITS 6-7 GOES 4-1  0=GET NEXT BYTE
                       5310  * USES A,B,H,L
12BB 3A 83 C0          5320  PAIR      LDA     PAIRCT
12BE 3D                5330            DCR     A
12BF 32 83 C0          5340            STA     PAIRCT
12C2 C2 D5 12          5350            JNZ     NXPAIR
12C5 2A 84 C0          5360            LHLD    BTADDR
12C8 7E                5370            MOV     A,M             NEXT BYTE
12C9 32 82 C0          5380            STA     HOLDBT          BYTE STORAGE
12CC 23                5390            INX     H               POINT TO NEXT
12CD 22 84 C0          5400            SHLD    BTADDR
12D0 3E 04             5410            MVI     A,4             BIT PAIR COUNT
12D2 32 83 C0          5420            STA     PAIRCT
12D5 3A 82 C0          5430  NXPAI     LDA     HOLDBT
12D8 47                5440            MOV     B,A
12D9 07                5450            RLC
12DA 07                5460            RLC                     GET TOP 2 AT 0-1
12DB 32 82 C0          5470            STA     HOLDBT
12DE 78                5480            MOV     A,B
```

```
12DF E6 C0              5490        ANI    0C0H         1100 0000
12E1 C9                 5500        RET
12E2                    5510   *
12E2                    5520   *
12E2                    5530   * DEBUG BYTE PRINTOUT
12E2                    5540   *
12E2                    5550   *
12E2 00                 5560 JMP3   NOP
12E3                    5570        IF     BUGS
12E3 3E 0A              6220        MVI    A,10
12E5 D3 FF              6230        OUT    FPORT
12E7 76                 6240        HLT
12E8 0D 0A              6250 MESS   DW     0A0DH
12EA 4D 45 4D 4F 52     6260        DB     'MEMORY = '
     59 20 3D 20
12F3 00 40              6270 MEMFR  DW     MEMST
12F5 CD 19 C0           6280        SOUT   CALL   0C019H
12F8 C9                 6290        RET
12F9                    6310   * EQUATES
12F9                    6320 PORT   EQU    0FDH
12F9                    6330 SINP   EQU    0C01FH
12F9                    6340 MEMLE  EQU    0C01FH
12F9                    6350   * SCRAMBLE BYTES THAT NEED NO PRESET
12F9                    6360 ZZZZ   EQU    *
```

SYMBOL TABLE

```
BADCD 129C   CHANG 1259   GOON  1267   JMP1  120E   JMP2  1214
JMP3  12E2   JMP4  1222   MEMFR 12F3   MEMLE 4000   MESS  12E8
NOTOK 1296   NXPAI 12D5   PAIR  12BB   PORT  00FD   RLOOP 124B
ROUTE 1230   SINP  C01F   SOUT  12F5   TRYCU 1272   TRYDI 1282
ZZZZZ 12F9
```

SAVED SYMBOL TABLE

```
ABORT 0B95   ADDCT 0B86   ADDUP C07B   BAKSW C048   BIG   0000
BITPA 1200   BR    1200   BTADD C084   BUGS  0000   BYTEC C0A4
CCBYT C066   CCFOU C065   CCURT C067   CFIND 0BBC   CFONT C00E
CLEAR 0006   CLRCT 000F   CLSB  004B   CMSB  0000   CNTAD C0A2
COILS 0BB2   COILX C041   COILY C043   CONTR 0700   CPM   C068
CREV  C069   CSS   1400   CTBEG C061   CTHIS C063   CTRO  00D0
CTR1  00D1   CTR2  00D2   CTRXX 00D3   CUTHL C0AB   CUTIN 0009
DADDR C05F   DATA  C000   DATE  0224   DEBUG 1206   DIRSA C07D
DNBEG FF6F   DNUM  00AA   DOWN  C00D   ENDFT C000   EXIT  C08B
FADD  C074   FIRST C0A9   FNTO1 1C00   FOURC C05D   FPORT 00FF
GOIN  0B83   GOTO  0703   GOXNE C04F   GOXPO C04D   GOYNE C053
GOYPO C051   HLHOL C079   HOLD  C08D   HOLDA C05E   HOLDB C082
HOLDH C049   INITL 0000   ITALS C016   LETTE 1209   LIT   0700
MBYTE C045   MEM   C0A6   MEMCT C0A0   MEMST 4000   MIRRO C019
MPORT 00DA   MVIT  0012   NEWDI C08E   NXCOD 000C   OVAL  C06A
OVALC C06D   OVALD C070   OVALR C072   PACKB C09E   PACKC C09F
PAIRC C083   PSW   0006   RCNT  C033   ROUTC 0B80   ROUTI 1203
S1POR 00DB   S2POR 00DC   SAVXY 0BAD   SIZCX C055   SIZCY C058
SIZHA C078   SIZHX C006   SIZHY C009   SIZBYT C073  SLOCH C09D
```

What is claimed is:

1. A method of manipulating a tool of the type in which a tool is positionally manipulated with respect to a workpiece to transfer user-supplied copy information to the workpiece in accordance with dimensional information supplied by a user, including the steps of generating a plurality of position and control parameters which are based upon the user-supplied dimensional information;

generating a plurality of copy parameters which are based upon the dimensional information and the user-supplied copy information;

transferring control, position and copy parameters and user-supplied copy information to a control means;

transforming the position and control parameters into drive signals;

obtaining master font instructions in the font style in which the user-supplied copy information is to be transferred by the tool to the workpiece from a master font memory within the control means;

modifying the master font instructions corresponding to the user-supplied copy information according to the copy parameters;

converting the modified master font instructions into drive signals;

transferring all drive signals to a tool manipulating means;

positioning the tool according to the position drive signals; and manipulating the tool in accordance with the control and modified master font instruction drive signals.

2. The method of manipulating a tool, as recited in claim 1, wherein the user-supplied dimensional information include a "white space" specification, a "margin multiplier" specification, plate dimensions, a number of "line ratios", and a line count, and further wherein the control and position parameter generating step further includes the step of generating the position and control parameters according to to the "white space", the "margin multiplier," "line ratio," and copy information to obtain margin, line height, and line space, dimensional specifications.

3. The method of manipulating a tool, as recited in claim 1, wherein the copy parameter generating step further includes the steps of automatically determining whether any line-width of the entered copy exceeds or over-extend the dimensional information supplied by the user;

modifying the copy parameters to include a condensation factor to narrow the width of each character within the copy line so that the modified copy line will be consistent with the dimensional information.

4. The method of manipulating a tool, as recited in claim 3, further including the step of modifying the copy parameters for all lines having the same character height according to the same proportion used to modify the over-extended line.

5. The method of manipulating a tool as recited in claim 3, wherein a box-character is specified in the user-supplied copy information, the copy information also including a margin specification and an expansion factor for the box-character which exceeds the user-supplied margin specification, so that the box-character is automatically condensed to conform to the user supplied margin specification to form a border about the workpiece.

6. The method of manipulating a tool, as recited in claim 1, wherein the master font instructions include a first axis drive signal specifying a number of steps for driving the tool in a first direction and a second axis drive signal specifying a number of steps for driving the tool in a second direction which is perpendicular to the first direction, and further wherein the modification of the master font instruction step further includes the step of inserting an italicizing quantity into the second axis drive signal for each step specified in the first axis drive signal, so that an italicized character is produced wherein the italicizing quantity is selected to cause an angling of the vertical lines within the character.

7. The method of manipulating a tool, as recited in claim 1, wherein a master font instruction includes an X-step and direction, a Y-step and direction, and further wherein modification of the master font step further includes the step of reversing the X-step direction for each instruction so that reverse lettering is produced.

8. The method of manipulating a tool, as recited in claim 1, wherein the copy information specifies a circle character, and further wherein, the master font for a circle contains the font instruction for a quarter-circle in the form of X and Y directive steps, and further wherein the master font modifying step includes the step of modifying the X and Y directive steps of the quarter-circle instruction set to derive corresponding instruction sets for the undefined quadrants of the specified circle.

9. The method of manipulating a tool, as recited in claim 8, wherein a character dimension is specified to be substantially larger than the master font dimension, further including the steps of retrieving a threshold number and a steps number from a smoothing routine table according to the specified character dimension;

counting the total member of X and Y directive steps which occur as the font instruction is scanned to yield an X, Y total count;

initiating a separate X count and a separate Y count when the X, Y total count exceeds the threshold number, the X count and the Y count being decremented, wherein the X counter and the Y counter are present to commence their counts which are function of the number of X steps and the number of Y steps in the X, Y total count;

causing a step to be generated in the modified master font instructions when the separate X counter or the separate Y counter reaches a zero count, the generated step corresponding to the axis opposite that to which the zero count counter corresponds, the counter thereafter being reset to its original present count;

continuing the decrementing of the separate counters until the total number of steps generated equal or exceeds the steps number.

10. The method of manipulating a tool, as recited in claim 1, wherein the master font instruction specifies a number of master font steps which produce a character having a standard proportion, wherein the copy parameters include an expansion factor and a reduction factor which are representative of a desired character proportion such that the product of the expansion factor, the reduction factor, and the standard character proportion corresponds to the desired character proportion, and further wherein the master font instruction modifying step includes the steps of multiplying the number of master font steps by the expansion factor to obtain an expanded number of master font steps;

reducing the expanded number of master font steps by the reduction factor, including the steps of inserting the reduction factor into a counter for each of the master font steps in the expanded number of master font steps; and causing a master font step to be output whenever the contents of the counter exceed a predetermined quantity.

11. An apparatus for manipulating a tool with respect to a workpiece in which a tool is manipulated by electronic means to transfer copy information to the workpiece in accordance with layout and copy information supplied by a user, the apparatus comprising an intelligent terminal for receiving the information from the user, and for generating control, position and copy parameters, the terminal including
means for generating a plurality of different dimensional layouts in accordance with the user-supplied information, and for converting the generated layouts into control, position and copy parameters;

a control unit, which is communicatively coupled to the intelligent terminal, the control unit receiving the control, position and copy parameters and the copy information from the terminal, and supplying font information to the terminal, the control unit including font memory means for supplying a plurality of master font definitions which define the font style in which the copy information is to be transferred to the workpiece by the tool;

processing means for interpreting the position and control parameters, for modifying master font definitions according to the copy parameters, and for generating drive signals in accordance with control and position parameters and in accordance with the copy information as defined by the modified master font definitions; and mechanical means responsive to the drive signals from the control unit, the mechanical means including the tool and means for manipulating the position of the tool in accordance with the drive signals.

12. The tool manipulating apparatus, as recited in claim 11, wherein layout and copy information are supplied by the user including a "white space" specification, a "margin multiplexer" specification, a line count, a number of line ratios, and work piece dimensions, and further wherein the dimensional layout generating means determines a line height and position for each line in accordance with the "white space" specification, and a margin specification in accordance with the "margin multiplier" specification and the line positions.

13. The tool manipulating apparatus, as recited in claim 11, wherein the user supplies layout information and user-supplied copy over-extends the dimensions specified, the dimensional layout generating means further including an autocondensing function wherein, for a specified character height, a character width condensation factor is included in the data transferred to the control unit to modify the corresponding master font character-width instruction, so that the copy line is automatically condensed in width to fit within the specified layout dimension.

14. The tool manipulating apparatus, as recited in claim 11, wherein the control unit further includes a plurality of front panel controls for user control and interrupt of the control unit and mechanical engraving means when a job is in progress.

15. The tool manipulating apparatus, as recited in claim 14, wherein the front panel controls include
a cutter speed control;
a job-abort control;
a cutter-pause control; and
a power-saver control.

16. The tool manipulating apparatus, as recited in claim 15, wherein the means for manipulating the position of the engraving tool include stepping motors of the type which are controlled by energizing a prescribed combination and sequence of direction-control coils, and which are idled in a specified position by the application of idling currents to predetermined coils, and further wherein the control unit processing means include
means for storing a coil pattern table which designates control coils to be energized for stepping motor rotation in a specified direction;
means coupled to the storing means for converting a direction instruction from the master font memory into direction control coil signals; and
a position memory coupled to the converting means for retaining the last stepping motor position, so that the direction control coil signal corresponding to the smallest number of energizer coils can be selected by the converting means for output to the stepping motor when the tool is not being used, and so that all control coils can be deenergized and reenergized without altering the stepping motor position.

17. A method of manipulating a tool of the type in which a tool is positionally manipulated with respect to a workpiece and in accordance with dimensional and copy information supplied by a user, wherein the copy information is organized according to lines, including the steps of
generating a plurality of position and control parameters which are based upon the user-supplied dimensional information, including the steps of automatically determining whether the width of any line of the copy information exceeds or over-extends the dimensional information supplied by the user, and modifying the copy parameters to include a condensation factor to narrow the width of each character within any copy line which is determined to over-extend the dimensional information, so that the width of the modified copy line will be consistent with the dimensional information;
generating a plurality of copy parameters which are based upon the dimensional information and the user-supplied copy information;
transferring control, position and copy parameters and the user-supplied copy information to a control means;
transforming the position and control parameters into drive signals;
obtaining master font instructions, which correspond to the user-supplied copy information, from a master font memory within the control means;
modifying the master font instructions which correspond to the user-supplied copy information according to the copy parameters;
converting the modified master font instructions into drive signals;
transferring all drive signals to a tool manipulating means;
positioning the tool according to the position drive signals; and
manipulating the tool in accordance with the control and modified master font instruction drive signals.

18. The method of manipulating a tool, as recited in claim 17, further including the step of modifying the copy parameters for all lines having the same character height according to the same proportion used to modify the over-extended line.

19. The method of manipulating a tool, as recited in claim 17, wherein a box-character is specified in the user-supplied copy information, the copy information also including a margin specification and an expansion factor for the box-character which exceeds the margin specification, so that the box-character is automatically condensed to form to the margin specification to form a border around the workpiece.

20. A method of manipulating a tool of the type in which a tool is positionally manipulated with respect to a workpiece and in accordance with dimensional and copy information supplied by a user, including the steps of
generating a plurality of position and control parameters which are based upon the user-supplied dimensional information and a plurality of copy parameters which are based upon the user-supplied dimensional and copy information;
transferring the control, position and copy parameters, and the user-supplied copy information to a control means;
obtaining master font instructions, which correspond to the user-supplied copy information, from a master font memory within the control means;
modifying the master font instructions according to the copy parameters, wherein the master font instructions include an X-step direction, and a Y-step direction, further including the step of reversing the X-step direction for each master font instruction so that reverse lettering is produced;
converting the modified master font instructions and the position and control parameters into drive signals;
transferring the drive signals to a tool manipulating means wherein the tool is positioned according to the position drive signals and manipulated in accordance with the control and modified master font instruction drive signals.

21. A method of manipulating a tool of the type in which a tool is positionally manipulated with respect to a workpiece and in accordance with dimensional and copy information supplied by a user, including the steps of
generating a plurality of position and control parameters which are based upon the user-supplied dimensional information and a plurality of copy parameters which are based upon the user-supplied dimensional and copy information;
transferring the control, position and copy parameters, and the user-supplied copy information to a control means;
obtaining master font instructions, which correspond to the user-supplied copy information, from a master font memory within the control means;
modifying the master font, instructions according to the copy parameters, wherein the user-supplied copy information specifies a circle character, and further wherein the corresponding circle master font instructions contain font instructions for a quarter circle in the form of X and Y directive steps, further including the step of modifying the X and Y directive steps to derive corresponding instruction sets for the undefined quadrants of the specified circle;

converting the modified master font instructions and the position and control parameters into drive signals;

transferring the drive signals to a tool manipulating means wherein the tool is positioned according to the position drive signals and manipulated in accordance with the control and modified master font instruction drive signals.

* * * * *